US009654494B2

(12) United States Patent
Hentunen

(10) Patent No.: US 9,654,494 B2
(45) Date of Patent: May 16, 2017

(54) DETECTING AND MARKING CLIENT DEVICES

(71) Applicant: F-Secure Corporation, Helsinki (FI)

(72) Inventor: Daavid Hentunen, Helsinki (FI)

(73) Assignee: F-Secure Corporation, Helsinki (FI)

( * ) Notice: Subject to any disclaimer, the term of this patent is extended or adjusted under 35 U.S.C. 154(b) by 111 days.

(21) Appl. No.: 14/249,747

(22) Filed: Apr. 10, 2014

(65) Prior Publication Data
US 2014/0310811 A1 Oct. 16, 2014

(30) Foreign Application Priority Data

Apr. 11, 2013 (GB) .................................. 1306628.7
Jun. 28, 2013 (GB) .................................. 1311673.6

(51) Int. Cl.
G06F 11/00 (2006.01)
H04L 29/06 (2006.01)
H04L 29/12 (2006.01)

(52) U.S. Cl.
CPC ...... H04L 63/1441 (2013.01); H04L 61/1511 (2013.01); H04L 61/305 (2013.01); H04L 63/145 (2013.01); H04L 61/2514 (2013.01); H04L 61/6009 (2013.01); H04L 2463/144 (2013.01)

(58) Field of Classification Search
CPC ........................... H04L 63/1441; H04L 63/145
USPC ......................................................... 726/23
See application file for complete search history.

(56) References Cited

U.S. PATENT DOCUMENTS

| 7,752,664 B1 | 7/2010 | Satish et al. ................. 726/22 |
| 9,191,402 B2* | 11/2015 | Yan ..................... H04L 61/1511 |
| 2006/0282895 A1 | 12/2006 | Rentzis et al. ............... 726/24 |
| 2006/0288417 A1 | 12/2006 | Bookbinder et al. ........... 726/24 |
| 2007/0180090 A1* | 8/2007 | Fleischman ....... H04L 29/12066 709/223 |
| 2007/0294419 A1* | 12/2007 | Ulevitch ........... H04L 29/12066 709/230 |

(Continued)

FOREIGN PATENT DOCUMENTS

| EP | 1 902 375 | 1/2007 |
| EP | 1897323 A1 | 3/2008 |

(Continued)

Primary Examiner — Teshome Hailu
(74) Attorney, Agent, or Firm — Harrington & Smith

(57) ABSTRACT

Methods, apparatus, connection systems, and client devices are described. The apparatus receives a multiplicity of DNS query messages from multiple client devices. For each received DNS query message to a malware domain name or a particular domain name, the apparatus sends a marker DNS response message to the corresponding client device for use in detecting whether the client device is infected with malware or is accessing the particular domain name. The connection system receives a connection request from a client device of the multiple client devices for access to the communication network, and sends marker detection information to the client device for use in identifying whether client device is marked as infected with malware or accessing a particular domain name. It is determined whether the client device is infected with malware or accessed the particular domain name. The client device may be blocked or granted access to the communication network.

18 Claims, 16 Drawing Sheets

(56) References Cited

U.S. PATENT DOCUMENTS

| | | | | |
|---|---|---|---|---|
| 2009/0320131 | A1 | 12/2009 | Huang | 726/23 |
| 2013/0036468 | A1* | 2/2013 | Georgiev | H04L 61/1511 726/23 |
| 2014/0068043 | A1* | 3/2014 | Archbold | H04L 61/1511 709/223 |
| 2014/0215628 | A1* | 7/2014 | Yan | H04L 61/1511 726/25 |

FOREIGN PATENT DOCUMENTS

| | | |
|---|---|---|
| EP | 1591868 A1 | 5/2008 |
| GB | 2 448 271 A | 10/2008 |
| GB | 2 481 356 A | 12/2011 |
| WO | WO 2012/162099 A1 | 11/2012 |
| WO | WO 2013/131237 A1 | 9/2013 |

* cited by examiner

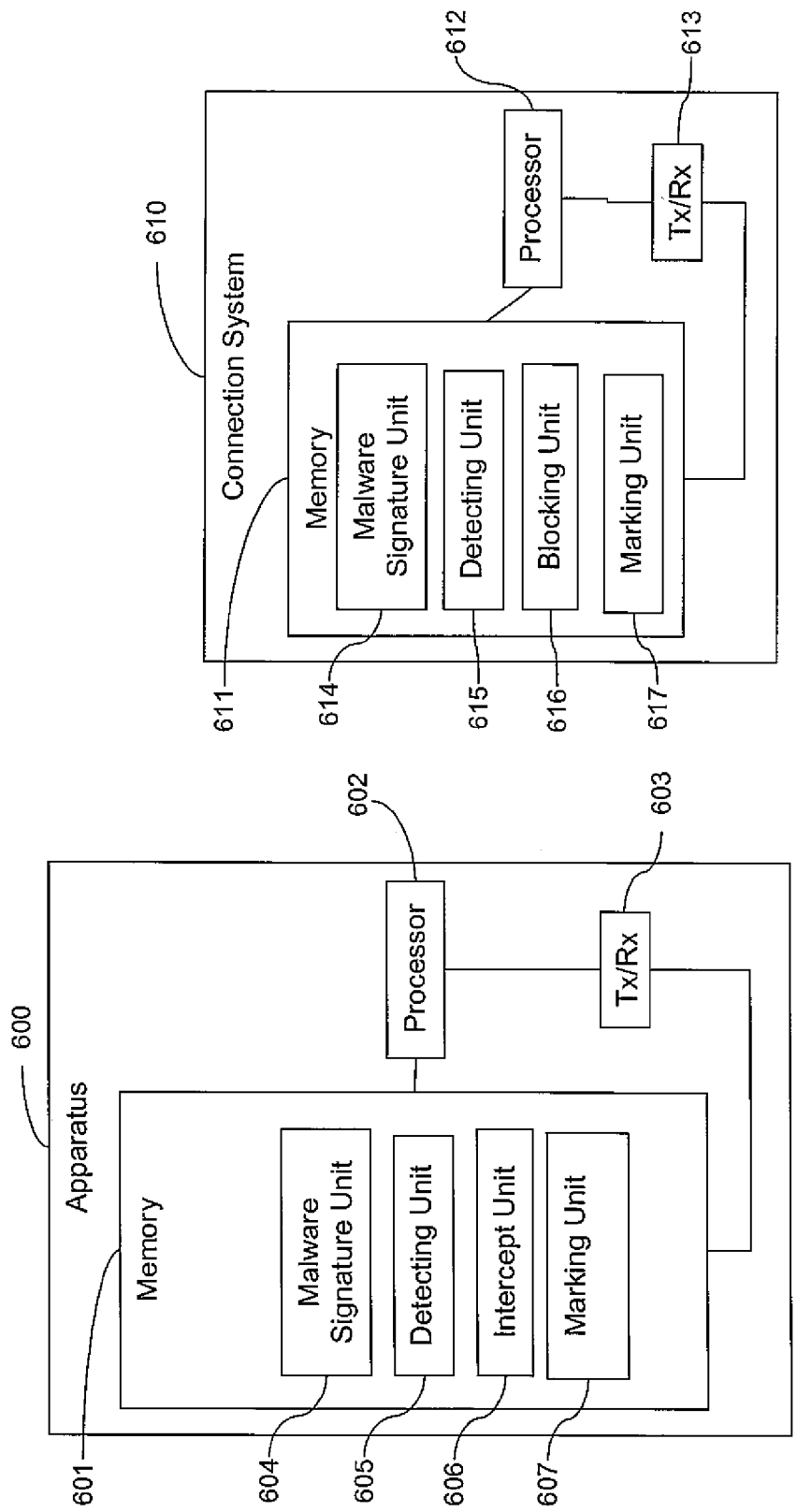

DETECTING AND MARKING CLIENT DEVICES

TECHNICAL FIELD

The present invention relates to detecting client devices inflected with malware or accessing a particular domain and marking the detected client devices for subsequent processing. In particular, the invention relates to methods, apparatus and systems for marking, detecting, quarantining or identifying client devices infected with malware or accessing the particular domain.

BACKGROUND

Malware is short for malicious software and is used as a term to refer to any software designed to infiltrate or damage a client device or computing system such as a computer, set-top box, or mobile device without the owner's informed consent. Malware can include computer viruses, worms, trojan horses, rootkits, adware, spyware, botnets or botnet control and command software and any other malicious or unwanted software. The vulnerability of client devices to attack by malware and other intrusion processes such as botnets (often referred to as computer "infections") is widely acknowledged. Cautious users and system operators will protect their client devices and systems by deploying appropriate security applications including antivirus applications. Security applications will introduce firewalls to defend against intrusion, as well as various engines to detect and eliminate malware including viruses, trojans, worms, spyware etc.

A client device may comprise or represent any device used to connect to or access wired or wireless communication networks. Examples of client devices that may be used in certain embodiments of the invention are wired or wireless devices such as computers, mobile telephones, terminals, smart phones, portable computing devices such as laptops, handheld devices, tablets, net-books, personal digital assistants and other devices that can connect and communicate over a wired or wireless communication network.

Malware may end up on a client device via various techniques such as Domain Name System server hijacking or spoofing. Although such techniques may be used for benign purposes such as advertising performed by internet service providers (ISP), others may use these techniques for malware attacks such as botnets. For example, in DNS spoofing a malicious DNS record (e.g. a malware domain name and corresponding Internet Protocol (IP) address) may be introduced into a DNS server's cache database, causing the DNS server to return the malicious IP address, diverting network traffic to a malicious attacker.

A "botnet" is a collection of infected client devices such as computers or mobile telephones, each of which is known as a "bot" or "node", connected to a network such as the Internet. Client devices that are connected to the Internet may be vulnerable to being recruited into a botnet. Client devices can be recruited into a botnet in a number of ways, for example by a drive-by-download or Trojan-horse malware. Once a client device has been recruited, a botnet controller will be able to make a connection to the client device, and command it to perform malicious activities, for example attack other client devices, host malicious websites, upload personal data or install other malicious modules on the device.

There are a number of existing prevention measures or technologies that are typically carried out to try and detect activities on a client device that are indicative of malware attacks such as botnet attacks or behaviour. One example is a network based intrusion detection system (NIDS). A NIDS is an independent platform that identifies intrusions by examining network traffic and monitoring multiple hosts. A NIDS gains access to network traffic by connecting to a network hub, network switch configured for port mirroring, or network tap. In a NIDS, sensors are typically located at choke points in the network to be monitored. Sensors capture all network traffic and analyse the content of individual packets for malicious traffic. Most results returned from the NIDS are from network packet analysis, but because NIDSs are typically heuristic in nature, they are not always reliable. Other technologies can be employed to actively participate in ongoing network communications and protect against botnets, spy ware or other malicious attacks using malware. For example, inline intrusion detection systems (IDS) may be used to normalise network traffic passing through it. Should the IDS detect unusual network traffic such as a botnet or other malware, then it can terminate an ongoing malicious connection. For example, a malicious transmission control protocol (TCP) connection can be terminated by sending TCP reset packets to both endpoint devices. For User Datagram Protocol, IDS can decide not to send malicious packets forward, thus in effect terminating the data transmission. It is to be appreciated that malicious connections can be in any standard or proprietary communication protocol. Some ISPs use an IDS to detect botnets in their network. These IDS may detect botnet clients (recruited client devices) by analysing DNS traffic. A DNS query for a malicious botnet domain can then be used as an indication that certain internet protocol (IP) addresses in the ISP network have been infected by that botnet or other malware.

But, in reality, many client devices of an ISP actually use some form of network address translation (NAT) device (e.g. a DSL switch, Wi-Fi router, proxy or gateway server). This means that the botnet infected IP address of the client device that the ISP sees is actually the IP address of the NAT device, which cannot be used reliably to identify the client device that has been infected. This means the heavy handed protection of users' computer devices (client computers) by denying/blocking/resetting any connections to known compromised IP addresses may block more than one or a multiplicity of client devices that are actually clean or free from malware infection. An ISP cannot identify the client device(s) infected with malware or part of a botnet simply based on IP address because there are usually more than one or a multiplicity of client devices behind the NAT device that the ISP cannot identify (e.g. a home may have many wi-fi devices, laptops, mobile devices, smart phones accessing the Internet via a single Wi-Fi router or there are many client devices such as computers in a corporate network accessing the Internet via a gateway/proxy server).

In addition, client devices accessing particular domain names of interest to authorities or their ISP may use subversive communication measures e.g. encrypted communication technologies, to access the particular domain name of interest. This may require the use of brute force and expensive techniques such as cryptography experts to find evidence that the client devices are indeed accessing and communicating with the particular domain of interest. This is expensive in both technological terms, cost, and time. There is a further desire for efficiently detecting and identifying client devices accessing a particular domain.

SUMMARY

It is an object of the present invention to identify and mark client devices that are infected with malware or accessing a particular domain such that a communication service provider can detect and quarantine and/or identify those client devices that are marked as infected or accessing the particular domain and provide access to the communication network (e.g. the Internet) for those client devices that are free from infection.

According to the first aspect of the invention there is provided a method carried out by an apparatus for marking client devices infected with malware or accessing a particular domain name of interest. The method including receiving a multiplicity of domain name system (DNS) query messages from a plurality of client devices. For each received DNS query message to a malware domain name or a particular domain name, sending a marker DNS response message associated with the malware domain name or the particular domain name to the corresponding client device for use in detecting whether the client device is infected with malware or is accessing the particular domain name when the client device requests access to a communication network.

According to a second aspect of the invention there is provided a method carried out by a connection system for detecting whether client devices have been marked as infected with malware or accessing a particular domain name. The method includes receiving a connection request from a client device of the plurality of client devices for access to the communication network. On receiving the connection request, sending marker detection information to the client device for identifying whether client device is marked as infected with malware or accessing a particular domain name. Receiving an indication from the client device as to whether the client device is marked as infected with malware or has accessed a particular domain name. Determining, from the indication, whether the client device is infected with malware or accessed the particular domain name. Blocking the client device access to the communication network in relation to the connection request when the client device is determined to be infected with malware or is requesting access to the particular domain name. Granting the client device access to the communication network in relation to the connection request when the client device is determined not to be infected with malware or not to have accessed the particular domain name. Optionally, instead of blocking the client device when it is determined to have accessed a particular domain name, the identity of the client device is determined and stored in a database or list of particular domain names of interest.

The marker detection information may be based on marker DNS response message(s) associated with one or more malware domain name(s). The marker DNS response message(s) may be sent to one or more of the plurality of client device(s) in the communication network for marking those client device(s) as infected with malware that sent one or more DNS query message(s) associated with said malware domain name(s).

The invention provides the advantage of identifying client devices that are infected with malware (e.g. recruited into a botnet or spyware), those that are free from infection, or those client devices accessing particular domain names of interest (e.g. domain names of interest to law enforcement, or domain names relating to adult, terrorist, Internet pirate-type or other anti-social type websites or domain names etc). In particular, the invention provides a mechanism for identifying client devices that are infected with malware (or accessing a particular domain name) from behind a NAT and offering the opportunity to remove the malware before accessing the communications network. The invention also provides a mechanism for identifying client devices that are infected with malware or accessing a particular domain name that are not behind a NAT as well.

According to a third aspect of the invention there is provided a method carried out by a client device for detecting whether the client device is marked as infected with malware or accessing a particular domain name of interest. The method including transmitting a connection request from the client device for access to a communication network. Receiving marker detection information at the client device for identifying whether client device is marked as infected with malware or has accessed the particular domain name. Sending an indication as to whether the client device is marked as infected with malware or has accessed a particular domain name for use in determining whether to block or grant the client device access to the communication network in relation to the connection request, or determine the identity of the client device for storing in a database or list associated with the particular domain name. Optionally, marker detection information may configure the client device to store the indication on the client device as a file or web cookie when the client device is determined to be infected with malware or accessing a particular domain name. Sending an indication can then involve a connection system detecting/retrieving the web cookie to determine whether the client device is infected with malware or accessing a particular domain name.

The marker detection information may be based on marker DNS response message(s) associated with one or more malware domain name(s). The marker DNS response message(s) may be sent to one or more of the plurality of client device(s) in the communication network for marking those client device(s) as infected with malware that sent one or more DNS query message(s) associated with said malware domain name(s).

The invention further provides the advantage of identifying client devices that are infected with malware (e.g. recruited into a botnet or spyware) and those that are free from infection. In particular, the invention provides a mechanism for identifying client devices that are infected with malware behind a NAT and quarantining or restricting access to a communications network (e.g. the Internet) for the infected client devices. The client devices infected with malware can be quarantined by a connection system of a service provider while client devices that are free from infection (e.g. clean client devices), especially those behind the same NAT, may be granted access to use the communication network (e.g. the Internet).

Other optional aspects or features of the invention further provide the advantage of identifying client devices that are infected with malware (e.g. recruited into a botnet or spyware) and placing a persistent marker (e.g. a marker that remains on the client device after it has been rebooted, turned off then on again such as a web cookie, particular picture or file stored in non-volatile memory of the client device) on the infected client devices so that they may be quarantined when connection requests from the marked client devices are detected. Further advantages include identifying both infected client devices and those free from infection. In particular, the invention provides a mechanism for identifying client devices that are infected with malware behind a NAT and quarantining or restricting access to a communications network (e.g. the Internet) for the infected client devices. The client devices infected with malware can be quarantined by a connection system of a service provider while client devices that are free from infection (e.g. clean client devices), especially those behind the same NAT, may be granted access to use the communication network (e.g. the Internet). Client devices that are infected with malware behind a NAT can have the opportunity to remove the malware before accessing the communications network.

According to a fourth aspect of the invention, there is provided a method carried out by an apparatus for marking client devices accessing domain names. The method includes detecting a DNS query message from a client device including a domain name from a list of domain names. Identifying a DNS response message corresponding to the detected DNS query message, the DNS response message including a DNS record including the IP address corresponding to the domain name. Modifying the DNS response message to form a marker DNS response message further including the DNS response message and marker information associated with the domain name. Sending the marker DNS response message to the client device for use in detecting whether the client device has accessed the domain name when the client device requests access to a communication network.

As an option, modifying the DNS response message may further include a TTL value for the DNS record for the domain name to be substantially larger than the original TTL value of the DNS record. Sending the marker DNS response message to the client device in place of the original DNS response message. Optionally, the TTL value for the DNS record is sufficiently large enough to ensure the DNS record is still in the DNS cache when the client device attempts to access the communication network.

According to a fifth aspect of the invention there is provided a method carried out by a connection system for detecting whether a client device is marked as accessing a particular domain name form a list of domain names. The method includes receiving a connection request from the client device of the plurality of client devices for access to a communication network. Sending marker detection information associated with the particular domain name to the client device for identifying whether client device accessed the particular domain name. Receiving an indication from the client device as to whether the client device has accessed the particular domain name. Determining, from the indication, whether the client device has accessed the particular domain name. Identifying the client device to be marked as accessing the particular domain name associated with the marker detection information when it is determined the client device downloaded the marker resource. The indication may be in the form of a web cookie or file or other data stored on the client device and accessed/retrieved by the connection system.

The invention further provides the advantage of identifying client devices that have accessed a domain name from a list of domain names and marking the identified client devices accordingly. In which a connection system may detect the marker and identify the client device as accessing a particular domain name corresponding to the marked.

Further aspects of the invention provide apparatus, connection system(s), client device(s). and computer readable medium(s) comprising program instructions, which when executed on a processor, perform the methods described herein as set forth in the appended claims. Further features of the invention are outlined in below and in the appended claims. Preferred features are set out in the dependent claims.

BRIEF DESCRIPTION OF THE DRAWINGS

Some examples or embodiments of the invention will now be described by way of example only and with reference to the accompanying drawings, in which:

FIG. 3b is a flow diagram illustrating a procedure carried out by the apparatus or a connection system for detecting client devices that have been marked according to FIG. 3a;

FIG. 6a is a schematic diagram illustrating an example apparatus according to the invention; and FIG. 6b is a schematic diagram illustrating an example connection system according to the invention.

DETAILED DESCRIPTION

Figure 1A:
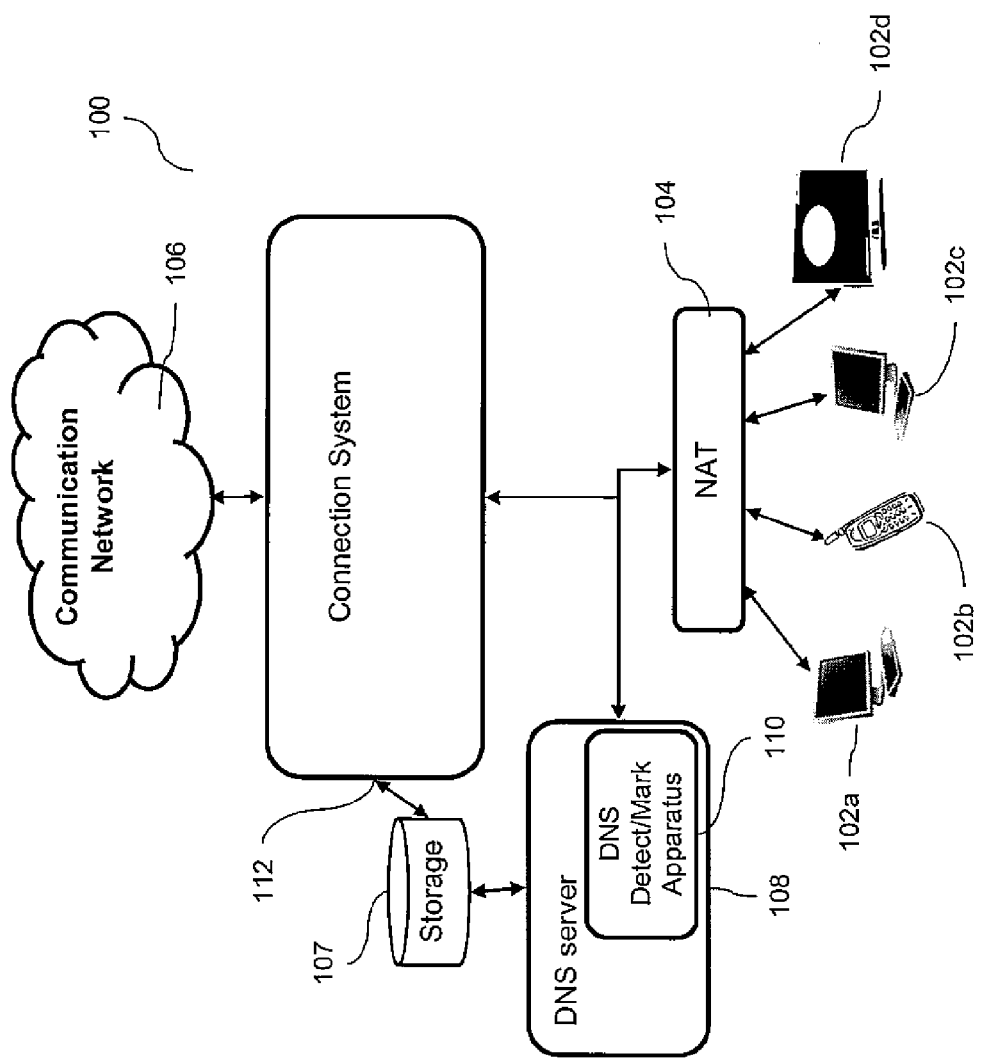
FIG. 1a is a schematic diagram illustrating a service provider system in a communications network for use in marking client devices with malware and blocking access to the marked client device(s)

As discussed above, present approaches for detecting botnets and their nodes (recruited client devices) and/or other malware can be complex to implement, especially when the infected client devices are behind a network address translator (NAT). In addition, present approaches for detecting client devices accessing a particular domain name can also be complex to implement. Monitoring large amounts of network traffic in this way is complex and requires a great deal of processing power to be carried out, often at great expense to the entity responsible for the botnet detection system or the system for detecting and identifying the clients accessing the particular domain.

It is proposed herein that these problems can be addressed by an apparatus that can temporally mark a client device of a plurality of client devices behind a NAT that is infected with malware or accessing a particular domain name of interest such that a connection system and/or a malware removal tool can simply determine the client device is marked as infected or accessing the particular domain name by checking for the presence of a marker stored in the client device. A temporal marker is a marker that is stored on the client device for a period of time, when the period of time expires the marker may be removed. A temporal marker may be stored in volatile memory of the client device, the period of time may be when the client device is turned off or the volatile memory is cleared. Domain Name System queries and responses are an efficient way for temporally marking client devices that access particular domain names such as malware domain names, which can indicate the client device is infected with malware or has been accessing a particular domain name of interest.

For the sake of simplicity, the following examples are described for client devices accessing a particular domain name that is a malware domain name. It is to be appreciated by the person skilled in the art that the following description may be adapted for detecting and marking client devices accessing a particular domain name of interest (e.g. an adult domain name, an internet pirate domain name, a terrorist domain name, or other anti-social, illegal or unsavoury domain name or domain name of interest).

An apparatus receives and identifies a multiplicity of DNS queries (or DNS query messages) from a plurality of client devices. For each received DNS query message to a malicious domain name, for example some botnet domain or malware domain (e.g. "botnetdomain.com" or "malwaredomain.com"). Each DNS query will result in a DNS response message to the corresponding client device. The DNS response message includes, among other things, a mapping between the queried domain name and the Internet Protocol address of the domain name. For malware domain names, instead of the actual DNS response message including the malware domain name and the actual IP address of the malware domain name, the apparatus sends a marker DNS response message (or a modified DNS response) associated with the malicious domain name to the corresponding client device for use, by a connection system or malware removal tool, in detecting whether the client device is marked as infected with malware when the client device requests access to a communication network (e.g. the Internet).

The marker DNS response message includes one or more marker DNS records associated with the malware domain name and which include marker detection information or marker information. On receipt of the marker DNS response message, the client device treats the marker DNS response message as it would any normal DNS response message and stores the marker DNS record and associated marker detection information in a DNS cache on the client device. When a client device that is marked as infected with malware attempts to access or connect to a communication network via a connection system (e.g. an Internet Service Provider connection system for connecting client devices (subscribers) to the Internet), the connection system may provide the client device with at least a portion of the marker detection information during the connection attempt and analyse the client device's responses to the provided marker detection information to determine whether it is infected with malware. Examples of marker detection information and the use in marker DNS response messages are now provided.

Marker detection information or marker information may take the form of any of the modifiable data within a DNS response message. For example, a DNS response message includes one or more DNS records that include the domain name, an IP address associated with the domain name and a time-to-live value (TTL) such that one or more of these may be used as marker detection information.

For example, the apparatus may intercept the original DNS response and modifies the time-to-live (TTL) value of the malware DNS record corresponding to the malware or botnet domain from some small default value (e.g. usually less than 60 seconds) to a substantially large value in the order of, by way of example, one or more hour(s), one or more day(s), one or more month(s), or one or more year(s). The modified DNS response is the marker DNS response, where the marker detection information is the modified TTL value. The modified TTL value should be sufficiently large such that the malware DNS record is not removed from the DNS cache by the time the client device makes a connection request or connection attempt to the communications network. The marker DNS response (or modified DNS response) is then forwarded to the client device, where the modified malware DNS record is the marker DNS record that is stored in the DNS cache for a period of time corresponding to the modified TTL value (marker detection information). The malware DNS record with the unusually long TTL value acts as a marker. This means the malware/botnet domain name to IP address resolution result is stored in infected machine's DNS cache for one or more months. References for that domain won't generate DNS queries to network until device has been rebooted or 1 month has elapsed.

Alternatively or additionally, the marker DNS response message may include the original DNS response message and an additional DNS record set by the apparatus such as a marker DNS record including a marker domain name and a marker IP address, which may be stored in a DNS cache of the client device when it receives the marker DNS response message instead of the original DNS response message. Alternatively or additionally, a DNS record may be modified to include the malware domain name and a marker IP address instead of the malware IP address. The marker IP address may be generated by the apparatus or selected from a pool of marker IP addresses. Data representative of the malware domain name and the marker IP address is stored in a database. Each malware domain and corresponding marker IP address is called a mapping. Each mapping may have a different marker IP address to all other mappings stored in the database i.e. all marker IP addresses stored in the database are unique. Alternatively, all the mappings associated with each malware domain name that is stored in the database may be different or unique, which means that marker IP addresses for a malware domain name may be reused for other malware domain names. This still ensures all mappings stored in the database are different and unique. Combinations of these techniques may be used for indirectly supplying the client device with marker information for detection when the client device subsequently accesses the communication network.

The apparatus may be part of an inline detection system, or part of a DNS server, or part of a connection system used by client devices for connecting to the communications network (e.g. a connection system of an ISP) or a communication service providers system.

When the connection system and/or communication service provider system (e.g. an Internet Service Provider (ISP)) of the client device sees or detects a connection request message (or connection request) for accessing a communication network (e.g. the Internet) it will connect the client device to a closed platform or a walled garden system. The connection requests or messages may comprise messages/packets sent for setting up, by way of example only, a TCP or UDP connection with a server or the connection system. Although TCP and UDP protocols are briefly described herein, by way of example only, it is to be appreciated by the person skilled in the art that connections and/or connection requests/attempts may be set-up and/or made in any standard or proprietary IP based communication protocol (e.g. any of the IP protocols that may be associated with the Protocol field of Internet Protocol version 4 header or with the Next Header of IPv6 header) or any other suitable communication protocol for enabling the invention in which TCP and UDP are but two of the many possible suitable communication protocols.

Walled garden network connections can be severely restricted and the client device is not allowed to connect to the wider communication network (e.g. the Internet) until after the connection system has determined that the client device is clean. Assuming the client device has been marked as described such that its DNS cache may include marker information associated with a malware domain name, the connection system may receive a TCP connection request from the client device (which can be one of a plurality of client devices behind a NAT) for accessing a communication location, device, entity or server in the communications network. However, in response to the connection request, the connection system may redirect the client device to the closed platform or walled garden and instead send the client device marker detection information based on the marker DNS response messages (and marker information therein) that may have been sent to a multiplicity of client devices.

The marker detection information may include information or configuration information (e.g. parameters, attributes and/or executable code such as JavaScript® or other scripting language) for use in detecting whether the client device has any marker information associated with a malware domain that has been stored on the client device, i.e. in the DNS cache of the client device. The marker detection information may configure the client device, or an application on the client device, to respond by providing or sending the connection system one or more malware response message(s) or indications in relation to the marker detection information. The indications may be a web cookie stored on the client device with data representative of the client device being infected with malware. The connection system may then determine, from the messages or indications, whether the client device is marked as infected with malware. The client device may be blocked access to the communication network in relation to the connection request when the client device is determined to be infected with malware. Instead, the client device may be granted access to the communication network in relation to the connection request when the client device is determined not to be infected with malware. The connection system may operate similarly for detecting whether the client device has been or has not been accessing a particular domain name.

Another example for a connection system to detecting whether a client device has been temporally marked as infected is using a timing analysis based on an estimate of the DNS cache hit time and/or DNS cache miss time of the client device. The DNS cache hit time may be the round trip time for making a connection attempt to a known domain name (i.e. the domain name is in the DNS cache of the client device) and receiving a response to the connection attempt from the connection system. The DNS cache miss time may be the time take for the client device to send a DNS query to an unknown domain name, receive a DNS response to the domain name, and the round trip time for making a connection attempt to the domain name and receiving a response to the connection attempt from the connection system When a client device makes a connection request to the connection system, the connection system sends the client device marker detection information. The marker detection information may configure the client device to determine an estimate of the DNS cache hit time and/or an estimate the DNS cache miss time, and/or identify whether the client device is infected with malware or not based on the estimated DNS cache hit and/or miss times. Once the DNS cache hit times and miss times are estimated and known to the client device, the client device is ready to identify whether it is infected with malware. The malware domain names may be based on information in the marker detection information. The client device attempts to connect to all of the malware domain names and determines the connection time taken for each connection attempt. The client device is determined to be infected with malware when the connection time taken for a connection attempt corresponds to the estimated DNS cache hit time. Conversely, the client device is determined not to be infected with malware when all of the connection attempts each have a connection time that corresponds or is substantially larger than the DNS cache miss time. When the client device is infected with malware, a web cookie may be set on the client device to allow the connection system to determine whether the client device is infected with malware. Client devices that are determined to be infected with malware are blocked from accessing the communication network, while clean client devices may access the communication network.

As another example, when the connection system and/or communication service provider system (e.g. an Internet Service Provider (ISP)) of the client device sees or detects a DNS query for some malicious domain or a connection request message (or connection request) for some malicious domain it will connect the client device to a closed platform or a walled garden system. In a closed platform or walled garden, all network traffic (e.g. web traffic) from the client device is forwarded to a default ISP controlled web page, where the user of the client device can download a malware removal tool. The malware removal tool, when executed on the client device, can then check the content of DNS cache of the client device for the existence of one or more malicious botnet domains. If these are found, then the malware removal tool or the client device may report to the apparatus or the ISP that an infection with botnet or other malware was found and the current status of the client device (e.g. that the malware removal tool was successful in removing the malware and the client device can now be regarded as clean). The client device can be moved out of the closed platform or walled garden system and allowed to connect and pass network traffic to the wider communication network or Internet.

Another example solution that is also proposed herein that addresses the above problems further extends the temporally marking solution by marking the client device that is infected with malware with a persistent marker. A persistent marker is a marker that is stored on non-volatile storage medium on the client device, which when stored, remains stored on the client device indefinitely even after the client device has been rebooted, turned off then on again. There is no particular time limit for how long a persistent marker needs to be stored on the client device. Of course, the marker may be removed by the user or the client device deleting the data, e.g. a persistent marker may be stored in a web browser cache, and remains there until the web browser clears the cache, the cache is still stored on a non-volatile storage medium. In addition to modifying the TTL values for DNS responses corresponding to DNS queries for some botnet or malware domain, the apparatus may additionally or alternatively modify the DNS response by including an additional DNS record, even though the client device did not request it. This additional DNS record includes a marker domain (or marker domain name) that points to a marker IP address corresponding to a controlled website or server (e.g. "markerdomain.f-secure.com" or "marker.isp.com" and IP address "w.x.y.z"). The controlled website or server with the marker domain name may be called a marker server, which can be used for detecting infected client devices behind the NAT. The TTL value for the additional DNS record is also of the order of one or more months (e.g. 1 month). This means the marker domain name to marker IP address resolution result is only stored in DNS cache of the infected client device for a period of time corresponding to the marker TTL value (e.g. 1 month).

It is assumed for this solution that the additional DNS record including the marker domain and marker IP address may be stored in a DNS cache of the client device such that the marker domain is resolvable when applications on the client device, such as web browsers, query the DNS cache of the client device in relation to the marker domain. On receiving the DNS query, the DNS cache of the client device resolves the DNS query and responds to the application with the marker domain and the corresponding marker IP address. The DNS cache on the client device may be the operating system DNS cache or even a DNS cache for an application such as a web browser and the like. This means that references for the marker domain name will not generate any DNS queries to the communication network until the client device has either been rebooted or the time period has elapsed. All client devices behind a NAT that have been infected with a botnet or other malware may be marked (temporally marked) in this way.

However, if the DNS cache on the client device does not store the additional DNS record such that it is not fully resolvable, the client device may be configured to resolve the additional DNS record associated with the marker domain name by reference to the malware domain name associated with the marker resource or marker domain name.

The marker domain and the marker IP address are assumed not to be known by any DNS server that is at least inaccessible to DNS queries from one or more of a multiplicity of client devices behind the NAT or even the communication service provider (e.g. the ISP). If no DNS server can resolve the marker domain and marker IP address then any clean client device behind the NAT is also unable to resolve the marker domain or marker IP address. This property is exploited to allow the connection system or communication servicer provider to detect client devices behind the NAT that are marked as infected with a botnet or other malware.

By way of example only, the connection system (or communication service provider system) may be configured such that when a client device behind a NAT sends a connection request (or connection request message) to the connection system for access to the communications network, prior to allowing access to the client device, the client device is provided with the marker domain name for use in downloading and storing one or more persistent markers called marker resource(s).

The marker resource(s) may comprise or represent any data that can be used as a persistent marker on a client device. Examples of marker resources that may be used in certain embodiments of the invention may include, but are not limited to, pictures, movies, music, style sheets, cookie, icons, executable code (e.g. JavaScript or any other script) or any other file or data that may be stored on the client device and used to indicate the client device has been marked. The marker resource may be used to identify the type of malware infecting the client device, and/or provide an indication to the client device that of the malware infection. The marker resource may also comprise a self executing malware removal tool for removing the malware infection from the client device; of course the marker resource would then need to remove itself so that the client device, when clean, is no longer marked as infected. If is not possible to store a marker resource of any kind (e.g. a cookie or data file) on the client device (e.g. malware is preventing storage, or the client device settings restricting downloading of resources such as marker resource(s)), as a fallback rule, the client device should stay in the walled garden. As the user of the client device may be unaware of the possible malware infection, they may be contacted via other clean devices detected to be behind a NAT, or via email or a service call that the client device is possibly infected. Most clean client devices should, in general, not try to prevent storage of a marker resource. The marker resource is typically stored on non-volatile storage medium on the client device, e.g. hard disk drive, flash drive, or any other storage.

Only infected client devices that have been marked (i.e. have the marker domain name and marker IP address in their DNS cache) will be able to resolve the marker domain name and download one or more of the marker resources. This download can be detected by the connection system, and the connection system then blocks the infected client device access to the communication network in relation to the connection request. Should the connection system detect a client device making a DNS query to the marker domain name, then it is determined this client device is not infected and is a clean client device. The clean client device may be granted access to the communication network in relation to its connection request.

For example, the user of a client device behind the NAT may use an application such as a web browser on the client device, when the web browser (i.e. the client device) sends a connection request (or connection request message) for access to the communication network (e.g. to the Internet or world wide web) it is directed to a walled garden website (e.g. "walledgarden.isp.com"). The walled garden website has one or more links pointing to one or more marker resources (e.g. a css style sheet file like marker.css or a picture such as marker.png) in the controlled domain website or on a server (e.g. "markerdomain.f-secure.com"). Only infected client devices that have been marked (i.e. have the marker domain or marker IP address in their DNS cache) will be able to resolve the one or more links pointing to the one or more marker resources.

The infected and marked client devices will download the marker resource(s) associated with the controlled domain website, which will be stored, by way of example only, in the web browser cache of the infected client device. The marker resource(s) now act as a persistent marker indicating the client device is infected with a botnet or other malware. Even if the client device is rebooted, switched off, or the DNS cache cleared, the persistent marker will still remain. Clean client devices will not have been marked so cannot resolve the marker domain to marker IP address and cannot download the marker resource(s). This means only infected client devices that have been marked will have the marker resource(s) in their browser cache. The marker resource(s) can later be used, with locally executed malware removal tool, to identify infected client devices from clean client devices.

This means that the connection system or communication service provider can detect which connection requests or connection request messages (e.g. requests for TCP connections) for access to the communication network are by clean client devices and which are by infected client devices. By directing all client devices to the controlled website or server, then the clean client devices behind a NAT are detected as the client device connections that are making DNS queries in response to trying to resolve the marker links to the marker resources. Therefore, when a DNS query to a marker resource is detected, that client device is regarded as clean and is allowed to access the wider communication network. The clean client devices may be provided temporary passwords (e.g. passwords only for each TCP connection the client device is connecting through) to access the wider communication network (e.g. the Internet). However, client device connections that are detected to either download the marker resources from the marker website or server or have already downloaded the marker resources and do not make any DNS queries are kept in the closed platform or walled garden and prevented from accessing the communication network or Internet until they are cleaned, e.g. by executing a malware removal tool, which may be provided via the controlled website. Only when the infected devices are clean will they be allowed a connection to the wider communication network or the Internet.

In essence, methods, apparatus and connection systems are described herein for use in detecting and marking client devices that are infected with malware for use in quarantining/restricting access to a communication network and/or cleaning said infected client devices accordingly. The client devices that make DNS queries to malware domain names are detected and the corresponding DNS response is intercepted and modified to include a DNS record including a marker server domain name and marker IP address, which are stored on the client device. The TTL value of the DNS record is sufficiently large enough to ensure it is not automatically deleted before the client device attempts to connect to the communications network. When the client device attempts to connect to the communication network, prior to allowing the connection, a connection system provides the client device with a marker resource and the marker server domain name. Client devices that make DNS queries to the marker server domain name are determined to be clean and granted access to the communication network, while client devices that download the marker resource are determined to be infected with malware and are blocked from accessing the communication network until the malware is removed. The methods, apparatus and connection systems are described herein are useful for detecting and marking client devices behind a NAT or similar device (e.g. Wi-Fi router, gateway or proxy server) that are infected with malware and quarantining/cleaning these client devices accordingly.

FIG. 1a is a schematic illustration of a communication service provider system 100 providing a multiplicity of client devices 102a-102d behind a NAT 104 (e.g. a Wi-Fi router or gateway) with connections to a communication network 106 (e.g. the Internet). The communication service provider system 100 includes a DNS server 108, a storage facility or database 107, a DNS detection/marking apparatus 110, and a connection system 112 (e.g. a closed platform or a walled garden system) which are communicatively coupled together. The connection system 112 may be used for connecting client devices 102a-102d or applications thereof to the communication network 106. In this example, client device 102a is a computer, client device 102b is a mobile phone with Wi-Fi access, client device 102c is another computer, and client device 102d is an Internet capable TV or set top box.

The client devices 102a-102d may be implemented as a combination of hardware and software. For example, a client device 102a may include a memory, a processor and a transceiver. The memory stores the various applications/programs/executable files that are implemented by the processor, and also provides a storage unit for any required data. The applications/programs/executable files stored in the memory, and implemented by the processor, may make connection requests for use in setting up connections via connection system 112 and accessing the communications network 106. These connection requests are received by the connection system 112 and, for each connection request; a connection may be granted or set up so that the corresponding application or client device may access the communication network 106. Such applications may include web browsers, multi-media applications, internet chat programs, social networking applications, anti-virus programs or any other application executing on a client device 102a-102d that requires access to the communication network 106. The transceiver of the client device 102a-102d is used to communicate with the connection system 112 via NAT 104 e.g. for setting up connections (e.g. TCP connections) by sending connection requests to the connection system 112. Each client device 102a-102d may generate a multiplicity of connections with the connection system 112 for accessing the communication network, e.g. each application may require one or more TCP connections that provide the application access to the communication network 106. For simplicity, as there can be a multiplicity of applications for each client device making one or more connections or connection requests to the connection system 112, a connection requests and the resulting connections or access (e.g. TCP connection) are referred to as a connection request from the client device for access to the communication network.

In operation, the DNS detection/marking apparatus 110 is configured for detecting malware such as botnets and/or other malicious activity/infection by monitoring DNS traffic from the client devices 102a-102d. The apparatus 110 detects and identifies DNS queries from client devices 102a-102d that include a malware domain name (e.g. for a botnet this may be "botnetdomain.com" or for other malware this may be "malware domain.com"), the DNS response(s) corresponding to the detected DNS queries can be intercepted by the apparatus 110. Each DNS response that is intercepted will include a malware DNS record comprising an IP address corresponding to the malware domain name and a TTL value. For example, if client device 102a is infected with malware such as a botnet, then the DNS record for client device 102a will be detected and modified.

The apparatus 110 derives a marker IP address in relation to the malware domain name. The database 107 is used to store data representative of each malware domain name and one or more different marker IP addresses assigned by apparatus 110 for that malware domain name. Each malware domain and corresponding marker IP address is called a mapping. The mappings are stored in the database 107. Although each mapping may have a different marker IP address to all other mappings stored in the database 107, this provides the advantage that all mappings are unique because all marker IP addresses are different or unique. However, this may result in issues related to generating/selecting enough marker IP addresses that are different for each mapping. At the very least, all the mappings associated with each malware domain name that is stored in the database 107 are different or unique. This means that marker IP addresses for a malware domain name may be reused for other malware domain names, thus ensuring all mappings stored in the database 107 are different. It is essential that the database 107 does not contain the same mapping between a malware domain name and a marker IP address.

As an example, the following table shows possible mappings that may be stored in database 107 for two example malware domain names, malware.com and malware1.com.

TABLE 1

Re-use of marker IP addresses between malware domain names

| Mapping ID | Malware Domain Name | Marker IP Address |
| --- | --- | --- |
| 1 | malware.com | 1.2.3.4 |
| 2 | malware.com | 1.2.3.5 |
| 3 | malware1.com | 1.2.3.4 |
| 4 | malware1.com | 1.2.3.5 |
| 5 | malware1.com | 1.2.3.6 |

As can be seen in Table 1, mapping IDs 1 and 2 are associated with malware.com and mapping IDs 3-4 are associated with malware1.com. Each malware domain name has different marker IP addresses. Although both malware domain names share some of the same marker IP addresses, it is ensured that all mappings in stored in database 107 are different.

As another example, the following table shows possible mappings that may be stored in database 107 for two example malware domain names, malware.com and malware1.com.

TABLE 1

Different marker IP address assigned to all malware domain names

| Mapping ID | Malware Domain Name | Marker IP Address |
| --- | --- | --- |
| 1 | malware.com | 1.2.3.4 |
| 2 | malware.com | 1.2.3.5 |
| 3 | malware1.com | 1.2.3.6 |
| 4 | malware1.com | 1.2.3.7 |
| 5 | malware1.com | 1.2.3.8 |

As can be seen in Table 1, mapping IDs 1 and 2 are associated with malware.com and mapping IDs 3-4 are associated with malware1.com. Different marker IP addresses have been assigned to each malware domain name, also ensuring all the mappings in the database 107 are different.

The apparatus 110 may, by way of example only, derive the marker IP address by generating the marker IP address based on a calculation e.g. a pseudorandom algorithm, or by selecting an IP address from a pool of IP addresses ensuring each selected IP address is different to previously selected IP addresses that have been stored in database 107 in relation to the malware domain name. Once a mapping is removed from the database in relation to a malware domain name, the IP address associated with that mapping may be reused. In the extreme, each derived, generated or selected marker IP address may be different to all previously stored marker IP addresses—i.e. each marker IP address may actually be unique. In essence, the derived marker IP address and malware domain name form a mapping that is stored in database 107 for use in identifying whether the client devices 102a-102d are marked as infected or not. The apparatus 110 stores each mapping between a derived or generated marker IP address and the malware domain in database 107. The database 107 does not contain the same mapping between a malware domain name and a marker IP address.

The malware DNS record is then modified by replacing the malware IP address with the marker IP address derived by apparatus 110. In addition, the TTL value of the malware DNS record may be further modified to be substantially greater than the original TTL value. For example, the TTL value may be set to be in the order of one or more month(s) to a year (or more). This ensures the modified malware DNS record will be stored in the client device 102a until the client device 102a sends a connection request to access the communication network 106, at which time, the modified malware DNS record can be used to identify whether the client device 102a is marked as infected with malware. The modified DNS response message is now considered to be a marker DNS response message as it contains marker information, the marker DNS response message is sent to the infected client device 102a in place of the original DNS response message. The client device 102a stores the modified malware DNS record in its DNS cache. In this way, the client device 102a has been marked by the modified malware DNS record with a longer than normal TTL value. This means that the malware DNS record in the client device 102a will most likely still be in the DNS cache of the client device 102a when the user or an application on the client device 102a accesses the communication network 106 via the connection system 112.

It is to be noted that since the client devices 102a-102d are behind a NAT 104 the connection system 112 (and the communication service provider) cannot reliably identify which client device 102a-102d may be infected with malware and only block that client device from connecting to the communication network 106. This is because the NAT 104 reallocates IP addresses to the client devices 102a-102d depending on when they are rebooted and connected to the NAT 104 for access to communication network 106. It may also be that the NAT 104 simply hides all of the actual client device IP addresses and provides the connection system 112 with the IP address of the NAT 104 for all client devices 102a-102d behind NAT 104.

The invention overcomes this problem by having the connection system 112 detect whether the connection or connection request (e.g. a TCP connection and port) associated with a client device 102a-102d indicates whether the corresponding client device 102a-102d is infected with malware and if so, the connection system 112 can verify this depending on whether marker information has been placed on infected client devices behind NAT 104 by DNS detection/marker apparatus 110.

The connection system 112 is configured to direct all connection requests/access attempts to communication network 106 from client devices 102a-102d to a closed platform or walled garden, i.e. a controlled environment within the connection system 112 that can control how access to the communication network 106 is provided to client devices 102a-102d, e.g. restrict/block/grant communication network access. For each connection request from the client devices 102a-102d, the connection system 112 reads the database 107 to derive a snapshot of the malware domain names and their associated mappings stored on the database 107 at the particular time this information is read, say time T1. The connection system 112 determines the malware domain names on the list and generates marker detection information for use in instructing/configuring the client device 102a to attempt to connect to the determined malware domain names. The marker detection information may be based on instructions (e.g. JavaScript) and sent to the client device 102a such that the web browser on the client device 102a is directed to attempt to connect to each of the determined malware domain names.

If the client device 102a is infected with malware, then it will have previously sent a DNS query to the malware domain name and apparatus 110 will have provided the client device 102a with a marker DNS response message including the malware domain name and marker IP address, which is also stored in database 107 as a unique mapping. This mapping will have been read from the database 107 and the connection system 112 will have sent the client device 102a marker detection information to instruct/configure the client device 102a or an application such as a web browser on the client device 102a to connect to all previously stored malware domain names, including the malware domain name associated with the DNS query by client device 102a. This means that the client device 102a should still have the malware domain name and marker IP address in its DNS cache, so when client device 102a attempts to connect to this malware domain name the DNS cache will return the marker IP address stored therein. The client device 102a then sends an indication of the IP address used to access this malware domain name, which is the marker IP address, such that the connection system 112 can match the IP address used by the client device 102a when connecting to this malware domain name with the previously stored mapping. This means the client device 102a is infected with malware. The connection request in relation to this client device 102a is blocked until the malware is removed from client device 102a.

Clean client devices 102b-102d will not have received any marker DNS response messages, and so will not have any of the malware domain names in their DNS caches associated with the marker detection information. Instead, the clean client devices 102b-102d will place further DNS queries to determine the location of the malware domain names, and will therefore receive marker DNS responses, each of which will be associated with a new mapping stored in database 107. These new mappings are stored in the database 107 after the connection system 112 read the previously stored mappings from the database 107 to generate the marker detection information for each client device 102b-102d. However, when the indication of the IP addresses the clean client devices 102b-102d used in their attempts to connect to the malware domain names is received by the connection system 112, none of these IP addresses and corresponding malware domain names will match any of the previously stored mappings. This indicates the client devices 102b-102d are clean and not infected with malware. The connection system 112 may grant access to these client devices 102b-102d in relation to their connection requests. The clean client devices 102b-102d may exit the walled garden and be granted a connection/access to the communication network 106.

But, the connection requests/connections associated with the infected client devices, e.g. client device 102a, are identified and may be prevented or blocked from connecting to/accessing the communications network 106. The client devices 102a are quarantined within the walled garden until they have been cleaned of malware infection. To further prevent the infected client devices a connection to the communications network 106, each of the connections associated with the clean client devices 102b-102d may be provided a password that is used by the connection system 112 in granting access to allow the clean client devices 102b-102d access to the communication network 106.

Figure 1B:
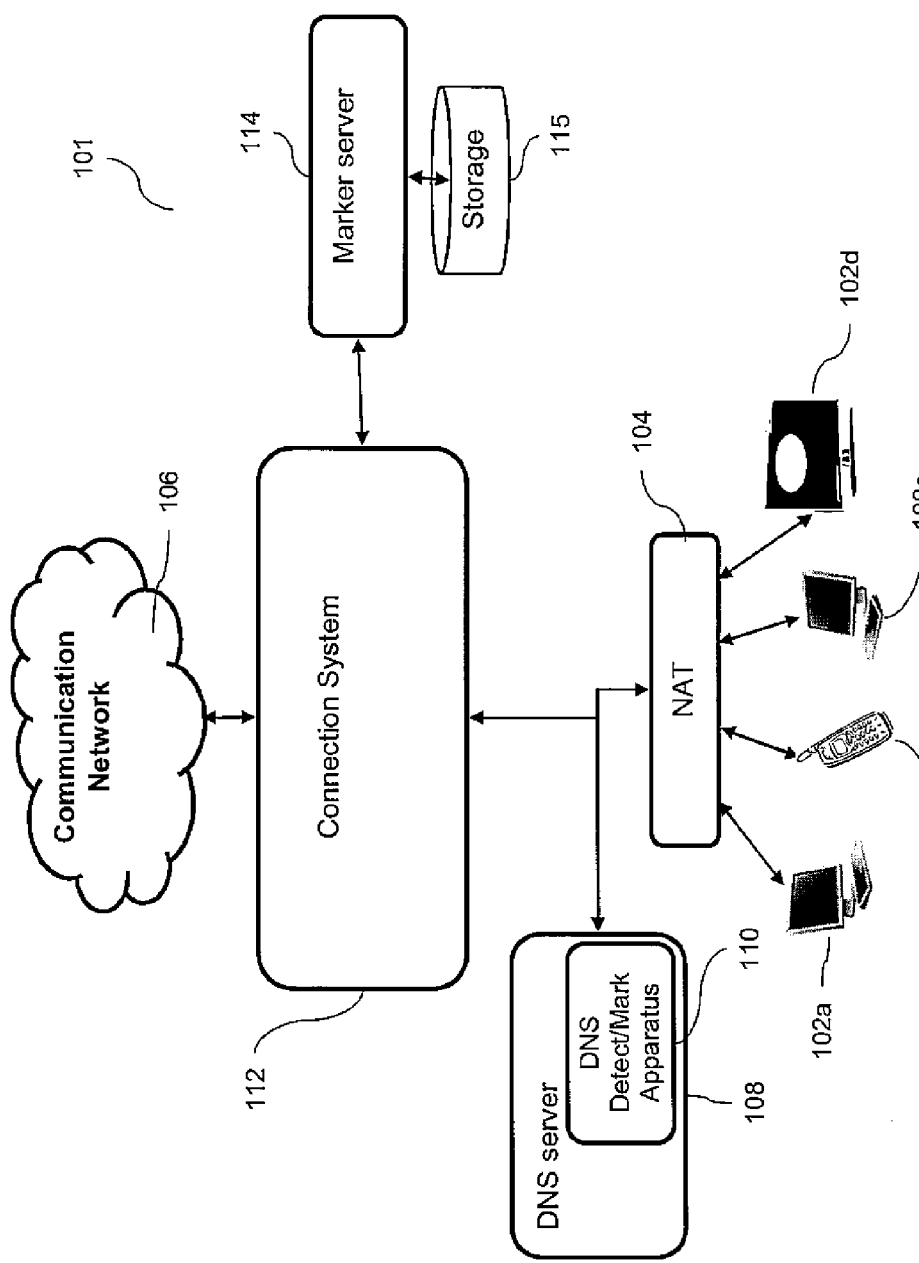
FIG. 1b is a schematic diagram illustrating a service provider system in a communications network for use in marking client devices with malware and blocking access to the marked client device(s)

FIG. 1b is a schematic illustration of another communication service provider system 101 providing a multiplicity of client devices 102a-102d behind a NAT 104 (e.g. a Wi-Fi router or gateway) with connections to a communication network 106 (e.g. the Internet). For simplicity, the same reference numerals used in FIG. 1a are reused to identify the same or similar components, apparatus, connection systems, client devices, network nodes and elements. The communication service provider system 101 includes a DNS server 108, a DNS detection/marking apparatus 110, and a connection system 112 (e.g. a closed platform or a walled garden system) which are communicatively coupled together. The connection system 112 may be used for connecting client devices 102a-102d or applications thereof to the communication network 106. In some embodiments of the invention, the communication service provider system 101 may further include one or more marker server(s) 114 that includes storage 115 for one or more marker resource(s) (not shown). In this example, client device 102a is a computer, client device 102b is a mobile phone with Wi-Fi access, client device 102c is another computer, and client device 102d is an Internet capable TV or set top box.

In operation, the DNS detection/marking apparatus 110 is configured for detecting botnets and/or other malware by monitoring DNS traffic from the client devices 102a-102d. The apparatus 110 detects and identifies DNS queries from client devices 102a-102d that include a malware domain name (e.g. for a botnet this may be "botnetdomain.com" or for other malware this may be "malware domain.com"), the DNS response(s) corresponding to the detected DNS queries can be intercepted by the apparatus 110. Each DNS response that is intercepted will include a malware DNS record comprising an IP address corresponding to the malware domain name and a TTL value. For example, if client device 102a is infected with malware such as a botnet, then the DNS record for client device 102a will be detected and modified. The malware DNS record is modified by setting the TTL value to be substantially greater than the original TTL value. For example, the TTL value may be set to be in the order of one or more month(s) to a year (or more). The modified DNS response message is sent to the infected client device 102a in place of the original DNS response message. The client device 102a stores the malware DNS record in its DNS cache. In this way, the client device 102a has been marked by a malware DNS record with a longer than normal TTL. This means that the malware DNS record in the client device 102a will most likely still be in the DNS cache of the client device 102a when the user or an application on the client device 102a accesses the communication network 106 via the connection system 112. This assists a malware removal tool in identifying that the client device 102a is infected with malware.

Subsequently, connection system 112 may detect and confirm whether the client device 102a is marked as infected with malware. It is to be noted that since the client devices 102a-102d are behind a NAT 104 the connection system 112 (and the communication service provider) cannot reliably identify which client device 102a-102d may be infected with malware and only block that client device from connecting to the communication network 106. This is because the NAT 104 can reallocate IP addresses to the client devices 102a-102d depending on when they are rebooted and connected to the NAT 104 for access to communication network 106. It may also be that the NAT 104 simply hides all of the actual client device IP addresses and provides the connection system 112 with the IP address of the NAT 104 for all client devices 102a-102d behind NAT 104.

The invention overcomes this problem by having the connection system 112 detect whether the connection or connection request (e.g. a TCP connection and port) associated with a client device 102a-102d indicates whether the corresponding client device 102a-102d is infected with malware and if so, the connection system 112 can verify this depending on whether a temporal marker has been placed on infected client devices behind NAT 104 by DNS detection/marker apparatus 110. When the connection system 112 receives a connection/access request (e.g. a TCP connection via a port) from client device 102a, if destination address of the connection request is associated or suspected of being associated with a malware domain name and/or malware IP address, the connection system 112 blocks the client device 102a from accessing the communication network 106 in relation to the connection request, and so may be kept within a closed platform or walled garden. A closed platform or a walled garden is a controlled environment within the connection system 112 that can restrict or block communication network access to a client device 102a-102d. The connection system 112 controls which client device 102a-102d can exit the controlled environment or be granted access to the communication network 106. As client device 102a is determined to be infected, it is prevented from accessing the communication network 106 and may instead be provided with a malware removal tool. For example, the client device 102a may be provided with access to a web page from a server in the closed platform or walled garden for use in downloading a malware removal tool. The malware removal tool may be configured for checking the DNS cache of the client device 102a for the malware domain name and/or malware IP address. As the TTL of the malware DNS record is substantially longer than normal, it is highly likely that the malware DNS record is still in the DNS cache of the client device 102a, in which case the malware removal tool can quickly detect the client device 102a is infected with malware and proceed to remove the malware. The connection system 112 may then receive a status report from client device 102a, e.g. via the malware removal tool, as to whether or not the infected client device 102a was infected and, if so, whether it has been cleaned. Once the connection system 112 has verified client device 102a is clean, the client device 102a may be allowed to exit the walled garden and access the communication network 106.

In another example solution, the above connection system 112 may include the functionality of placing persistent markers on client devices 102a-102d that are infected with malware such as botnets and or other malware. This solution provides the further advantage that even if the DNS cache on a marked client device 102a is cleared, the client device 102a will still include a marker that indicates it is still infected. The connection system 112 can then reliably identify the connections that are associated with infected client devices 102a-102d behind NAT 104 and the clean client devices 102a-102d behind NAT 104. The idea is that clean client devices will generate more DNS queries than infected client devices that have been marked with a persistent marker. It assumed that there is not any DNS server that can resolve the marker domain name DNS query; this is used for distinguishing clean client devices from the infected client devices.

In addition or alternatively, to the above-mentioned procedures performed by DNS detection/marking apparatus 110, when DNS queries from client devices 102a-102d are detected that relate to malware domains such as botnet domain names and/or other malware domain names, the corresponding DNS responses to the DNS queries are intercepted/received. The apparatus 110 modifies the DNS responses to include a marker DNS record including a marker domain name and a corresponding marker IP address. In this way client devices 102a-102d infected with malware will be marked as infected because the modified DNS response message is only sent to an infected client device in place of the original DNS response message. The client device is now marked because it includes the DNS records in the modified DNS response as entries into its DNS cache, which includes the marker domain name and corresponding marker IP address. In order to keep the marker DNS record and/or the malware DNS record in the DNS cache for as long as possible, the time-to-live values for the malware DNS record and/or the marker DNS record can be extended by the order of one or more hour(s), days(s), and month(s).

Although the TTL values may be set to any value or period of time, it is to be appreciated by the person skilled in the art that the TTL value for the marker DNS record should be sufficiently large enough to ensure the marker DNS record is still in the DNS cache when the client device attempts to access the communication network. Similarly, in addition to or alternatively, the TTL value for the malware DNS record should be sufficiently large enough to ensure the malware DNS record is still in the DNS cache when the client device attempts to access the communication network. For example, the connection system may determine that the TTL value for the marker DNS record is of the order of one or more hour(s), one or more day(s), or one or more month(s). This may depend on the type of malware infection, or the possible behaviour of the user of the client device or of applications on the client device. Of course, it is possible, in extreme circumstances, to set the TTL value to be of the order of one or more year(s). In addition, modifying or setting the DNS response message may further comprise setting the TTL value for the malware DNS record to be the same as the TTL value of the marker DNS record, this may make it easier for the client device to accept the addition DNS records in the DNS response.

For example, should client device 102a become infected with malware, then when the client device 102a connects to the connection system 112 the malware may generate a DNS query for connecting to a destination malware location. The DNS query will include the malware domain name. The DNS query is detected by the DNS detection/marking apparatus 110 and the corresponding DNS response is intercepted. The apparatus 110 modifies the DNS responses to include a marker DNS record including a marker domain name and a corresponding marker IP address. The modified DNS response is then forwarded to the client device 102a in place of the original DNS response. When the client device 102a receives the DNS response, the client device 102a will include both the malware DNS record and the marker DNS record into its DNS cache. This means that client device 102a has been marked as infected with malware.

The connection system 112 is configured to direct all connection/access attempts to communication network 106 from client devices 102a-102d to a closed platform or walled garden, i.e. a controlled environment within the connection system 112 that can control how communication network access is provided to client devices 102a-102d, e.g. restrict/block/grant communication network access. The connection system 112 then provides the client devices 102a-102d with marker detection information associated with the marker domain name of the marker server 114 for use in downloading one or more marker resource(s) stored thereon or in storage 115. For example, the walled garden (or closed platform) may include a walled garden server, which serves the client devices 102a-102d with a controlled web page that includes marker detection information such as one or more marker resources that can only be downloaded from the marker domain name. As client devices 102a marked as infected with malware have both the marker domain name and the marker IP address in their DNS caches, only these infected client devices 102a have the ability to fully access the marker server and download the one or more marker resource(s).

It is assumed for this solution that the additional DNS record including the marker domain and marker IP address may be stored in a DNS cache of the client device 102a such that the marker domain is resolvable when applications on the client device 102a, such as web browsers, query the DNS cache of the client device 102a in relation to the marker domain. On receiving the DNS query, the DNS cache of the client device 102a resolves the DNS query and responds to the application with the marker domain and the corresponding marker IP address. The DNS cache on the client device 102a may be the operating system DNS cache or even a DNS cache for an application such as a web browser and the like. However, if the DNS cache on the client device does not store the additional DNS record in the correct manner, e.g. it stores the additional DNS record or marker information nested within the malware DNS record, the marker domain might not be fully or immediately resolvable. In such cases, the client device may be configured to resolve the additional DNS record associated with the marker domain name by receiving a reference e.g. in a controlled webpage, to the malware domain name associated with the marker resource or marker domain name.

For example, the marker server domain name is associated with a malware domain name, and prior to providing the client device 102a with marker detection information associated with the marker server domain name, the client device 102a is provided with the malware domain name. This may include directing the client device 102a to access a webpage including a malware link associated with the malware domain name. This may allow the DNS cache of the client device 102a to provide applications on the client device 102a, e.g. web browsers, with the marker server domain name and marker IP address stored therein.

When the client devices 102a-102d attempt to make a connection/access via connection system 112 to the communication network 106, then connection system 112 can detect that a client device 102a is infected when the connection system 112 detects the client device 102a accessing the marker server and downloading the one or more marker resource(s). Clean client devices 102b-102d will instead place DNS queries to determine the location of the marker server and hence the marker resource. The connection system 112 or apparatus 110 can detect the DNS queries from client devices 102b-102d for the marker domain name, and at once identify the client device connection attempts that belong to clean client devices 102b-102d. The infected client devices (e.g. client device 102a) are those that are detected to connect with the marker server and download the marker resource(s) e.g. to their browser caches. The clean client devices 102b-102d may exit the walled garden and be granted a connection/access to the communication network 106. But, the connection requests/connections associated with the infected client devices, e.g. client device 102a, is identified and may be prevented or blocked from connecting to/accessing the communications network 106. The client devices 102a are quarantined within the walled garden until they have been cleaned of malware infection. To further prevent the infected client devices a connection to the communications network 106, each of the connections associated with the clean client devices 102b-102d may be provided a password that is used by the connection system 112 in granting access to allow the clean client devices 102b-102d access to the communication network 106.

In addition to or alternatively, clean client devices 102b-102d behind the NAT 104 may be allowed out of the walled garden parking site of the connection system 112 before infected clients behind NAT have been cleaned. The walled garden parking site may be configured to detect or check for the content of the applications (e.g. a browser) of the clean client device 102b-102d and then white list the associated connections (e.g. any IP connection such as a TCP connection) based on the content.

For applications on the client devices 102a-102d that access web pages (e.g. web browsers) the type of links and marker resources can vary. Several alternative links that may be used in a controlled website served by a server (e.g. the walled garden website) that point to the marker server may include one or more links from the group of:

1) A link to an image. If controlled website (e.g. walled garden website) contains <img src="http://markerdomain.f-secure.com/f-secure.png"/> that resides on the marker server an infected client device will automatically download the png file whenever its browser is used to access the Internet, which will be detected by the connection system 112;
2) A link to JavaScript. If controlled website (e.g. walled garden website) contains a link to JavaScript that resides on the marker server; the JavaScript when executed on the client device can for example set a Cookie that is then a marker indicating the client device is infected. There are many other useful operations can be performed with JavaScript;
3) A link to a style sheet. If the controlled website (e.g. walled garden website) contains <link href="http://markerdomain.f-secure.com/f-secure.css" type="text/css"/>in its <HEAD></HEAD>HTML document portion, it will force the download of that CSS file from a marker server with that domain name; and
4) Any other link or resource such as plug-ins, pop-ups, location tracking and protocol handlers or other resources that may be served only to client devices that are marked and know the marker domain name and marker IP address.

By downloading the marker resources into the browser cache, the marker resources become persistent markers and harder for the infected client device to remove. It is noted that browsers can have many different settings and a user can control some behavior of the browser with those settings. For example, users can disable cookies, JavaScript, automatic downloading of images, plug-ins, pop-ups, location tracking and protocol handlers. If a user is using browser that has disabled automatic downloading of images, cookies and JavaScript, the only way of automatically downloading a marker resource from the marker server 114 may be a link to a style sheet. In essence, one or more of these links may be used in the controlled website to maximize the likelihood that the infected client device 102a will store at least one of the marker resources in the browser cache of the infected client device 102a as persistent information.

The connection system 112 may be modified further for the situation when there is two or more client devices 102a-102d infected with the same malware such as the same botnet. The connection system 112 may be configured to have an infection incident number pool of domains. By way of example only, for a botnet infection, the connection system 112 may have approximately 10 000 domains named "markerbotnet<incident number>.f-secure.com". For each botnet related DNS query the DNS detection/marking apparatus 110 may be configured to assign and add a unique "markerbotnet<incident number>.f-secure.com" domain in the DNS response corresponding to each DNS query to the same botnet domain. This means there may be a multiple of websites for each domain, and so the website for each domain may then serve a marker resource that identifies the botnet infection type and incident number, and that marker resource would then be stored in the browser cache of the infected client device when the infected client device attempts a connection to/accesses the communication network 106. When infected client has been cleared with some malware removal tool (e.g. as previously described), the malware removal tool can then signal the connection system 112 that this incident has been cleared and that incident number domain can then be freed and reused by some other infection incident. This provides the advantage of better certainty that all of the infections behind NAT 104 have been cleared, and the further advantage of more accurate infection and removal statistics.

Although it is assumed that the client devices 102a-102d may require access to a web page and so require applications such as web browsers, it is to be appreciated by the person skilled in the art that the infection marking and detection technology according to the invention does not need to be limited to the use of a browser or browser related technologies like TCP/HTTP/HTML. Non-browser applications on client devices may be used or directed to download a marker resource from a marker server and also non-browser client devices may also be used or directed to download a marker resource from a marker server. In fact, any suitable application or device may be used that uses any Internet Protocol standard for connecting to and accessing a communications network 106.

For example, multi-media applications or social network applications may be used or prompted to download a marker resource from the marker server if the client device is infected with malware. In these cases, the marker resource may be marker multimedia or a marker picture etc, which indicates the client device is marked as infected. As another example, a smart phone or mobile device may not necessarily support a web browser, but may instead have specific content reading applications like social media applications e.g. Facebook®, news subscription applications e.g. Helsingin Sanomat® or Ilta-Sanomat®, internet chat applications e.g. Twitter®. The embodiments of the present invention may be modified to possibly "piggyback" pictures/data read by these applications with the detection and marking technologies according to the invention.

As another example, any application, software, or hardware of a client device that may perform at least one of the following may be suitable for use with the present invention:

Fetching (plaintext and non-authenticated) of content from an external service (myfridge.com, mytv.com, update.scada.com, . . . )

Fetching additional content based on parsed content from that service, e.g. eXtensible Mark-up Language (XML), HyperText Mark-up Language (HTML) or some other kind of description language containing domain name based links (e.g. URLs);

Storing or caching that content locally, should be affected, which will require closed platform system (e.g. a customized walled garden);

Any other software or application that may have the required characteristics of connecting to a communication network for accessing content and able to make DNS queries in order to connect to servers or data sources etc and to connect and access data from a closed platform etc.

The connection system 112 can be configured to provide such applications on client devices or such client devices with the marker domain name for downloading a marker resource from a marker server 114. The marker resource should be suitable for use and/or storage by the application and/or client device. If the application and/or client device makes a DNS query in relation to the marker domain name, then the connection request associated with the application on the client device and/or client device may be granted as the client device is considered clean. However, if no DNS query is made, then the application of client device or the client device already has the marker DNS record in its DNS cache, and so is classed as infected and not allowed access to the communication network 106. The client device may then be cleaned with a malware removal tool or even new firmware or a restore point used to overwrite all the firmware and malware on the client device.

As another example, the apparatus 110 and connection system 112 according to the invention may be configured to detect/mark and restrict/grant a non-browser client device access to communication network 106. For example, client device 102d may include a set top box for an Internet ready TV, which may be a non-browser client device. The client device 102d may use any proprietary or standard communication protocol for getting information specific for the client device 102d from some external server. The information could include, for example, daily program schedule containing various details like time when the program starts, title, description and maybe some picture or logo that is characteristic for that program. The client device 102d may be configured to download data from the external server such that the data contains a link (e.g. URL) or instruction or command to an external resource and the client device 102d tries to download the content of that link. With these possible capabilities, the present invention may be applied to such non-browser client devices.

For example, a set top box could use, by way of example only, a UDP based remote procedure call (RPC) for getting an XML description of the daily program, for example:

```
<daily_program>
    <date>10.4.2013</date>
    <channel1>
        <program>
            <time>12:00</time>
            <title>News</news>
            <logo>http://images.news.com/logo.jpg</logo>
            <description>Local news for today..</description>
        </program>
        <program>
            ..
        </program>
    </channel1>
</daily_program>
```

When the set-top-box connects with the connection system 112, a marker resource such as a dummy marker "program" from a server that is offering programs may be downloaded along with the XML description of the daily program. For example, the "Logo" of that program may point to a marker resource on marker server 114, e.g. <logo>http://marker.isp.com/infection marker.png</logo>.

In order to prevent malware from emptying the DNS cache of the client device after the modified DNS response is received and thus removing the marker domain name and marker IP address, the following procedure may be used to detect whether the DNS cache has been emptied. The procedure is as follows:
1) For all DNS queries a further DNS record may be included in the corresponding DNS response, this further DNS record may be allocated a substantially long TTL value (for example, a TTL value corresponding to one year TTL value). The further domain may be, for example, "uptime.f-secure.com". Subsequent DNS request/reply updates from one client device for that domain are configured to not reset the TTL value to the original substantially long TTL value (e.g. the TTL value corresponding to a period of 1 year); and
2) If the DNS cache has not been emptied (e.g. using "ipconfig/flushdns") the following equation will then hold: machine_uptime=1_year_in_seconds−current_DNS_Cache_TTL_value_for_uptime.f-secure.com_domain. If this equation does not hold, then it is likely the DNS cache has been emptied.

In addition, a browser cache may be cleared, which may remove any marker resources on an infected client device 102a. A heuristic method for detecting whether browser cache has been cleared may be applied to be used as an optional trigger for the connection system 112 in deciding, as a precaution, whether a client device 102a that has had a cache cleared should stay in the closed platform (or walled garden). This is because, if malware should clear the marker resource (e.g. a picture such as infection_marker.png) from the browser cache (and also clear the DNS cache), then the infected client device could still potentially connect to the communication network 106 (e.g. the Internet) as can clean devices.

To overcome this issue, the controlled website (or walled garden web page) may have, by way of example only, ten links that are known-to-be static and so do not change very often to resources under different popular web pages. These links can be shuffled/changed from time-to-time or even for every client device connection attempt (e.g. TCP connection attempt). Such links may be of the form:
"Popular-set" from for example http://www.google.com/adplanner/static/top1000:
www.facebook.com/favicon.ico
www.youtube.com/favicon.ico
www.yahoo.com/favicon.ico
www.google.com/favicon.ico
www.microsoft.com/favicon.ico
. . .

In addition to these links, there may be some further links that are known must not reside in any browser cache of a client device. These further links may constitute a unique set of links, which may be of the form:
"Unique-set":
myisp<random_number>.com/faviconico
myisp<random_number>.com/faviconico
myisp<random_number>.com/faviconico
. . .

This means that the malware will most likely not be able to identify all of the popular and unique links it should try to download and which don't. In order to verify whether the browser cache has not been cleared the connection system 112 may detect that
there should be at least one resource from the Popular-set that the malware or client device 102a did not try to download; and
the malware/or client device 102a should have tried to download all links from the Unique-set.

If these conditions are not met, then the browser cache (or application cache) of the client device 102a has most likely been cleared and the client device connection stays in the walled garden regardless of whether the marker resource(s) (e.g. the infection_marker.png) were not found.

Other precautions may be applied to the present invention, for example, each clean client devices 102b-102d may be provided with a proxy password that is unique for each connection (e.g. TCP connections) established for the client devices 102b-102d. The same password will not work for different connections from the same client device (e.g. applications may require one or more connections and so make one or more connection requests). As an example, this precaution would then indirectly require that all HTTP based client applications on the client device implement a proper JavaScript engine that is able to execute JavaScript code that sets the proxy password to allow the client device to exit the walled garden. This ensures that should the client device have access to some previously working proxy password, creating another connection through an HTTP port and setting all the necessary HTTP headers (like "User-agent: Mozilla") in order for the connection to look like it is coming from a browser would not be enough to allow the client device to exit the walled garden and connect/access the communication network via that the new connection (e.g. a new TCP connection).

Figure 2A:
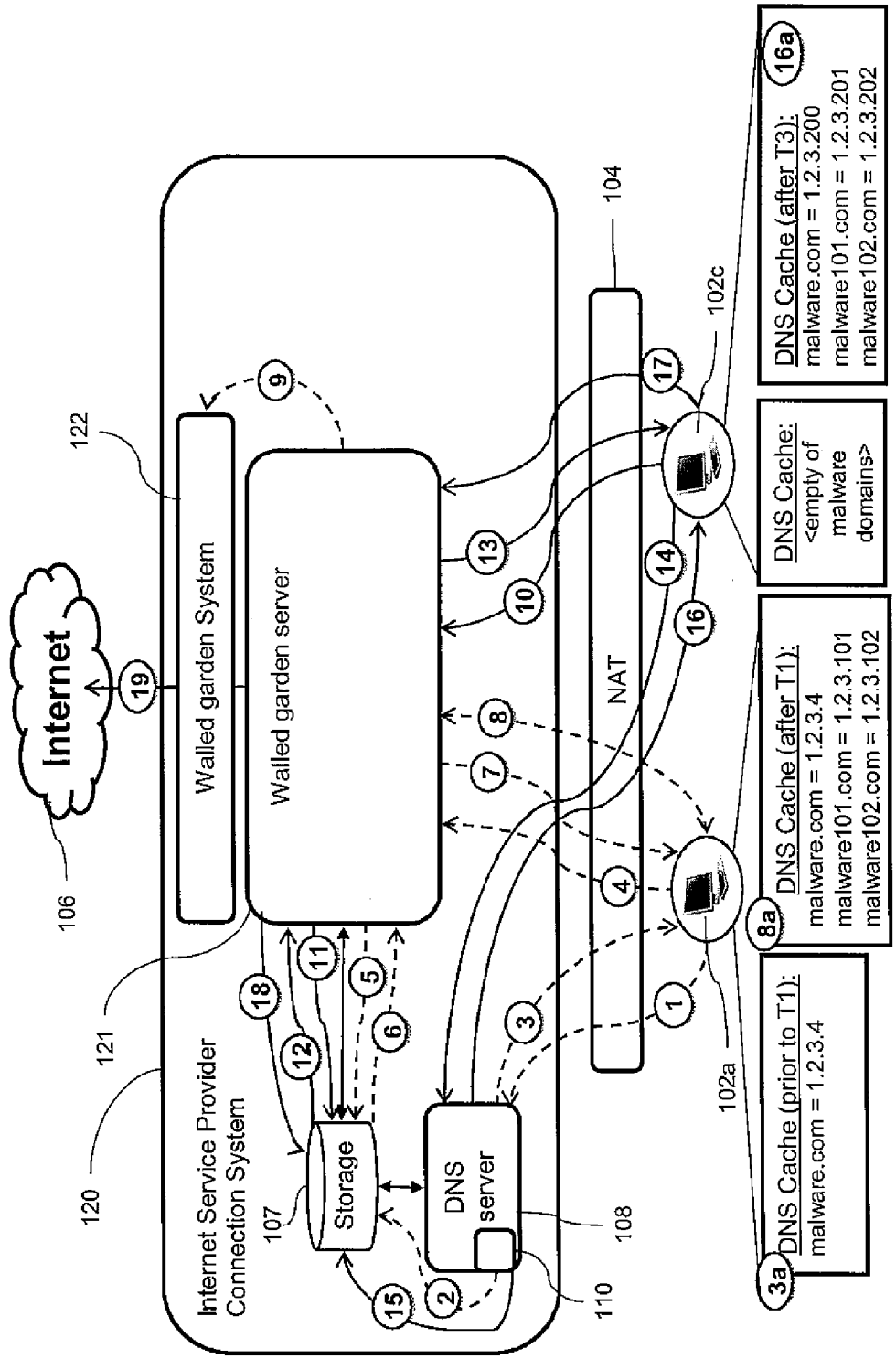
FIG. 2a is another schematic diagram illustrating a signal flow for marking and detecting client devices infected with malware.

FIG. 2a is a schematic illustration of another example of an Internet service provider (ISP) connection system 120 including the detection and marking apparatus 110 system for detecting malware and marking client devices 102a and 102c behind NAT 104 (e.g. a Wi-Fi router or gateway) infected with malware. The connection system 120 controls the connection of the client devices 102a and 102c to communication network 106 (e.g. the Internet). For simplicity, the same reference numerals used in FIG. 1a are reused to identify the same or similar components, apparatus, client devices, network nodes and elements.

The connection system 120 includes DNS server 108, which incorporates the functionality of the DNS detection/marking apparatus 110 as described with reference to FIG. 1a, a walled garden server 121, a walled garden system 122, which are communicatively coupled together. In this example, client device 102a is a computer and is infected with malware and client device 102c is another computer that is clean and not infected with malware. The signal flow between the connection system 120 and the infected client device 102a is illustrated by dashed lines and the signal flow between the connection system 120 and the clean client device 102c is illustrated by solid lines. Initially, it is assumed that the DNS caches of the infected client device 102a and the clean client device 102c are empty.

In step 1, when the malware on the infected client device 102a attempts to connect to the Internet such that the malware on the infected client device 102a sends a DNS query message including the malware domain (e.g. "malware.com") to DNS server 108. On receiving the DNS query message from the client device 102a, as DNS server 108 includes the functionality of DNS detection/marking apparatus 110 as described with reference to FIG. 1a, this may include a malware signature list (e.g. "malware.com", "malware101.com", "malware102.com" etc) for use in detecting whether a DNS query message corresponds to one or more malware domain names (e.g. "malware.com", "malware101.com", "malware102.com" etc). The DNS server 108 detects that the DNS query message is for a malware domain (e.g. "malware.com") and intercepts the corresponding DNS response message for client device 102a that includes the malware DNS record to the malware domain name and malware IP address (e.g. "malware.com" and "x.y.z.w").

The DNS server 108 or DNS detection/marking apparatus 110 modifies the DNS response message by assigning a marker IP address (e.g. 1.2.3.4) to replace the malware IP address (e.g. "x.y.z.w") of the malware DNS record, thus creating a marker DNS record.

This creates a mapping between the marker IP address (e.g. 1.2.3.4) and the malware domain name ("malware.com"), which is associated with client device 102a. For other client devices, the DNS server 108 may perform a similar operation when it detects other DNS query messages and intercepts the corresponding DNS response messages to malware domain names. For these other DNS response messages to malware domain names, the DNS server 108 also modifies these DNS response messages by assigning further marker IP addresses (e.g. 1.2.3.5, 1.2.3.6, . . . etc) that are different from each other to replace the corresponding malware IP addresses in the corresponding intercepted DNS response messages. This creates further mappings between each further marker IP address and each corresponding malware domain name. Each of the mappings (i.e. the marker IP address and corresponding malware domain name pair) is different.

In step 2, the DNS server 108 or apparatus 110 stores each mapping between the marker IP address and the corresponding malware domain name (e.g. "malware.com"="1.2.3.4") in a database or storage 107. When available, the further mappings between each further marker IP address and each corresponding malware domain name are also stored in the database or storage 107. For each DNS query message to a malware domain received from each of a multiplicity of client devices, the database 107 will be populated with corresponding mappings, each of which is different.

In step 3, the modified DNS response message is sent as a marker DNS response message to the client device 102a. In step 3a, the client device 102a stores the marker DNS record (e.g. "malware.com"="1.2.3.4") of the marker DNS response message in a DNS cache of the client device 102a.

When any client device 102a or 102c behind NAT 104 attempts to connect to the Internet 106 they are redirected to walled garden web page, which may reside on the walled garden server 121 or system 122. For this example, in step 4, an application such as a web browser on the client device 102a attempts to connect to the Internet 106, by sending a connection request to the connection system 120. Although the application is a web browser, it is to be appreciated by the person skilled in the art that any other application (e.g. email client or multimedia application) may also attempt to connect to the Internet 106.

The connection system 120 via the walled garden server 121 and system 122 detects the connection request and performs an investigation as to whether the client device 102a may be infected with malware. In steps 5 and 6, the connection system 120 via walled garden server 121 reads the contents of the database 107 to get a snapshot at time T1 of all currently assigned and stored mappings of marker IP addresses and corresponding malware domain names. Based on the mappings read from the database 107 at time T1, the walled garden server 121 determines a list of all the malware domain names and then generates marker detection information including instructions (e.g. JavaScript code) for forcing or configuring the web browser on the client device 102a to attempt to connect to all the malware domain names on the list (e.g. "malware.com", "malware101.com", "malware102.com" etc).

Note, although the marker detection information may include the mappings read from the database, the client device does not use the IP address information contained therein when attempting to connect to all the malware domain names that are provided to the client device. If the marker detection information includes information associated with the mappings read from the database, then the client device may use the corresponding IP addresses in a comparison with the IP address used when attempting to connect to all of the malware domain names on the list. Alternatively, the marker detection information may not include information of the marker IP addresses that were stored, only information associated with the malware domain names may be provided to the client device, in which case the connection system 120 will need to receive the IP address information the client device used when attempting to connect to all the malware domain names on the list to allow the connection system to make the comparison. In any event, the comparison between the IP address used by the client device and the IP address of the previously stored mapping may be performed at the client device or at the server/connection system 120.

Depending on where the mapping information is stored, either the client device or the connection system 120 will be able to determine to which IP address the client device connected to when connecting to each malicious domain. This allows the client device and connection system to do the comparison independently. If only the connection system 120 (or servers therein) have the required IP address information to do the comparison, then it also has to have the mappings stored at time T1 associated with the session of the connection request for the client device. As there are many client devices connected to the connection system at any one time, the connection system will require session tracking code to differentiate between the connection requests for each client device.

In step 7, the walled garden server 121 communicates the marker detection information to the web browser of the client device 102a such that the instructions (e.g. JavaScript code) contained therein forces the web browser of the client device 102a to attempt to connect to all of the malware domain names (e.g. "malware.com", "malware101.com", "malware102.com" etc) stored in the database 107 at time T1. The walled garden server 121 may send the web browser of the client device 102a a web page with a link to the marker detection information. The marker detection information may contain instructions such as, by way of example only, JavaScript, where the web garden server 121 creates the instructions (e.g. JavaScript code) containing the array or list of malware domain names. Alternatively, the marker detection information may be generated or made by a dynamic/runtime query to the web garden server 121.

In step 8, the web browser of the client device 102a and/or the walled garden web server 121 may, via the marker detection information/instructions, determine the IP address the client device 102a attempted to use for each malware domain name connection attempt. For each malware domain name, the IP address used by the client device 102a in its connection attempt may be compared with the previously stored mappings associated with the malware domain name that were read at time T1. The previously stored mappings read at time T1 may be communicated to the client device 102a via the marker detection information or instructions therein, or the client device 102a may be configured by the marker detection information to communicate the IP addresses used with the web server 121. If the IP address used matches any one of the marker IP addresses in the mappings read at time T1, then it can be determined that the client device has been temporally marked such that it is infected with malware. In addition, the client device 102a may be further marked with a persistent marker that is typically stored in non-volatile memory.

For example, a persistent marker may be a web cookie that may be created by the instructions/marker detection information or the web server 121. A web cookie is a file stored in the client browser that can include any content that the web server 121 requires, for example, whether the client device 102a is infected with malware and the type of malware infection. The web cookie would in this case be a web cookie of walled garden web site or server 121 as all connections are initially redirected there. The web cookie may, by way of example only, contain a string such as "infected=malware.com;malware101.com; malware102.com", which means the client device 102a is known to have contacted these malicious domains and also meaning that it is infected with malware associated with those domains.

Of course, a clean client device 102c may have a web cookie with the string, by way of example only, "clean" and a time stamp that provides a time limit in which the web server 121 may trust the client device 102c to be clean, when the time limit expires, the web server 121 may perform steps 1-8 to determine whether the client device 102c is clean of not and amend the web cookie accordingly. However, as a clean client device 102c may become infected within the time limit, an alternative is simply to assume each and every TCP connection may be coming from an infected client device and so steps 1-8 may be performed for all client devices. Infected client devices 102a should be persistently marked in any way possible as described herein as the DNS cache of the client device 102a may be flushed at any time. The web cookie allows the client device 102a to communicate an indication to the web server 121 that it is infected with malware or not.

When the web browser of the client device 102a attempts to contact the malware domain name corresponding to the DNS query message/marker DNS response message made by/sent to the client device 102a in steps 1 to 3, the web browser uses the corresponding marker DNS record stored in the DNS cache of the client device 102a (e.g. "malware. com"="1.2.3.4") prior to time T1. When the IP address used by the client device 102a for this malware domain name corresponds to one of the mappings read from the database 107 at time T1, this means that the client device 102a has already been marked as infected with malware.

In step 8a, for all other malware domain names (e.g. "malware101.com"; "malware102.com") that the client device 102a is instructed and configured to connect to, but for which client device 102a did not attempt to connect to or send a DNS query message prior to time T1, the client device 102a now sends DNS query messages after time T1 to each of these other malware domain names to determine the corresponding IP addresses. This means the DNS server 108 will detect and intercept these DNS query messages and operate according to steps 1 to 3 to send corresponding marker DNS response messages to client device 102a and to store additional mappings between these newly assigned marker IP addresses (e.g. "1.2.3.101", "1.2.3.102") and the corresponding malware domain names (e.g. "malware101.com", "malware102.com"). This means the database 107 is updated with these additional mappings after time T1. The DNS cache of the client device 102a is also updated with further marker DNS records corresponding to these additional mappings after time T1.

When the web browser of the client device 102a now attempts to contact these other malware domain names (e.g. "malware101.com" or "malware102.com"), the web browser uses the marker DNS record stored in the DNS cache of the client device 102a (e.g. "malware101.com"="1.2.3.101"). But, for each of the other malware domain names (e.g. "malware101.com"), the IP address (e.g. "1.2.3.101") used by the client device 102a for this other malware domain name (e.g. "malware101.com") does not correspond to one of the mappings read from the database 107 at time T1, which means that the client device 102a is not infected with malware associated with these other malware domain names as these mappings were generated/stored in database 107 after time T1 when the client device 102a was forced to connect to these other malware domain names. These additional mappings (or marker DNS records etc) may be identified and removed from the DNS cache of the client device 102a and also from database 107.

It is to be appreciated, that the client device 102a and/or the web server 121 may make the determination that the client device 102a is infected with malware or not. For example, the web server 121 may receive from the client device 102a the IP addresses the client device 102a used when connecting to each specific malware domain name. The web server 121 may then determine whether the client is infected with malware if any of the IP addresses match the IP address of a mapping stored in the database at time T1. This communication may be performed under the direction of the marker detection information instructions (e.g. JavaScript).

The client device 102a may then be provided with a persistent marker that indicates whether the client device 102a is infected or not. As an example, a web cookie may be provided that is stored in the cache of the web browser of the client device 102a, which indicates that the client device 102a is infected with malware and also the type of malware.

Alternatively, the web cookie may indicates that the client device 102a is not infected with malware i.e. that the client device is clean. This provides the advantage that the web server 121 may bypass the check (i.e. steps 5-8) for whether the client device 102a is infected with malware or not on other future TCP connection requests by the client device 102a. Instead, the web server 121 may check whether a web cookie is stored on the client device 102a (e.g. in the web browser cache) and read the cookie to determine whether the client device 102a is infected with malware or not during each future TCP connection request. As an example, when the next TCP connection from client device 102a is received by the connection system 120 or web server 121, the web server 121 can check to see if any web cookies are stored on the client device 102a that indicate whether the client device 102a is infected or not. Based on this, the web server 121 may perform step 9 and block the client device 102a access to the Internet in respect of the connection request until the malware infection is removed (which may remove the web cookie, or store a web cookie indicating the client device 102a is clean). If no appropriate web cookie is present, then the web server 121 may need to perform steps 6 to 8 again to determine whether the client device 102a is infected with malware or not, and set and store an appropriate web cookie for future reference.

In step 9, in any event, since client device 102a is determined by web server 121 to be infected with malware associated with at least one of the malware domain names (e.g. "malware.com"), the client device 102a is sent to the walled garden system 122 and is blocked from accessing the Internet 106 in relation to the connection request. The user of the client device 102a, which is determined to be infected with malware, may be shown via the web browser information (as described herein) about the malware infection and a link pointing to a removal tool for use in removing the malware infection from client device 102a. After the malware is removed, the client device 102a may make another connection request to connect to the Internet 106, in which case, if the client device 102a is a clean device then the following steps 10 to 19 may be performed. However, if a malware infection has not been removed from the client device 102a, then a further connection request to access the Internet 106 may cause steps 1-9 to be performed again in relation to the malware infection. If a web cookie has been stored on the client device 102a indicating that it is infected with malware, then as described above, a further connection request may result in web server 121 skipping steps 5-8 and performing step 9.

In step 10, the clean client device 102c attempts to connect to the Internet 106 by sending the connection system 120 a connection request for accessing the Internet 106. The clean client device 102c is also redirected to walled garden web page, which may reside on the walled garden sewer 121 or system 122. For this example, in step 10, an application such as a web browser on the client device 102c attempted to connect to the Internet 106, by sending the connection request to the connection system 120. Although the application is a web browser, it is to be appreciated by the person skilled in the art that any other application (e.g. email client or multimedia application) may also attempt to connect to the Internet 106.

The connection system 120 via the walled garden server 121 and system 122 detects the connection request and performs an investigation as to whether the client device 102c is infected with malware or is a clean client device. In steps 11 and 12, the connection system 120 via walled garden sewer 121 reads the contents of the database 107 to get a snapshot at time T3 of all currently assigned and stored mappings of marker IP addresses and corresponding malware domain names. Based on the mappings read from the database 107 at time T3, the walled garden server 121 generates marker detection information based on instructions (e.g. JavaScript code) for forcing or configuring the web browser on the client device 102c to connect to all the malware domain names (e.g. "malware.com", "malware101.com", "malware102.com" etc) that were stored in database 107 at time T3.

In step 13, the walled garden sewer 121 communicates the marker detection information to the web browser of the client device 102c such that the instructions (e.g. JavaScript code) contained therein forces the web browser of the client device 102c to attempt to connect to all of the malware domain names (e.g. "malware.com", "malware101.com", "malware102.com" etc) that were stored in the database 107 at time T3.

In step 14, after time T3, the client device 102c will attempt to connect to each malware domain name. However, for each malware domain name (e.g. "malware.com", "malware101.com", "malware102.com" etc) the client device 102c has to send one or more DNS query message(s) associated with the malware domain name(s) to DNS sewer 108 because the DNS cache of the client device 102c is empty of malware domain names (i.e. the client device 102c is assumed to be clean).

On receiving the DNS query message(s) corresponding to the malware domain name(s) (e.g. "malware.com", "malware101.com", "malware102.com" etc) from the client device 102c, the DNS sewer 108 detects that the DNS query message(s) are for malware domains and intercepts the corresponding DNS response message(s) for client device 102c (i.e. the malware DNS records including the malware domain names and malware IP addresses).

The DNS server 108 or DNS detection/marking apparatus 110 modifies the DNS response messages by assigning different marker IP addresses (e.g. 1.2.3.200, 1.2.3.201, 1.2.3.202, etc) to replace the corresponding malware IP addresses of the corresponding malware DNS records, creating marker DNS records. This creates additional mappings between the marker IP addresses (e.g. 1.2.3.200, 1.2.3.201, 1.2.3.202, etc) and the corresponding malware domain names (e.g. "malware.com", "malware101.com", "malware102.com" etc), which are associated with client device 102c.

In step 15, the DNS server 108 or apparatus 110 stores each mapping between the marker IP addresses and the corresponding malware domain name (e.g. "malware.com"="1.2.3.200", "malware101.com"="1.2.3.201", "malware102.com"="1.2.3.202", etc) in the database 107.

In step 16, the modified DNS response message(s) are sent as a marker DNS response message(s) to the client device 102c. In step 16a, after time T3, the client device 102c stores the marker DNS records (or modified malware DNS records) (e.g. "malware.com"="1.2.3.200", "malware101.com"="1.2.3.201", "malware102.com"="1.2.3.202", etc) of the marker DNS response message in the DNS cache of the client device 102c.

In step 17, the web browser of the client device 102c and the walled garden web server 121 communicate, via the marker detection information/instructions, to determine, for each malware domain name connection attempt, which IP address the client device 102c attempted to use. The IP addresses that the client device 102c attempts to use are stored in the DNS cache. This means that the web server 121 can see which IP address the client device 102c tried to contact when connecting to specific malware domain name.

When the web browser of the client device 102c attempts to contact the malware domain names (e.g. "malware.com" "malware101.com" or "malware102.com" etc), the web browser uses the marker DNS records stored in the DNS cache of the client device 102c (e.g. "malware.com"="1.2.3.200", "malware101.com"="1.2.3.201", "malware102.com"="1.2.3.202", etc). But for each of these malware domain names (e.g. "malware.com", "malware101.com", "malware102.com"), it can be determined (e.g. by either the web server 121 or the client device 102a via the marker detection information) that the corresponding IP addresses (e.g. "1.2.3.200", "1.2.3.201", "1.2.3.202" etc) used by the client device 102c for the corresponding malware domain names (e.g. "malware.com", "malware101.com", "malware102.com") do not correspond to any of the mappings read from the database 107 at time T3. This is because the mappings associated with these marker IP addresses and corresponding malware domain names (e.g. "malware.com"="1.2.3.200", "malware101.com"="1.2.3.201", "malware102.com"="1.2.3.202", etc) were stored in the database 107 after time T3, which means that the client device 102c is not infected with malware associated with these malware domain names. In step 18, these mappings may be identified and removed from the DNS cache of the client device 102c and also from database 107.

In step 19, in any event, since client device 102c is determined to be clean the client device 102c is granted access to the Internet 106 in relation to the connection request (e.g. if the connection request was for a TCP connection to a particular web site, the clean client device 102c is redirected to this web site). As mentioned above, the clean client device 102c may also be provided (e.g. via the web server 121 or via the instructions in the marker detection information) with a web cookie indicating that it is a clean client device 102c. The cookie may include the string "clean" and optionally a time stamp that may provide a time limit in which the web server 121 may trust the client device 102c to be clean, after which the web server 121 may perform steps 1-8 to determine whether the client device 102c is clean of not and amend the web cookie accordingly. However, as a clean client device 102c may become infected within the time limit, an alternative is simply to assume each and every TCP connection may be coming from an infected client device and so steps 1-19 may be performed for all client devices.

Figure 2B:
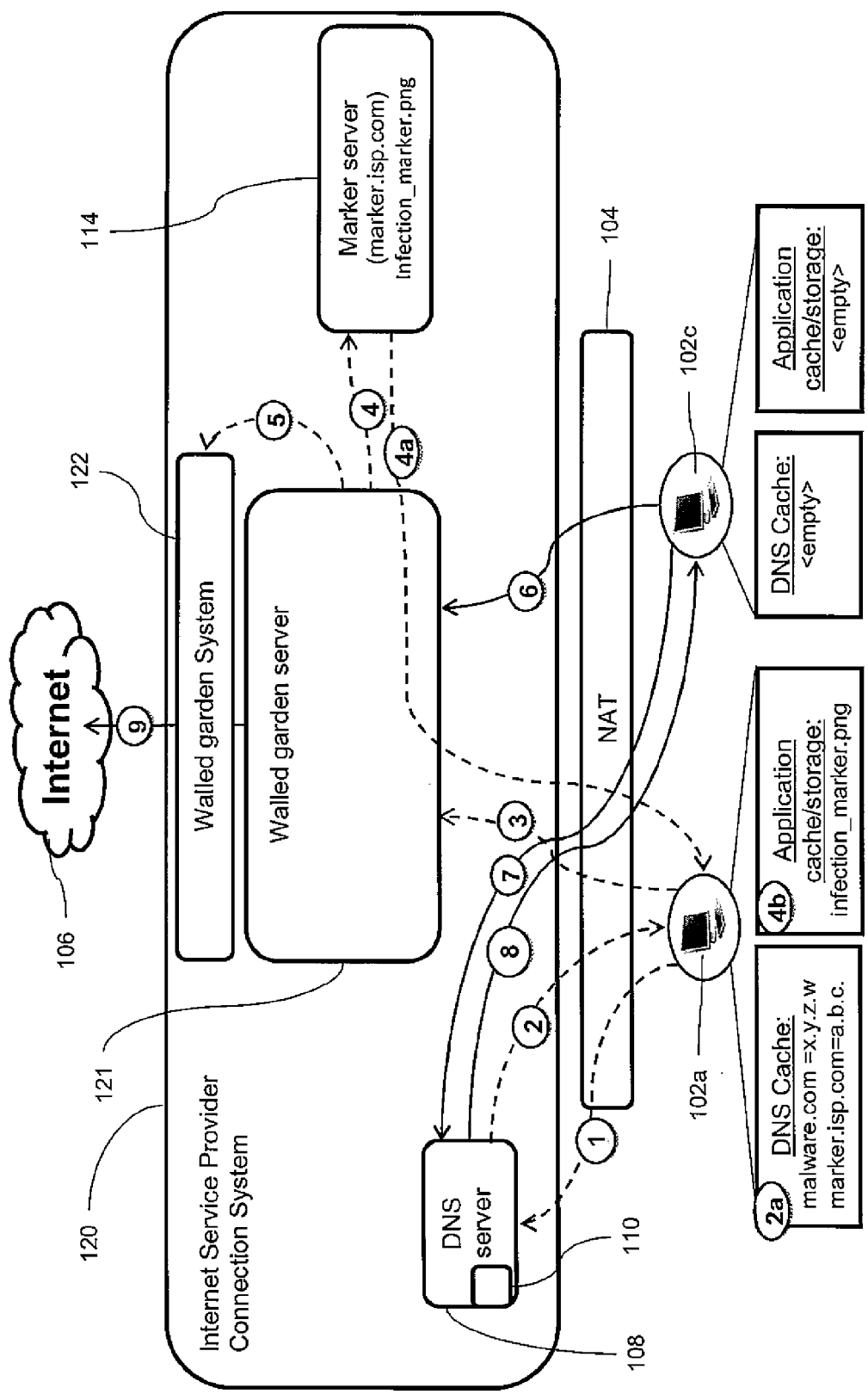
FIG. 2b is another schematic diagram illustrating a signal flow for marking and detecting client devices infected with malware and blocking access to the marked client device(s)

FIG. 2b is another schematic illustration of another example of an Internet service provider (ISP) connection system 120 including another example of the detection and marking apparatus 110 system for detecting malware and marking client devices 102a and 102c behind NAT 104 (e.g. a Wi-Fi router or gateway) infected with malware. The connection system 120 controls the connection of the client devices 102a and 102c to communication network 106 (the Internet). For simplicity, the same reference numerals used in FIG. 1b are reused to identify the same or similar components, apparatus, client devices, network nodes and elements.

The connection system 120 includes DNS server 108, which incorporates the functionality of the DNS detection/marking apparatus 110, a walled garden server 121, a walled garden system 122, and a marker server 114, which are communicatively coupled together. In this example, client device 102a is a computer and is infected with malware and client device 102c is another computer that is clean and not infected with malware. The signal flow between the connection system 120 and the infected client device 102a is illustrated by dashed lines and the signal flow between the connection system 120 and the clean client device 102c is illustrated by solid lines.

Initially, it is assumed that the DNS caches of the infected client device 102a and the clean client device 102c are empty. In step 1, when the infected client device 102a attempts to connect to the Internet, the malware on the infected client device 102a may send a DNS query including the malware domain (e.g. "malware.com"), which is forward to DNS server 108. As DNS server 108 includes the functionality of DNS detection/marking apparatus 110, in step 2, the DNS server 108 detects the DNS query is for a malware domain and intercepts the corresponding DNS response that includes the malware DNS record to the malware domain and malware IP address (e.g. "malware.com" is at "x.y.z.w"). In addition, the DNS server 108 modifies the DNS record to further include a marker DNS record including the marker domain and marker IP address, and a marker TTL value that is substantially greater than the TTL value of the malware DNS record (e.g. "marker.isp.com" is at "a.b.c.d" and remember this for one month, i.e. TTL value is set for one month). In the present example, the malware DNS record TTL value may also be set to a similar value of the order of one or more month(s). Although the TTL values may be set to any value, it is to be appreciated by the person skilled in the art that the TTL value for the marker DNS record should be sufficiently large enough to ensure the marker DNS record is still in the DNS cache when the client device attempts to access the communication network. Similarly, in addition to or alternatively, the TTL value for the malware DNS record should be sufficiently large enough to ensure the malware DNS record is still in the DNS cache when the client device attempts to access the communication network. For example, the connection system may determine that the TTL value for the marker DNS record is of the order of one or more hour(s), one or more day(s), or one or more month(s). This may depend on the type of malware infection, or the possible behaviour of the user of the client device or of applications on the client device. Of course, it is possible, in extreme circumstances, to set the TTL value to be of the order of one or more year(s). In addition, modifying or setting the DNS response message may further comprise setting the TTL value for the malware DNS record to be the same as the TTL value of the marker DNS record, this may make it easier for the client device to accept the addition DNS records in the DNS response.

In any event, the modified DNS response is sent to the infected client device 102a. In step 2a, the client device 102a updates its DNS cache to include the malware DNS record and the marker DNS record (e.g. DNS Cache: malware.com=x.y.x.w; marker.isp.com=a.b.c.d with TTL of one month). The malware and marker domains will remain in the DNS cache of the client device 102a until the device has been rebooted, the cache is cleared, or one month is elapsed.

The connection system 120 may be configured such that all connection attempts to the Internet by both client devices 102a and 102c are put into the walled garden system 122. Alternatively or in addition, the connection system 120 may be further configured to only put both/all client devices 102a and 102c into the walled garden system 122 when a DNS query for a malicious domain (i.e. a malware domain) is detected or identified. In this case, the DNS server 108 has detected the DNS query made by infected client device 102a was to a malware domain, hence the connection system 120 is configured to put any connection attempts from both client devices 102a and 102c behind NAT 104 into the walled garden system 122 for further processing.

In step 3, infected client device 102a attempts to access or connect to the Internet and is put in the walled garden system 122. As an example, when the application on the client device 102a is a web browser, the web browser or client device 102a is redirected to a walled garden webpage on walled garden server 121. The walled garden webpage contains a link to an infection marker resource (e.g. Infection_marker.png) that is on a hidden server such as marker server 114 (e.g. marker.isp.com). Alternatively, when the application on the client device 102a is a social networking application, the application may be instructed to download a marker resource (e.g. a picture or message) from the hidden marker server 114, however, the instructions provide only the domain name of the marker server domain name (e.g. marker.isp.com). In any event, the application on the client device 102a is provided with the marker server domain name for use in downloading one or more marker resource(s) from marker server 114.

In step 4, as the infected client device 102a knows where the marker server is (e.g. "marker.isp.com=a.b.c.d" is the DNS cache) the infected client device downloads the marker resource (e.g. also called an infection marker resource). For example, when the application is the web browser, the web browser of the infected client device 102a is able to download the infection marker resource (e.g. Infection_marker.png) and in step 4a the marker resource is downloaded to the infected client device 102a, where in step 4b the web browser saves the marker resource in the web browser cache/storage. The marker resource will remain in the application cache/storage even when the client device 102a reboots. The marker resource is now a persistent marker that resides in the application cache/storage, and because of this the client device 102a will be prevented from exiting the walled garden 112 and connecting to the Internet.

The connection system 120 is configured to detect the download of the marker resource to the client device, which is used to determine that the infected client device 102a is marked as infected with malware and should be quarantined. In step 5, the infected client device 102a is redirected to the walled garden system 112 ensuring the connection associated with the application on the infected client device 102a is blocked from accessing the Internet. A web page, notification message, or the marker resource may be used to inform the user of the infection on the infected client device 102a. A link to a malware removal tool may also be provided for downloading to and cleaning the infected client device 102a. Alternatively, the client device 102a may already have an anti-virus application and so it may be provided with scanning information or malware signature files related to the malware infection such that the malware infection can be removed, including the marker DNS record and malware DNS record from the DNS cache of the infected client device 102a.

In step 6, one or more application(s) on the clean client device 102c attempt to connect to the Internet such that the connection attempt(s) are redirected to the walled garden system 122 and walled garden server 121. Each connection attempt by an application or the client device 102c will be checked to determine if the client device 102c is free of malware and clean. If the client device 102c is free of malware, the DNS cache of the client device 102c will not include the marker server domain and the marker IP address, nor will any marker resources be stored on the client device 102c. In fact, the lack of the marker domain and marker IP address in a DNS cache is how the connection system 120 can determine which of client devices 102a and 102c behind the NAT 104 are infected and which are not.

In one example, if one of the applications is a web browser, the client device 102c may be redirected to a web page on the walled garden server 121, the web page containing one or more links to one or more marker resources on the marker server 114 (e.g. marker.isp.com). When the web browser reads the walled garden web page, the web browser of the clean client device 102c has to resolve marker server domain name (e.g. marker.isp.com) in the link(s) to the marker resource(s). Other applications on the client device 102c may, instead, be instructed or directed to download a marker resource from the marker server 114 (e.g. marker.isp.com). For example, the redirection or instruction may only include a reference to the marker resource and the marker server domain name, the client device 102c is required to resolve the marker server domain name in order to get the marker resource.

As the clean client device 102c does not have an entry in its DNS cache relating to the marker server domain name, in step 7, the clean client 102c tries to resolve the marker server domain name (e.g. marker.isp.com) by sending a DNS query to the DNS server 108. However, even though the DNS server 108 includes the functionality of DNS detection/marking apparatus 110, this functionality is kept separate and the marker domain name is kept hidden from the public DNS database and so the DNS server 108 cannot resolve the marker server domain. The DNS server 108 should not know or resolve the marker server domain. The only way to get the marker server IP address associated with the marker server domain name is by sending a DNS query to a malicious domain, which is caught by the functionality of the DNS detection/marking apparatus 110 in DNS server 108 such that the client device requesting the malicious domain name is marked as described herein.

In step 8, the DNS server 108 responds that it cannot resolve the DNS query of the clean client device 102c. The connection system 120 detects the DNS query to the marker server domain name and the DNS response as unresolvable, so it can determine that the client device 102c is not marked as infected so should be free of malware and clean. Due to this determination, the clean client device 102c is allocated a proxy password for each of the connection attempts that pass the above test. This allows the respective application(s) on the client device 102c to exit the walled garden and connect to the Internet 106. The clean client device 102c may now access the Internet.

Meanwhile, the infected client device 102a is directed to download the malware removal tool, or scanning information which is used to remove the malware from the client device 102a, to remove the marker domain and IP address from the DNS cache, and to remove the marker resource from the application cache or storage (e.g. Browser cache). When this is complete, client device 102a is now clean and may be provided access to the Internet in a similar fashion as the clean client device 102c.

Figure 3A:
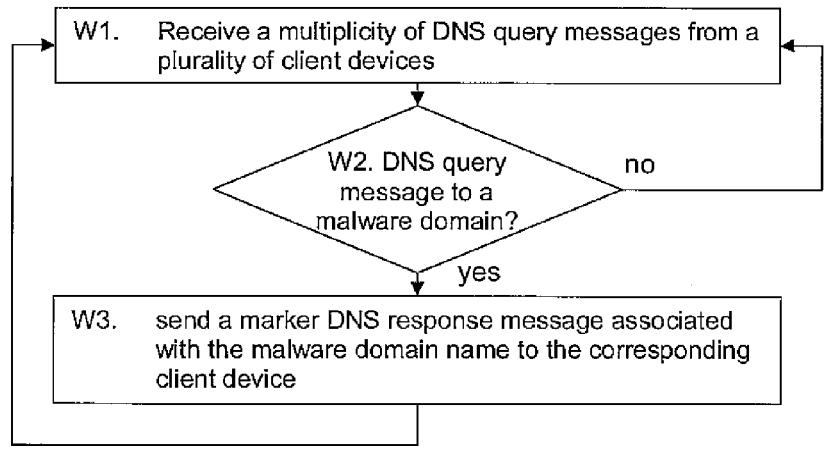
FIG. 3a is a flow diagram illustrating a procedure carried out by an apparatus for marking client devices infected with malware.
Figure 3B:
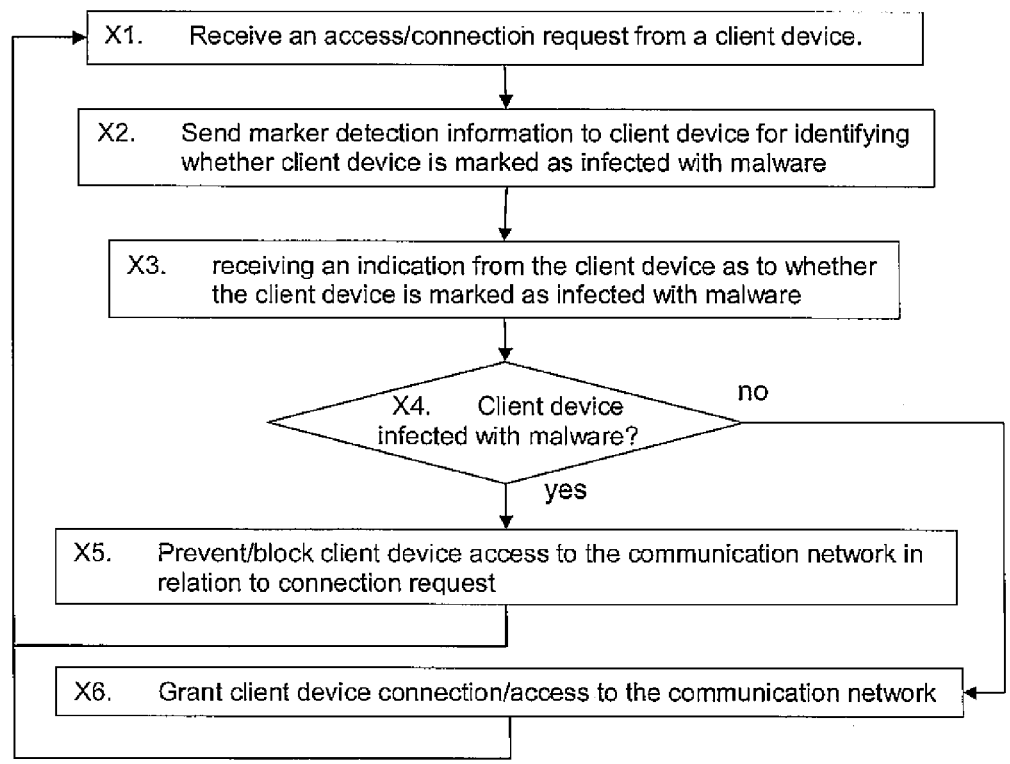

FIGS. 3a and 3b are flow diagrams illustrating example methods carried out by apparatus for marking/detecting client devices infected with malware and connection system for detecting client devices marked as infected with malware. In FIG. 3a, the apparatus performs a procedure based on the following steps:

W1. Receive a multiplicity of DNS query messages from a plurality of client devices. Proceed to W2.
W2. For each received DNS query, was the DNS query message to a malware domain name? If so, then proceed to W3, otherwise, proceed to W1.
W3. Send a marker DNS response message associated with the malware domain name to the corresponding client device.

The client device will receive the marker DNS response message and store the marker information in a DNS cache. The marker DNS response message may include the original malware domain name and associated marker information (e.g. temporal marker information, marker IP address information associated with the malware domain name, additional marker DNS record information). Alternatively or additionally, the marker DNS response message may include a marker domain name in place of the malware domain name. The stored marker DNS record information may then be used, when the client device attempts to access a communication network, for detecting whether the client device is marked (e.g. temporally marked) as infected with malware.

As an option, the marker information may be data representative of one or more marker domain names, marker IP addresses, mappings of marker domain names and marker IP addresses, marker time-to-live (TTL) value(s) that is sufficiently large to ensure the marker information is still in the DNS cache of the client device when it attempts to connect to a communication network via the connection system.

In FIG. 3b, the connection system performs a procedure based on the following steps, which may be performed concurrently to the method steps W1-W3:

X1. Receive an access/connection request from a client device for connecting to a communication network location or a communication network (e.g. the Internet). Proceed to X2.

X2. Send marker detection information for identifying client devices marked as infected with malware. Proceed to X3.

X3. Receive an indication from the client device as to whether the client device is marked as infected with malware. Proceed to X4.

X4. Determine from the indication whether client device is infected with malware. If the client device is determined to be infected with malware based on the indication, then proceed to X5. Otherwise, proceed to X6.

X5. Prevent/block client device access to the communication network in relation to connection request. Proceed to step X1.

X6. Grant the client device access to the communication network. Proceed to step X1.

As an option, the malware status of the client device(s) being blocked could be determined.

If status of client device is clean, the client device may be granted access to the communication network (e.g. Internet), otherwise, keep blocking client device access/access attempts/connection requests to communication network until receive a clean status report. A client device may carry out a reciprocal method for detecting whether the client device is marked (temporally) as infected with malware by a connection system or an apparatus as described herein. The method may include the following steps of: transmitting a connection request from the client device to the connection system for access to the communication network; receiving marker detection information from the connection system at the client device for identifying whether client device is marked as infected with malware; sending an indication to the connection system as to whether the client device is marked as infected with malware for use in determining whether to block or grant access to the communication network in relation to the connection request.

As another option, the marker detection information may include instructions for configuring the client device to determine whether the client device has been temporally marked as infected with malware. The marker detection information may configure a web browser of the client device to check the DNS cache of the client device for matching marker information indicating the client device is infected with malware. Alternatively, the marker detection information may configure the client device to communicate with the connection system for determining whether the client device is infected with malware.

Optionally, the indication may be in the form of a persistent marker stored on the client device, which may be stored on non-volatile storage of the client device. The indication may be in the form of a marker resource, file or web cookie stored on the client device (other forms may be considered). On determining the client device is infected with malware, the marker detection information may configure a web cookie to be stored on the client device. When the client device is determined to have marker information stored in its DNS cache, i.e. it has been temporally marked as infected with malware, a web cookie may be stored on the client device with data indicating that the client is infected with malware. The data may also include information related to the type of malware that may be infecting the client device. The web cookie is sent from or downloaded from the client device to a connection system and indicates to the connection system whether the client device is infected with malware.

Figure 3C:
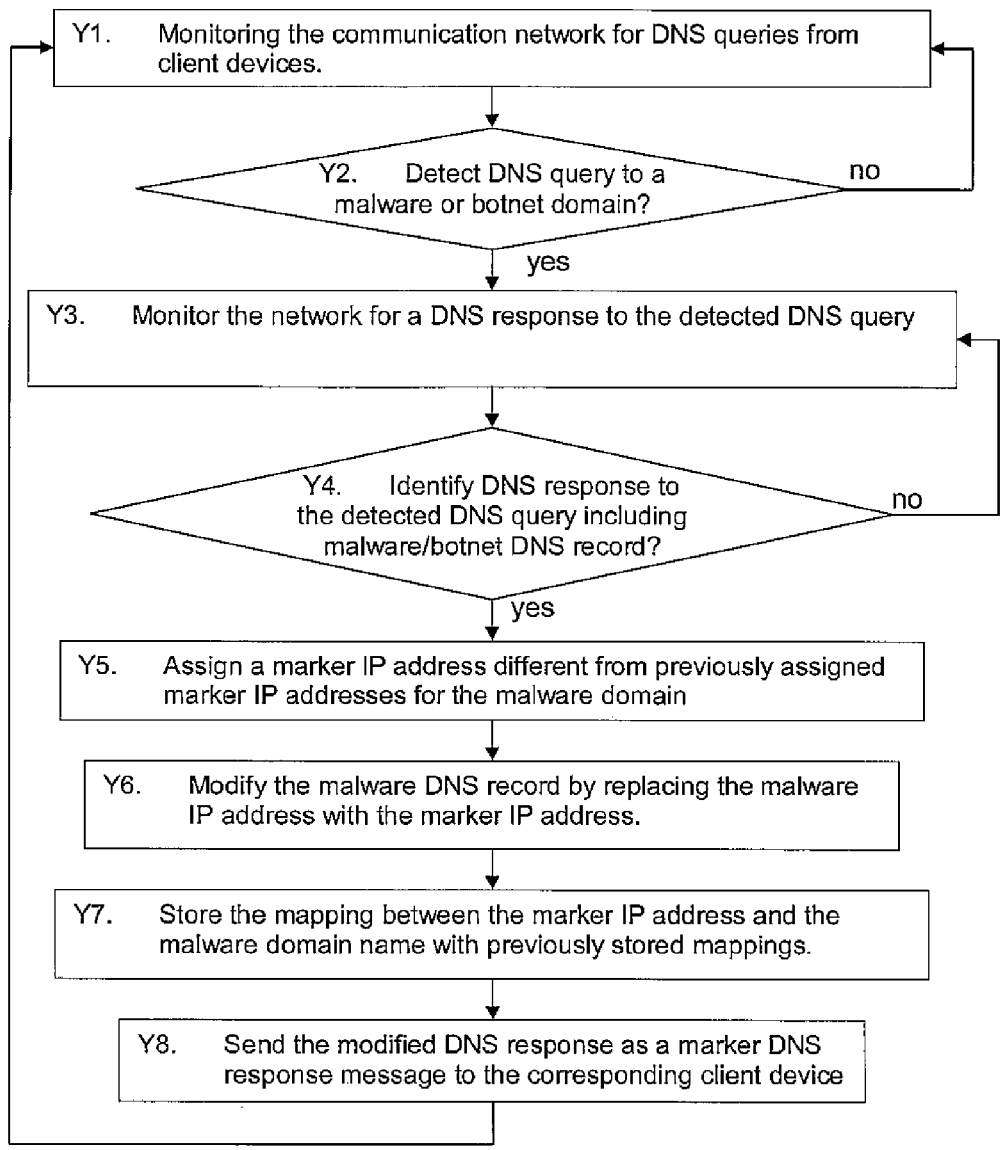
FIG. 3c is a flow diagram illustrating a procedure carried out by an apparatus for marking client devices infected with malware.
Figure 3D:
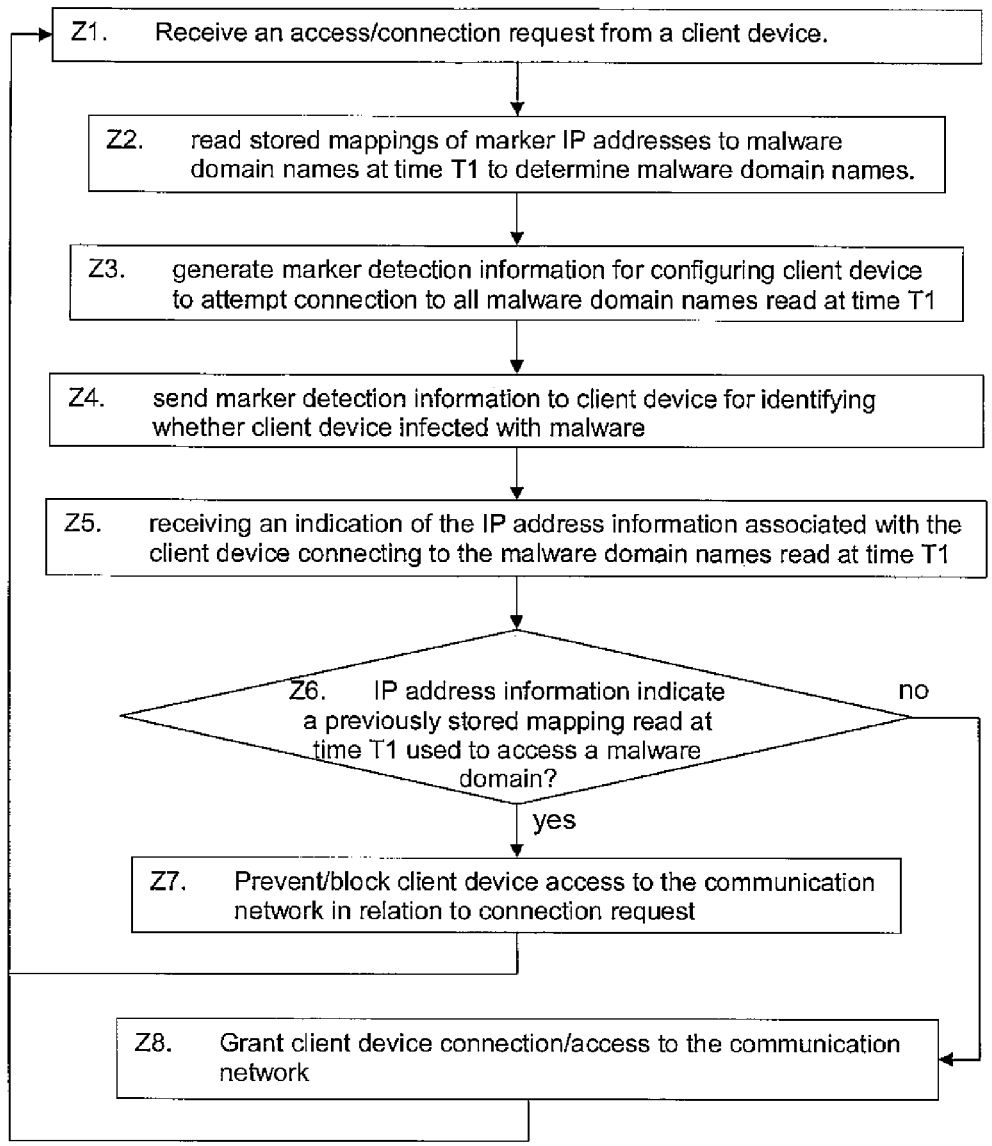
FIG. 3d is a flow diagram illustrating a procedure carried out by the apparatus or a connection system for detecting client devices that have been marked according to FIG. 3c.

FIGS. 3c and 3d are flow diagrams illustrating further example methods carried out by apparatus for marking/detecting client devices infected with malware and connection system for detecting client devices marked as infected with malware. In FIG. 3c, the apparatus performs a procedure based on the following steps:

Y1. Monitoring the network for DNS queries from client devices. Proceed to Y2.

Y2. Detect a DNS query message from a client device including malware domain name (e.g. a botnet domain name). If yes, then proceed to Y3. Otherwise continue monitoring for a DNS query messages, proceed to Y1.

Y3. Monitor the network for DNS responses to the detected DNS query for the client device. Proceed to Y4.

Y4. Identify a DNS response message corresponding to the detected DNS query message, the DNS response message including a malware DNS record with a malware IP address corresponding to the malware domain name. If yes, then proceed to Y5, otherwise continue monitoring for the DNS response.

Y5. Assign a marker IP address different from previously assigned marker IP addresses for the malware domain in relation to other DNS queries. Proceed to Y6.

Y6. Modify the malware DNS record in the DNS response by replacing the malware IP address with the marker IP address. Proceed to Y7.

Y7. Store a mapping between the assigned marker IP address and the malware domain name in a database including previously stored mappings.

Y8. Send the modified DNS response as a marker DNS response message to the corresponding client device. Proceed to Y1.

The client device will receive the marker DNS response message and store the modified malware DNS record including the malware domain name and the marker IP address in a DNS cache of the client device. The marker IP address is different to the original malware IP address and constitutes a marker that can be used, when the client device attempts to access a communication network, to detect whether the client device is marked as infected with malware.

The method may further include the following steps as illustrated in FIG. 3d, which may be performed concurrently to the method steps Y1-Y8:

Z1. Receive an access/connection request from a client device of a plurality of client devices for connecting to a communication network location or communication network (e.g. the Internet). Proceed to Z2.

Z2. Read from database at time T1 the stored mappings of marker IP addresses to malware domain names to determine malware domain names. Proceed to Z3.

Z3. Generate marker detection information (e.g. instruction code such as JavaScript) for use in configuring client device (e.g. a web browser of the client device) to make connection attempts to all determined malware domain names that were read from database at time T1. Proceed to Z5.

Z4. Send the marker detection information to the client device for identifying whether client device infected with malware. Proceed to Z5.

Z5. Receive an indication of the IP address information associated with the client device connecting to the malware domain names read at time T1.

Z6. Determine if IP address information indicates a previously stored mapping read at time T1 was used by the client device to make an access/connection attempt to one of the determined malware domains. If at least one IP address used by the client device when connecting to a malware domain name matches a previously stored mapping read at time T1, then proceed to Z7. Otherwise proceed to Z8.

Z7. Prevent/block client device access to the communication network in relation to connection request.

Z8. Grant the client device access to the communication network. Proceed to step Z1.

As an option, the malware status of the client device(s) being blocked could be determined by a web cookie as previously described. If status of client device is clean, the client device may be granted access to the communication network (e.g. Internet), otherwise, keep blocking client device access/access attempts/connection requests to communication network until receive a clean status report.

Step Z6 may further include, for each connection attempt to a malware domain name, determining that the client device is infected with malware when the IP address information indicates an IP address used by the client device in the attempt to connect to the malware domain name matches a previously stored mapping. Step Z6 may also include, for each connection attempt to a malware domain name, determining that the client device is not infected with malware when the IP address information indicates an IP address used by the client device in the attempt to connect to the malware domain name does not match a previously stored mapping.

As an option, as the previously stored mappings are mappings read from a database at time T1, and, if the client device is a clean client device or is not infected with malware associated with a particular malware domain name, then steps Y1-Y8 will be performed after time T1 for any DNS query that the client device makes when it attempts to connect to a determined malware domain name that is unknown to the client device (i.e. the client device does not have the malware domain name stored in its DNS cache). This means that, the client device will use IP addresses based on the marker DNS responses generated in step Y8, and these IP addresses that are used by the client device for attempting to connect to the unknown determined malware domain names will correspond to mappings stored in the database after time T1. So, these mappings can be cleared from the database and the DNS cache of the client device, otherwise the client device will be considered to be marked as infected with malware associated with these malware domain names when it is not. The procedure may further identify and remove these mappings stored in the database after time T1 that were used by the client device when attempting to connect to the corresponding malware domain names.

A client device may carry out a reciprocal method for detecting whether the client device is marked (temporally) as infected with malware by a connection system or an apparatus as described herein. The marker detection information may configure the client device to perform a method based on the following steps of: connecting to all malware domains associated with the previously stored mappings of marker IP addresses to malware domain names. For each connection attempt to a malware domain name: determining that the client device is infected with malware when an IP address used by the client device in the attempt to connect to the malware domain name matches a previously stored mapping; and determining that the client device is not infected with malware when an IP address used by the client device in the attempt to connect to the malware domain name does not match a previously stored mapping; where, the indication includes IP address information associated with the connection attempts by the client device to the malware domain names.

Additionally or alternatively, the marker detection information may configure the client device to perform the steps of connecting to all malware domains associated with the previously stored mappings of marker IP addresses to malware domain names, and for each connection attempt to a malware domain name, the client device may be configured to a) determine that the client device is infected with malware when an IP address used by the client device in the attempt to connect to the malware domain name matches a previously stored mapping; and/or b) determine that the client device is not infected with malware when an IP address used by the client device in the attempt to connect to the malware domain name does not match a previously stored mapping. The indication includes data representative of whether the client device is infected with malware. For example, the marker detection information may configure the client device to generate the indication to include data representative of whether the client device is infected with malware. The indication may be a web cookie that is stored on the client device, where the web cookie includes data representative of whether the client device is infected with malware, and the step of receiving the indication further comprises the connection system retrieving the web cookie from the client device. In which case steps Z5 and Z6 may be combined into a step of receiving/retrieving the indication from the client device, in which the indication is checked to determine whether the client device is infected with malware.

Optionally, the previously stored mappings are mappings read from a database at time T1, and included in the marker detection information, and the IP addresses used by the client device for attempting to connect to the malware domain names correspond to mappings stored in the database after time T1.

Figure 3E:
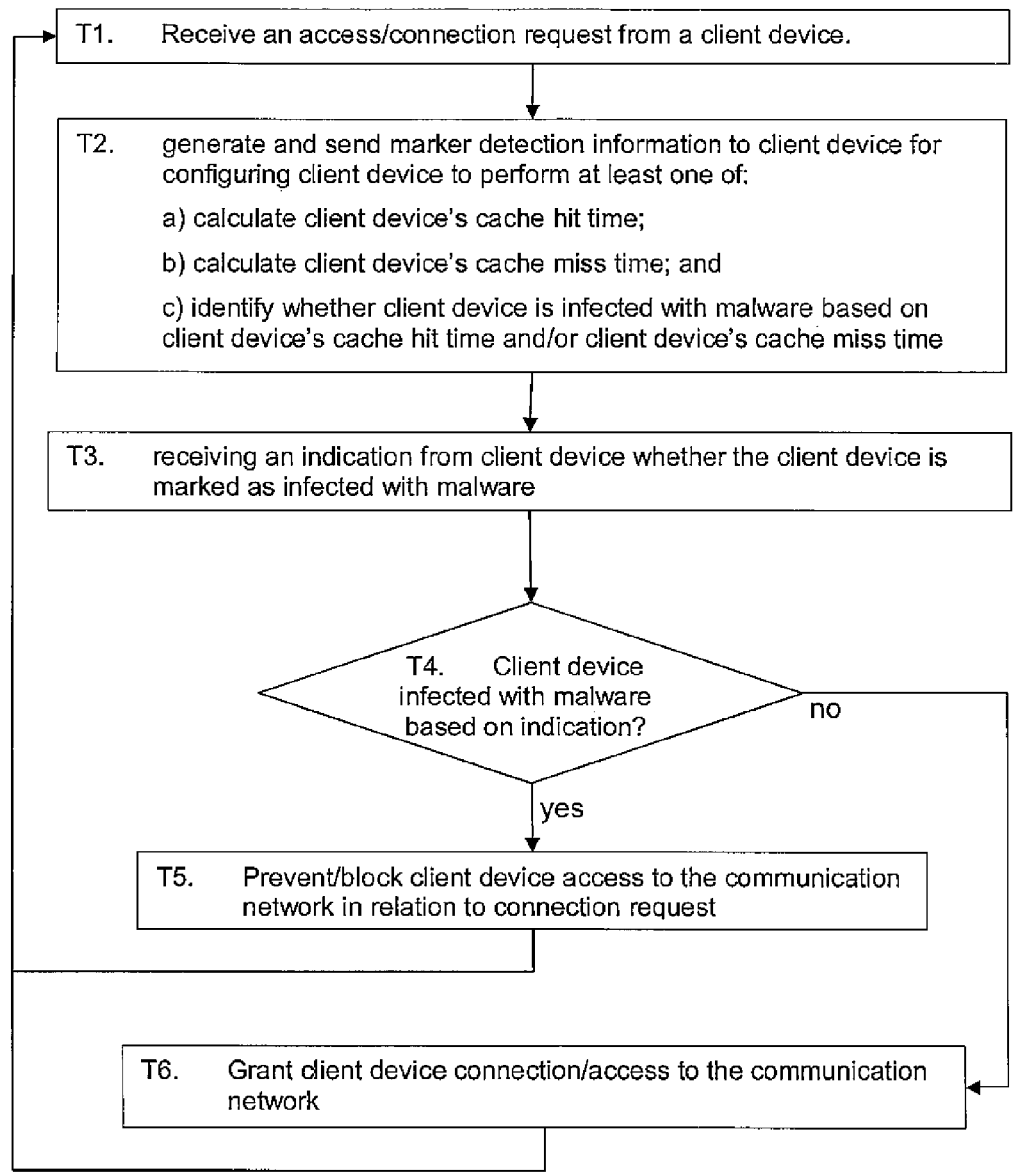
FIG. 3e is a flow diagram illustrating a procedure carried out by the apparatus or a connection system for detecting/marking client devices that have been marked as infected.
Figure 3F:
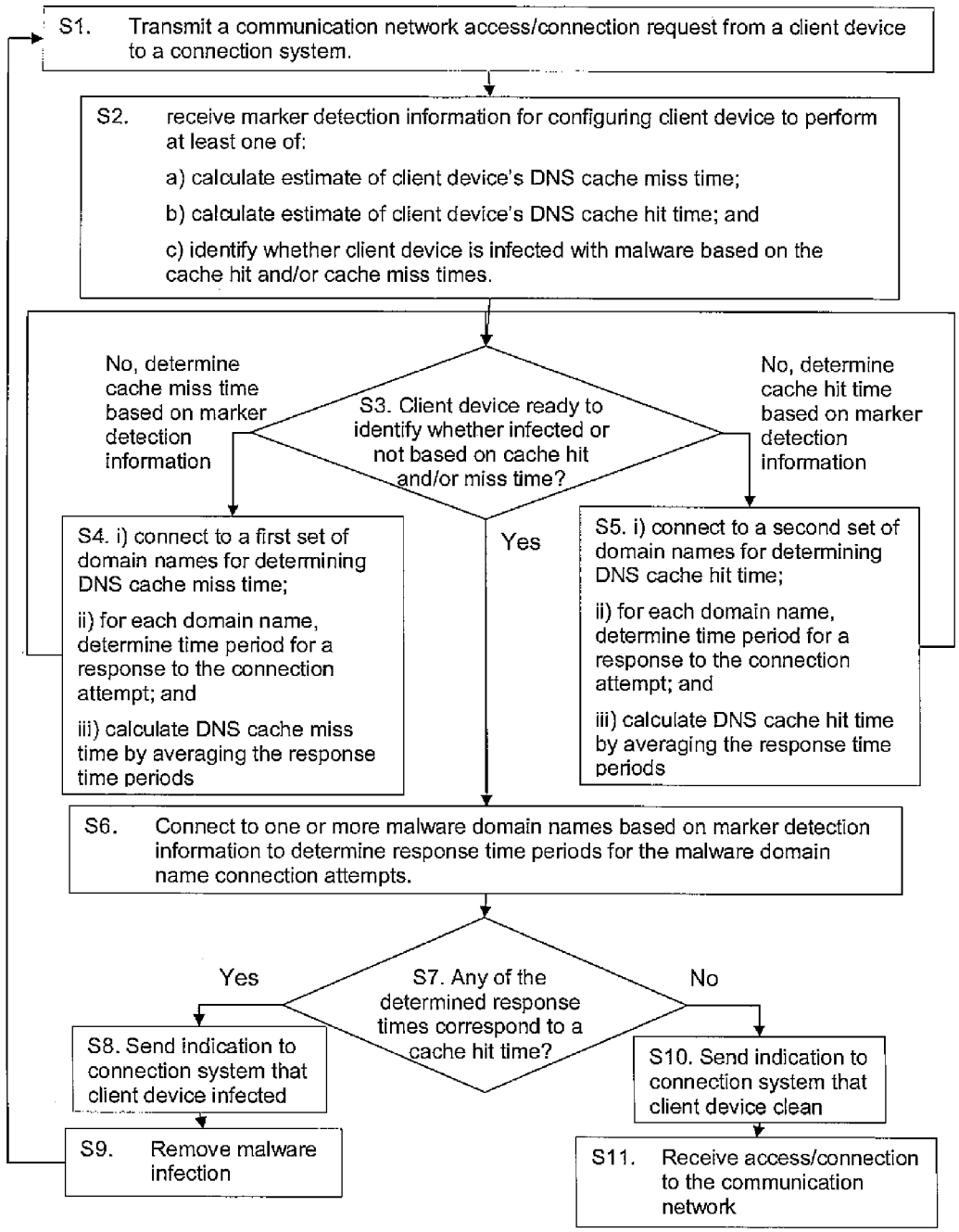
FIG. 3f is a flow diagram illustrating a procedure carried out by a client device in response to the procedure of FIG. 3e.

FIGS. 3e and 3f are flow diagrams illustrating example methods carried out by a connection system or apparatus for detecting/marking client devices infected with malware and a client device in response, respectively. The method steps performed by the apparatus (or connection system) are described with reference to FIG. 3e as follows:

T1. Receive an access/connection request from a client device. Proceed to step T2.

T2. Generate and send marker detection information to the client device for configuring the client device to perform at least one of:
 a) calculate the client device's DNS cache hit time;
 b) calculate the client device's DNS cache miss time;
 c) identify whether the client device is infected with malware based on the client device's cache hit time and/or the client device's cache miss time.
 Proceed to T3.

T3. Receiving an indication from the client device indicating whether the client device is infected with malware. Proceed to T4.

T4. Determining whether the client device is infected with malware based on the indication. If the client device is infected with malware (e.g. yes) then proceed to step T5. Otherwise, proceed to step T6.

T5. Prevent/block the client device access to the communication network in relation to the connection request. Proceed to T1.

T6. Grant client device connection/access to the communication network in relation to the communication request. Proceed to T1 for receiving other connection requests.

As described previously, the indication may be in the form of a persistent marker that maybe stored on the client device, e.g. in non-volatile memory. For example, the indication may be a web cookie that is stored on the client device, where the web cookie includes data representative of whether the client device is infected with malware, and the step of receiving the indication further comprises the connection system retrieving the web cookie from the client device. The web cookie may include an indication of the type of malware infection.

The method steps performed by the client device are described with reference to FIG. 3f as follows:

S1. Transmit a communication network access/connection request from the client device to the apparatus or connection system. Proceed to step S2.

S2. Receive marker detection information for configuring the client device to perform at least one of:
  a) calculate an estimate of the client device's DNS cache miss time;
  b) calculate an estimate of the client device's DNS cache hit time;
  c) identify whether the client device is infected with malware based on the cache hit time and/or the cache miss time.
  Proceed to step S3.

S3. Determine whether the client device is ready to identify whether the client device is infected with malware based on the cache hit time and/or the cache miss time. If the client device needs to calculate an estimate of the client device's DNS cache miss time, then proceed to step S4. The client device may have already calculated a DNS cache miss time, so it may not be necessary to recalculate the DNS cache miss time. However, if a sufficient period of time has elapsed since the previous calculation, the DNS cache miss time may be inaccurate and so the client device may proceed to step S4 to recalculate the client device cache miss time. If the client device needs to calculate an estimate of the client device's DNS cache hit time, then proceed to step S5. The client device may have already calculated a DNS cache hit time, so it may not be necessary to recalculate the DNS cache hit time. However, if a sufficient period of time has elapsed since the previous calculation, the DNS cache hit time may be inaccurate and so the client device may proceed to step S5 to recalculate the client device cache hit time. If the client device is ready (e.g. has up-to-date estimates of the DNS cache miss and/or hit times) to identify whether the client device is infected with malware based on the cache hit time and/or the cache miss time, then proceed to step S6.

S4. Perform the steps of estimating the DNS cache miss time by:
  i) connecting to a first set of domain names for determining DNS cache miss time, it is assumed that the first set of domain names are unknown to the client device and are not within the DNS cache of the client device.
  ii) for each domain name, determine the time period for a response to the connection attempt.
    For each domain name, this time period may include the time it takes when the connection attempt is made until when the connection system responds to the connection attempt. This time period may include the time taken to transmit a DNS query, receive a DNS response, transmit a connection request in relation to the domain name, and receive a response in relation to the connection request from the connection system; and
  iii) calculate an estimate of the DNS cache miss time by averaging the response time periods for all connection attempts.
  Proceed to step S3.

S5. Perform the steps of estimating the DNS cache hit time by:
  i) connecting to a second set of domain names for determining DNS cache miss time, it is assumed that the second set of domain names are known to the client device and are located within the DNS cache of the client device. If step S4 has been performed, the second set of domain names may be the first set of domain names, which should be in the DNS cache after having performed step S4.
  ii) for each domain name, determine the time period for a response to the connection attempt.
    For each domain name, this time period may include the time it takes when the connection attempt is made until when the connection system responds to the connection attempt. This time period may include the time taken to simply transmit a connection request in relation to the domain name, and receive a response in relation to the connection request from the connection system; and
  iii) calculate an estimate of the DNS cache hit time by averaging the response time periods for all connection attempts.
  Proceed to step S3.

S6. Based on the marker detection information, connect to one or more malware domain names to determine response time periods for the malware domain name connection attempts. Proceed to S7.

S7. Determine if any of the response time periods for the malware domain name connection attempts correspond to an estimated DNS cache hit time. If at least one response time period corresponds to the estimated DNS cache hit time, then proceed to S8. Otherwise, proceed to S9.

S8. Send an indication to connection system that client device infected. The indication may be a web cookie stored on the client device that includes data representative of the client device being infected with malware. The web cookie may include an indication of the type of malware infection. Proceed to step S9.

S9. Remove the malware infection. The client device may be configured to download a malware removal tool from the connection system to allow it to remove the malware infection. Once clean, the malware removal tool may remove the web cookie to indicate the client device is clean. Proceed to step S1 for transmitting a connection request.

S10. Send an indication to the connection system that client device is clean. This may include setting a web cookie on the client device with data indicating the client device is clean. Proceed to step S11.

S11. Receive access/connection from the connection system allowing the client device to access the communication network.

As an option, the marker detection information configures the client device to perform the steps of: connecting to a first set of domain names for calculating a DNS cache miss time of the client device, wherein the first set of domain names comprises one or more domain names for use in determining the DNS cache miss time; and connecting to a set of malware domain names for determining a corresponding set of connection time periods for use in determining whether the client device is marked as infected with malware based on the DNS cache miss time. Alternatively or additionally, the client device may be further configured to connect to a second set of domain names for calculating a DNS cache hit time, wherein the second set of domain names comprises one or more domain names for use in calculating the DNS cache hit time; and connecting to a set of malware domain names for determining a corresponding set of connection time periods for use in determining whether the client device is marked as infected with malware based on the DNS cache hit time.

Optionally, calculating the DNS cache miss time of step S4 may further include: determining, for each connection attempt to a domain name in the first set of domain names, the response time period associated with the connection attempt to the domain name in the first set and a response from the connection system; and calculating the DNS cache miss time by averaging the determined response time periods associated with the first set of domain names.

As an option, step S7 may include determining whether the client device is marked as infected with malware by comparing, for each connection attempt, the corresponding determined connection time period with the DNS cache miss time and determining the client device to be clean when all the corresponding connection time periods indicate a DNS cache miss. Optionally, the corresponding connection time period indicates a DNS cache miss when the corresponding connection time period corresponds to the DNS cache miss time or is substantially larger than the DNS cache miss time.

Optionally, calculating the DNS cache hit time of step S5 may further include determining, for each connection attempt to a domain name in the second set of domain names, the response time period associated with the connection attempt to the domain name in the second set and a response from the connection system, and calculating the DNS cache hit time by averaging the determined response time periods associated with the second set of domain names.

As an option, step S7 may include determining whether the client device is marked as infected with malware by comparing, for each connection attempt to a malware domain name, the corresponding determined connection time period with the DNS cache hit time, and determining the client device to be infected with malware when the corresponding connection time period indicates at least one DNS cache hit. Optionally, the corresponding connection time period indicates a DNS cache hit when the corresponding connection time period corresponds to the DNS cache hit time.

The marker detection information may include marker detection instructions for use in configuring the client device to indicate whether or not it is infected with malware, for example, the detection instructions may be based on JavaScript or other suitable programming language or software.

Figure 3G:
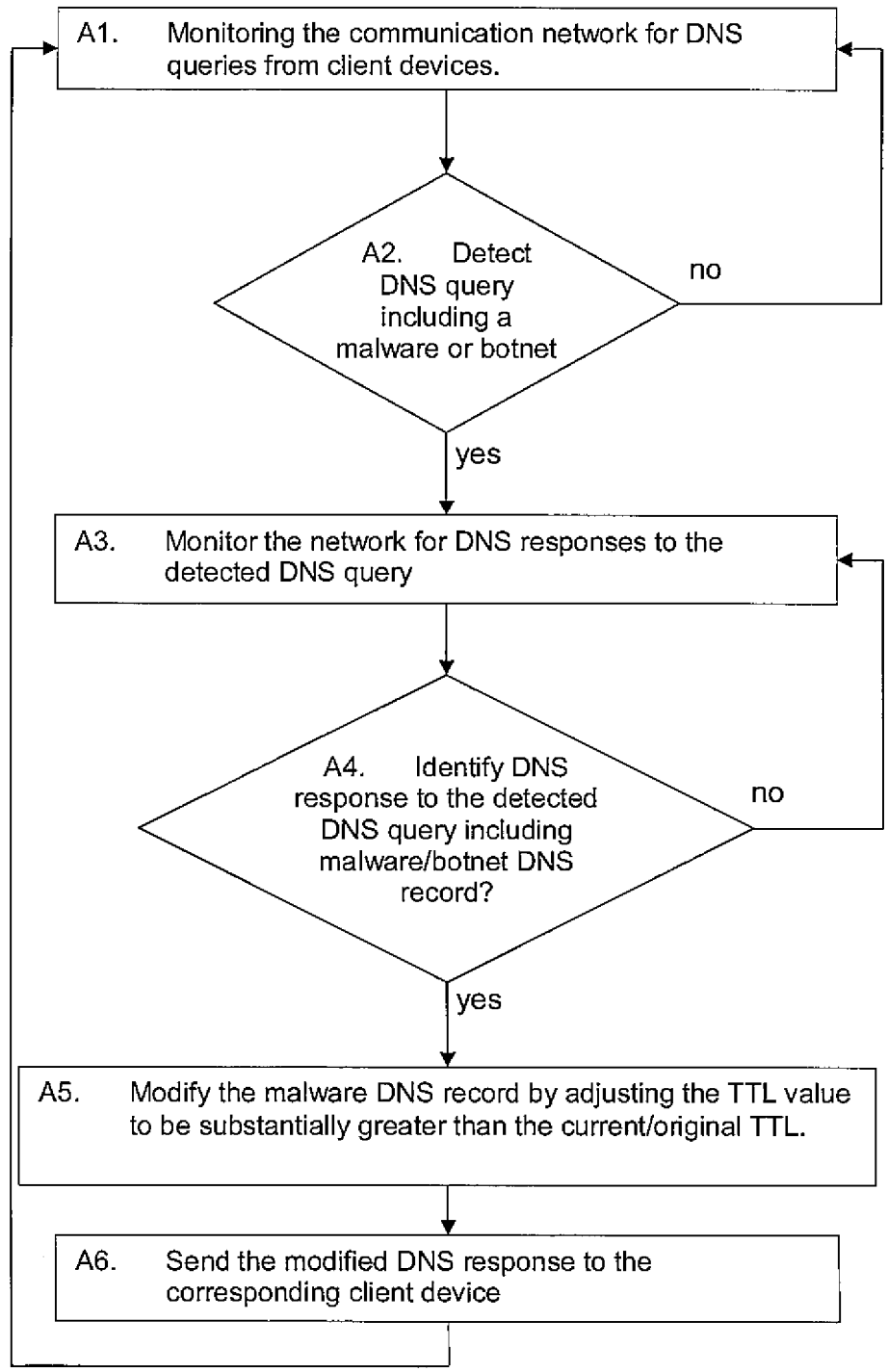
FIG. 3g is a flow diagram illustrating a procedure carried out by an apparatus for detecting client devices with malware and marking with a temporal marker.
Figure 3H:
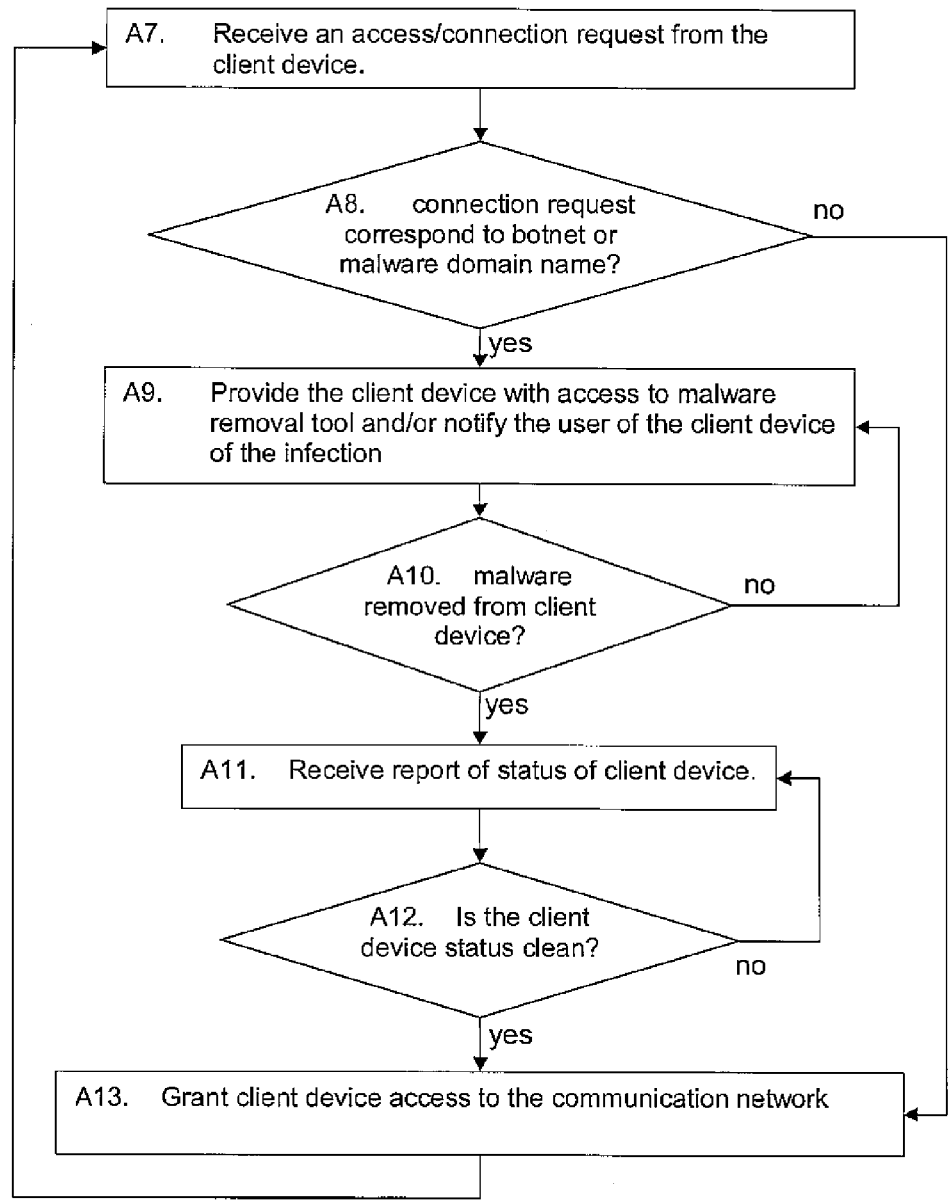
FIG. 3h is a flow diagram illustrating a procedure carried out by the apparatus or a connection system for detecting client devices that have been marked according to FIG. 3g.

FIGS. 3g and 3h are flow diagrams illustrating example methods carried out by an apparatus for marking and detecting client devices infected with malware. The method(s) are outlined by the following steps:

A1. Monitoring the network for DNS queries from client devices. Proceed to A2.
A2. Detect a DNS query message from a client device including malware domain name (e.g. a botnet domain name). If yes, then proceed to A3. Otherwise continue monitoring for a DNS query.
A3. Monitor the network for DNS responses to the detected DNS query for the client device. Proceed to A4.
A4. Identify a DNS response message corresponding to the detected DNS query message, the DNS response message including a malware DNS record with an IP address corresponding to the malware domain name and a time-to-live value. If yes, then proceed to A5, otherwise continue monitoring for the DNS response.
A5. Modify the DNS response message by adjusting the malware DNS record time-to-live value to be substantially greater than the current/original time-to-live value. Proceed to A6.
A6. Send the modified DNS response message to the corresponding client device in place of the original DNS response message. Proceed to step A1 for more monitoring of DNS queries from client devices.

The method may further include the following steps as illustrated in FIG. 3h, which may be performed concurrently to the method steps A1-A6:

A7. Receive an access/connection request from the client device for connecting to a communication network location.
A8. Is the client device connecting to a communication location corresponding to a malware domain name. If yes, proceed to A9. Otherwise, proceed to step A13.
A9. Provide the client device with access to a malware removal tool configured to detect malware associated with the malware domain name in the DNS cache of the client device. For example, a browser application on the client device may be provided with a web page for downloading the malware removal tool. This effectively places the client device in a walled garden, blocks and prevents the client device from accessing the communication network.
A10. Did client device download malware removal tool? If yes, proceed to A11. Otherwise, proceed to A9.
A11. Receive a status report from the malware removal tool or client device indicating the client device was infected with malware and is clean. Proceed to A12.
A12. If status of client device is clean, then proceed to step A13. Otherwise, keep blocking client device access to communication network until receive a clean status report, proceed to A11.
A13. Grant the client device access to the communication network.

As an option, the adjusted time-to-live value of the malware domain name is in the order of one or more month(s).

Figure 4A:
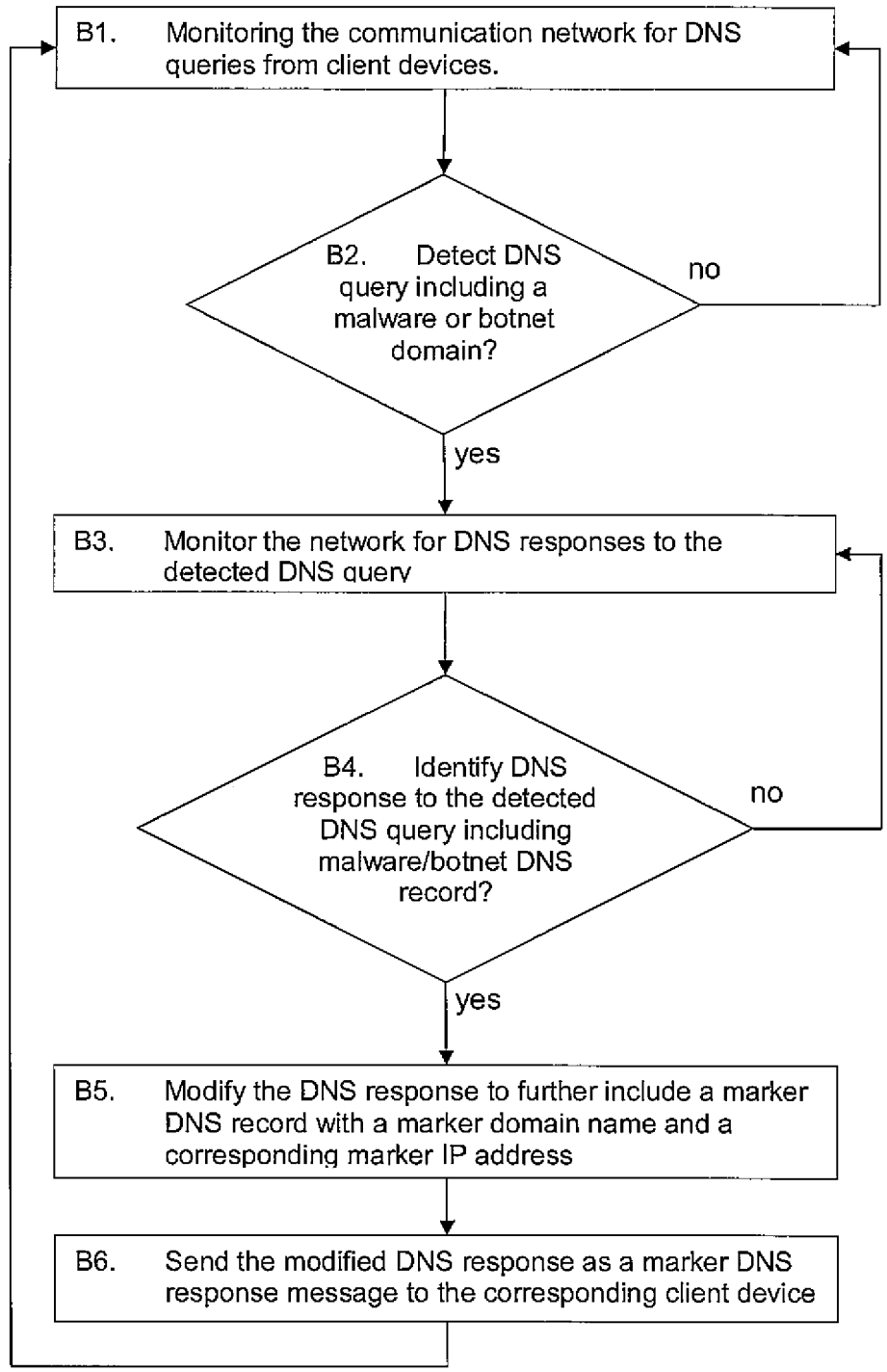
FIG. 4a is a flow diagram illustrating another example procedure carried out by an apparatus for detecting client devices with malware and marking with a temporal marker.

FIG. 4a is a flow diagram illustrating another example method carried out by an apparatus for marking client devices infected with malware. The method is outlined by the following steps:

B1. Monitoring the communication network for DNS queries from client devices for detecting a DNS query message from a client device including a malware domain name (e.g. a botnet domain name).
B2. Detect a DNS query message from a client device including a malware domain name? If yes, proceed to B3. Otherwise continue monitoring DNS traffic, proceed to B1.
B3. Monitor the network for DNS response(s) to the detected DNS query for the client device. Proceed to B4.
B4. Identify a DNS response message corresponding to the detected DNS query message, the DNS response message including a malware DNS record comprising an internet protocol, IP, address corresponding to the malware domain name. If yes, then proceed to B5. Otherwise, continue monitoring DNS traffic and proceed to B3.

B5. Modify the DNS response message to further include a marker DNS record comprising a marker domain name and a corresponding marker IP address. Proceed to B6.

B6. Sending the modified DNS response message to the corresponding client device in place of the original DNS response message.

The client device may operate behind a NAT device. Modifying the DNS response message may further include setting a time-to-live (TTL) value for the marker DNS record to be substantially greater than the TTL value corresponding to the malware DNS record. The TTL value for the marker DNS record can be of the order of one or more month(s). Modifying the DNS response message may further include setting the TTL value for the malware DNS record to be substantially greater than a default TTL value or the TTL value originally allocated to the malware DNS record. The TTL value modified to be large enough to ensure the marker or malware DNS record are less likely to be removed before the client device requests access to the communication network. For example, the TTL value for the marker DNS record should be sufficiently large enough to ensure the marker DNS record is still in the DNS cache when the client device attempts to access the communication network. Similarly, in addition to or alternatively, the TTL value for the malware DNS record should be sufficiently large enough to ensure the malware DNS record is still in the DNS cache when the client device attempts to access the communication network. For example, the connection system may determine, depending on the possible behaviour of the client device and/or use of the client device, that the TTL value for the marker DNS record is of the order of one or more hour(s), one or more day(s), or one or more month(s). Of course, it is possible, in extreme circumstances, to set the TTL value to be of the order of one or more year(s). In addition, modifying or setting the DNS response message may further comprise setting the TTL value for the malware DNS record to be the same as the TTL value of the marker DNS record.

The modified DNS response message is for use by the client device in storing the marker domain name and marker IP address, where the marker domain name and IP address are for use by a detection system in determining whether the client device is infected with malware, and whether to allow the client device access to the communication network or not.

The apparatus is arranged to intercept DNS query messages and DNS response messages for marking client devices infected by malware. The apparatus may be a component of an IDS, or part of a DNS server or other part of an ISP system or network. Alternatively, a DNS server may include the functionality of the apparatus. As another option, a connection system or communication service provider system may include the functionality of the apparatus.

Figure 4B:
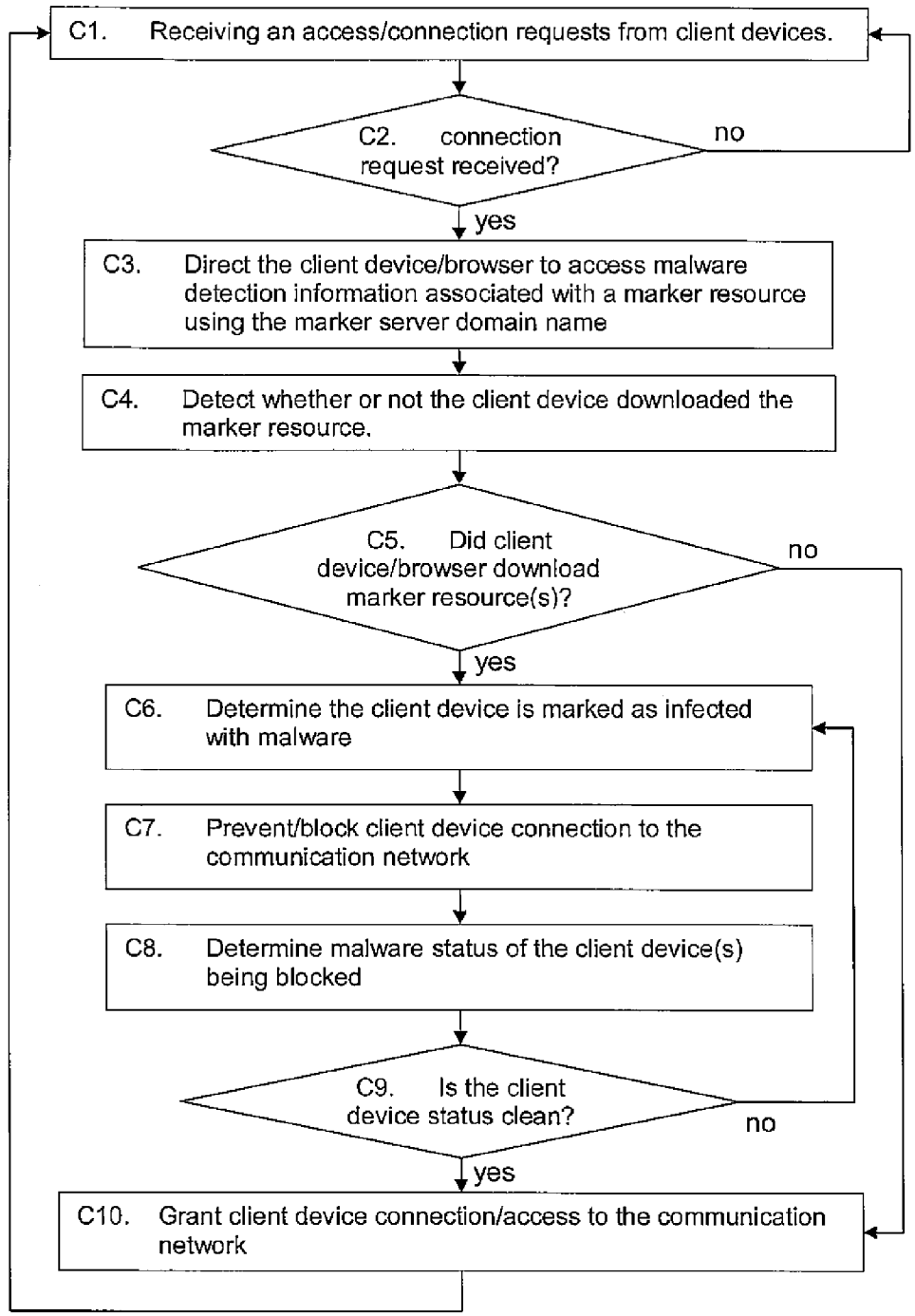
FIG. 4b is a flow diagram illustrating a procedure carried out by a connection system for detecting client devices marked as infected with malware and marking with a persistent marker.

FIG. 4b is a flow diagram illustrating a method carried out by a detection system for detecting a client device marked as infected with malware. The system may include or have access to a marker server including a marker resource stored thereon. The marker server is unknown to DNS servers accessible by the client device. The method is outlined by the following steps:

C1. Receiving access/connection requests from client devices for access to a communication network. These may be connection requests (or connection request messages) based on any suitable communication protocol, e.g. TCP or UDP etc.

C2. If a connection request is received, proceed to C3. Otherwise, continue monitoring for access/connection requests, proceed to C1.

C3. Direct the client device/application of client device to access marker detection information associated with the marker resource using only the marker server domain name. For example, the application may be a web browser and is provided with a controlled web page including a marker resource link directed to the marker resource. Proceed to C4.

C4. Detect whether or not the client device downloaded the marker resource, or had it in cache already. If yes, proceed to step C5. Otherwise proceed to step C9.

C5. If the client device downloaded the marker resource, or had it in the cache already, then proceed to step C6. Otherwise proceed to step C9.

C6. Determine the client device is marked as infected with malware. Proceed to C7.

C7. Prevent/block the client device connection/access to the communication network. Client device may be placed in a closed platform or walled garden until it is deemed to be clean. While in the walled garden, the client device(s) infected with malware may download a malware removal tool, which removes the malware and also removes the marker resources, marker domain name, and marker IP address such that the client device(s) may be considered clean. Proceed to C8.

C8. What is status of the client device? Has malware been removed from client device? Proceed to C9.

C9. If client device status is clean, then proceed to C10. Otherwise monitor whether client device has been cleaned, proceed to C6/C7.

C10. Grant the client device connection/access to the communication network.

If the marker resource link or marker server domain name are not fully or immediately resolvable on the client device, even though the client device is marked as infected, then as the marker server domain name is associated with a malware domain name, prior to providing the client device with marker detection information associated with the marker server domain name and/or marker resource, the client device is provided with the associated malware domain name. This may allow the DNS cache of the client device to "release" the marker server domain name and IP address in the additional marker DNS record stored therein. Providing the client device with the malware domain name may further include directing the client device to access a webpage including a malware link associated with the malware domain name.

The client device may be one of a multiplicity of client devices operating behind a NAT device. As an example, detecting whether the client device downloaded the marker resource may include detecting whether the client device sends a DNS query message in relation to the marker resource link. If the client device sends a DNS query message, then, it may be determined that the client device did not download the marker resource. However, if the client device does not send a DNS query message, this means that the client device can resolve the marker domain name, and hence has downloaded the marker resource, so the client device is marked as infected with malware and it is indicated to the system that the client device downloaded the marker resource. Alternatively, the system may check whether the client device has or had the marker resource in the cache already—i.e. absence of a DNS query and even evidence any download may be enough indication the client device already has the marker resource in a cache.

Instead of using cache, cookies may also be used or stored in the connection system or on a server or proxy server for use in detecting whether client devices have downloaded the marker resource successfully. For example, when first downloading the marker resource (infection marker) successfully, the connection system may set a cookie to be stored on the client device as an indication that the download was successful for this connection, the client device application or browser etc. If the application cache content checking fails for any reason, i.e. there is no detection of downloading the marker resource and there is no detection of a DNS query to the marker server domain name, then the connection system may make a further check for the existence of any cookie set on the client device. If a cookie is set on the client device associated with the connection, application or client device, then this indicates that the client device did previously successfully download the marker resource, and so has been marked as infected. The infected client device may then be blocked from accessing the communication network in relation to the connection request until the client device has had the malware removed. Once the client device is confirmed to be clean, then the cookie that was set in relation to the client device, application of the connection(s) or connection requests, may be removed from the client device. If no cookie is found, then the client device may be considered to be a clean client device and a proxy password may be set for allowing the client device or application thereof to connect to the communication network. In addition or alternatively, clean client devices may also have a cookie set to indicate the client device is clean.

The marker server has a marker domain name and a marker Internet protocol address that is unknown to all DNS servers. If a DNS server were to figure out, or able to resolve the marker domain name and/or marker IP address, then even clean client devices will be able to resolve the marker domain name/IP address and the connection system will then be unable to detect which client devices are infected with malware and which are not.

The marker resource may provide an indication to the user of the client device that the client device is infected with malware. The detection system may send a malware removal tool to the client device when it is determined the client device is marked as infected with malware. This may be automatic. Alternatively, preventing access further includes providing a malware removal tool link or download to the client device for removing the detected malware infection. The client device may have anti-virus software that is configured to receive scanning information for removing the malware and also the marker resource, marker domain name and marker IP address. Once removed, the connection system can be informed such that the connection system will treat the client device as clean. Granting the client device, when it is determined to be clean, access to the communication network can include allocating an access password to the client device for use in accessing the communications network. The access password may only be known to the client device, or application on the client device associated with the connection request for use in connecting to the communication network in relation to the connection request. The detection system may further include the functionality of the apparatus for marking the client device as described in steps B1-B4.

Although each of the methods or procedures performed by apparatus, connection systems and/or client devices have been separately described herein and or described and illustrated with reference to FIGS. 3a-4b, it is to be appreciated by the skilled person that these methods or procedures may be combined with each other to further improve the accuracy or reliability of marking and detecting client devices that may be infected with malware.

As mentioned previously, although the above methods and procedures are described in relation to detecting and marking client devices to be infected with malware, it is to be appreciated by the person skilled in the art that the above methods and procedures may be applied to detecting and marking client devices accessing a particular domain name of interest. For example, an internet service provider operator may have a list or database of domain names of interest for monitoring which client devices (behind a NAT or not) are accessing.

An example procedure that may be carried out by an apparatus for marking client devices accessing domain names may be outlined by the following steps of detecting a DNS query message from a client device including a domain name from a list of domain names; Identifying a DNS response message corresponding to the detected DNS query message, the DNS response message including a DNS record comprising the IP address corresponding to the domain name; Modifying the DNS response message to form a marker DNS response message further including the DNS response message and marker information associated with the domain name; Sending the marker DNS response message to the client device for use in detecting whether the client device has accessed the domain name when the client device requests access to a communication network.

An example reciprocal procedure that may be carried out by a connection system for detecting whether a client device is marked as accessing a particular domain name form a list of domain names may be outlined by the following steps of receiving a connection request from the client device of the plurality of client devices for access to a communication network; Sending marker detection information associated with the particular domain name to the client device for identifying whether client device accessed the particular domain name; Receiving an indication from the client device as to whether the client device has accessed the particular domain name; Determining, from the indication, whether the client device has accessed the particular domain name; Identifying the client device to be marked as accessing the particular domain name associated with the marker detection information when it is determined the client device downloaded the marker resource. The following describes some examples of this principle procedure for detecting and/or marking a client device as accessing a particular domain name.

Figure 5A:
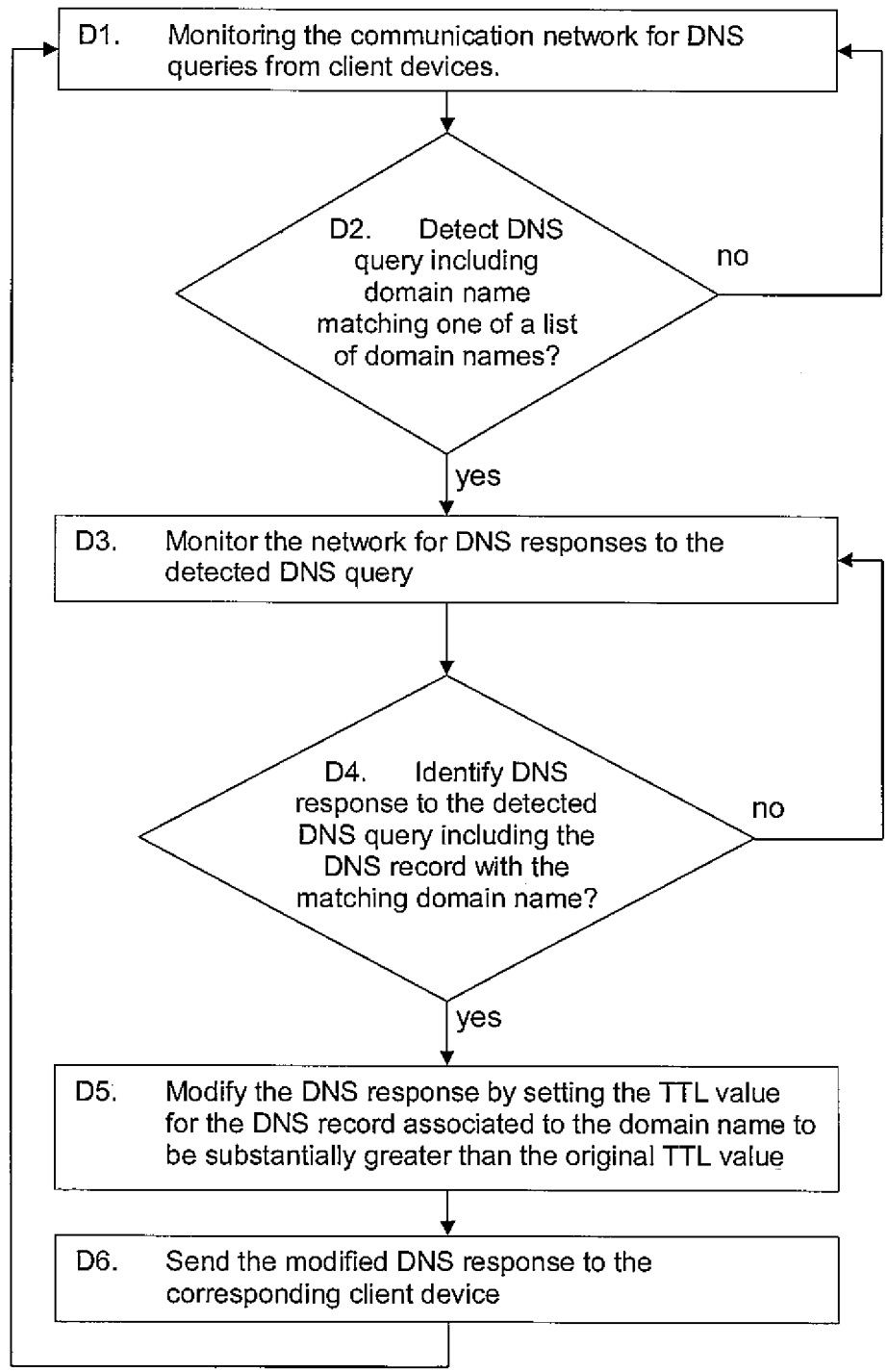
FIG. 5a is a flow diagram illustrating another example procedure carried out by an apparatus for detecting client devices accessing a particular domain name according to the invention.
Figure 5B:
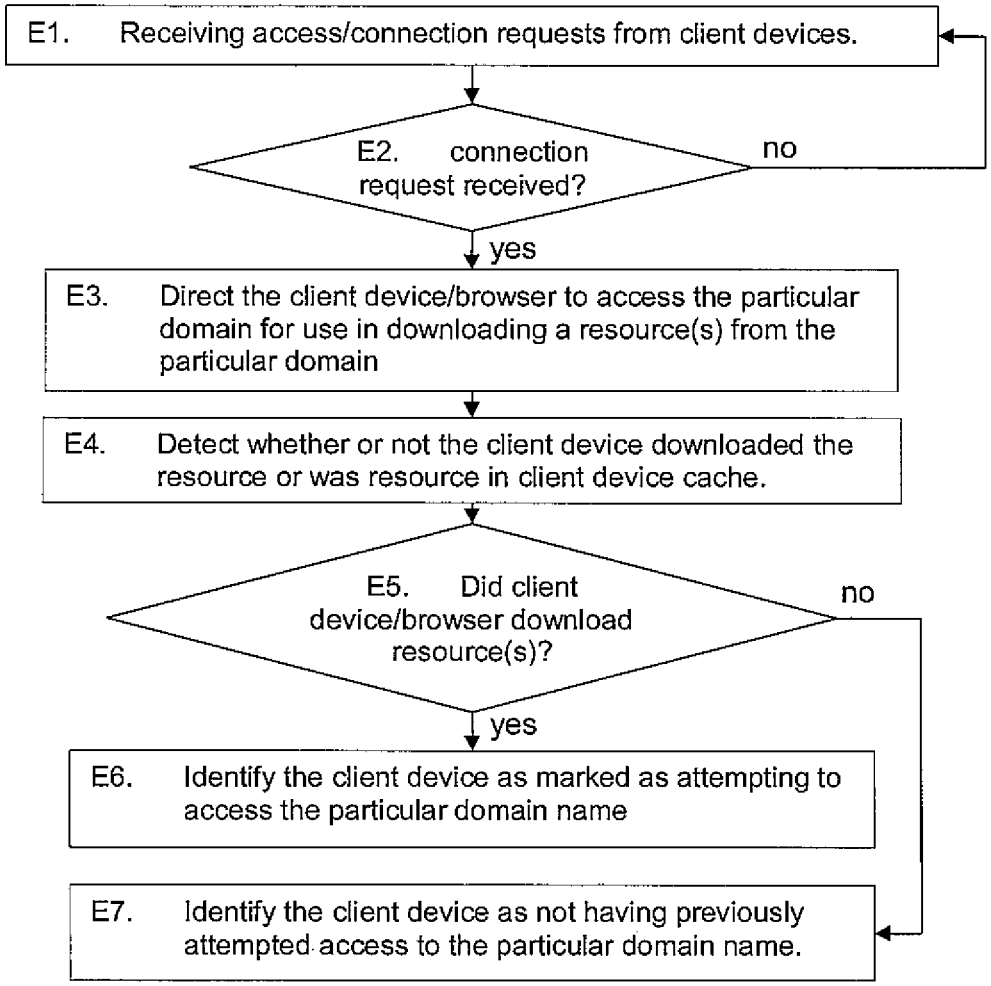
FIG. 5b is a flow diagram illustrating a procedure carried out by a connection system for detecting client devices marked as attempted to access a particular domain name according to the invention.

As described previously, the client device may be persistently marked by a web cookie including data representative of indicating that the client device has accessed the particular domain name. The web cookie may be set when it has been detected that the client device has accessed the particular domain name in which the web cookie indication retrieved from the client device by the connection system (e.g. the client device in effect sends the web cookie). FIGS. 5a and 5b provide further examples for detecting and marking a client device as accessing a particular domain name.

FIG. 5a is a flow diagram illustrating another example procedure carried out by an apparatus for detecting client devices accessing a particular domain name and marking with a temporal marker. The method is outlined by the following steps:

D1. Monitoring the communication network for DNS queries from client devices to detect a DNS query message from a client device including a domain name from a list of domain names, or a particular domain name from the list of domain names. The list of domain names may be a list of domain names of interest. As an example, the list of domain names may include blacklisted domain names such as pirate domain names, terrorist domain names, malware domain names, porn site domain names, or any other domain name of interest.

D2. Detect a DNS query message from a client device including a domain name matching one of the domain names (the particular domain name) on the list of domain names? If yes, proceed to D3. Otherwise continue monitoring DNS traffic, proceed to D1.

D3. Monitor the network for DNS response(s) to the detected DNS query for the client device. Proceed to D4.

D4. Identify a DNS response message corresponding to the detected DNS query message, the DNS response message including a DNS record comprising an internet protocol, IP, address corresponding to the domain name matched from the list of domain names (i.e. DNS record corresponds to a particular domain name). If yes, then proceed to D5. Otherwise, continue monitoring DNS traffic and proceed to D3.

D5. Modify the DNS response message by modifying the TTL value for the DNS record associated with the particular domain that is sufficiently large enough to ensure the marker DNS record is still in the DNS cache when the client device attempts to access the communication network. The method steps for setting the TTL value of DNS records as described with reference to FIGS. 1-4b may be applied. The modified TTL value may be regarded as marker information.

D6. Sending the modified DNS response message (also known as a marker DNS response message) to the corresponding client device in place of the original DNS response message.

The client device is now temporally marked as attempting to access a domain name (or a particular domain name) from the list of domain names.

Although only the DNS record for the particular domain name is temporally marked, in other embodiments a further marker may be placed into the DNS record. For example, DNS response message may be further modified to include a marker DNS record comprising a marker domain name and a corresponding marker IP address. The TTL value for the marker DNS record may be set to be sufficiently large enough to ensure the marker DNS record is still in the DNS cache when the client device attempts to access the communication network. The procedure may also include any of the method steps as described with reference to FIGS. 1-4b.

FIG. 5b is a flow diagram illustrating a procedure carried out by a connection system for detecting client devices marked as accessing a particular domain name. The method is outlined by the following steps:

E1. Receiving access/connection requests from client devices for access to a communication network. These connection requests may be made in any communication protocol or standard, e.g. TCP connection requests, UDP connection requests etc.

E2. If a connection request is received, proceed to E3. Otherwise, continue monitoring for access/connection requests, proceed to E1.

E3. Direct the client device/web browser of client device to access the particular domain name for use in downloading a resource from the particular domain name. The resource may be any file, data, link associated with the particular domain name. The resource may be similar to the marker resource as previously described herein. Proceed to E4.

E4. Detect whether or not the client device accessed the particular domain name, or had it in cache already. If the client device has not accessed the particular domain name, then the client device will send a DNS query associated with the particular domain name, and so that client device will be considered not to have accessed the particular domain name. If the client device is detected to download the resource e.g. access the link from the particular domain name, or does not make a DNS query in relation to receiving the particular domain name (e.g. the client device already has the resource), then proceed to step E5. Otherwise proceed to step E7.

E5. If the client device downloaded or accessed a resource for the particular domain name, or had it in the cache already, then proceed to step E6. Otherwise proceed to step E7.

E6. Identify the client device as marked as having attempted to access a particular domain name from the list of domain names, or the particular domain name from the list of domain names.

E7. Identify the client device as not having previously attempted to access the particular domain name from the list of domain names.

Optionally, the step of identifying the client device may include retrieving the identity information for the client device and storing the identity information in a list of client devices accessing the particular domain name. The identity information includes the Internet Protocol address of the client device. In this way, all client devices accessing a particular domain name from a list of domain names can be identified and stored. In order to get the IP address of the client device, it is assumed the client device and a multiplicity of client devices being monitored for accessing the particular domain name are not necessarily behind a NAT or other similar device as described herein. If the client device is behind a NAT, retrieving the IP address of the client device may include requesting the client device to divulge its identity information, using the NAT provided IP address as the identity information for the client device, for domestic broadband customers this may be enough to identify the customer. For example, if the client device is behind a home Wi-Fi router then there are most likely several client devices behind the Wi-Fi router (e.g. NAT device), but the ISP will know the customer details in relation to the IP address of the Wi-Fi router, hence the IP address of the Wi-Fi router may be used to identify at least the customer that is responsible for the Wi-Fi router and hence the broadband connection to the ISP.

The following is an example application of the procedures described with reference to FIGS. 5a and 5b. The Onion Router (Tor) is a system intended to enable online anonymity. "Onion Routing" is a multi-layered type of encryption service in which the original data is encrypted and re-encrypted multiple times and then passed through a series of relays, in which each relay decrypts a "layer" of encryption applied to the data. Tor was originally designed, implemented, and deployed as a third-generation Onion Routing project for the U.S. Naval Research Laboratory. It was originally developed with the U.S. Navy in mind, for the primary purpose of protecting government communications. Today, it is used every day for a wide variety of purposes by normal people, the military, journalists, law enforcement officers, activists, and many others.

Using Tor makes it more difficult to trace Internet activity, including "visits to Web sites, online posts, instant messages and other communication forms", back to the user and is intended to protect users' personal privacy, freedom, and ability to conduct confidential business by keeping their internet activities from being monitored.

Law enforcement agencies may wish to determine all IP addresses of client devices that have accessed a particular domain name or site. However, when Tor is used for accessing some resource in some domain in the Internet the Tor client software can make establishing the IP address of a client device accessing the particular domain name difficult. The Tor client software directs internet traffic through a worldwide volunteer network of servers to conceal a user's location or usage from anyone conducting network surveillance or traffic analysis. When Tor is normally used all traffic is routed through the Tor network, as well as DNS queries. This way even ISPs listening to the network traffic when Tor client software is used would not know that that the client device has accessed/connected to or visited the particular domain or site.

By detecting and intercepting the DNS queries and responses to the particular domain name, as described with reference to FIG. 5a, the DNS record associated with the particular domain name may be modified to have a TTL value that is sufficiently large that the DNS record is still in the client device's DNS caches when the client device access the communication network (e.g. the Internet) normally, i.e. with Tor disabled. It is assumed the client device would still occasionally use normal (Tor disabled) browser for accessing the Internet, for entertainment purposes for example (YouTube, Facebook, Google, news, . . . ), because browsing through Tor is normally quite slow and not suited for accessing high content that takes more bandwidth. The connection system may include some kind of transparent proxy (e.g. at an ISP premises) that directs the client device to download or access a resource from the particular domain name. The resource may be any file, data or link or may be similar to the marker resource as previously described herein. For example, the transparent proxy may inject links into the web traffic of all of its subscribers, e.g. this is what web advertisers do with web ads. The link would point to the particular domain of the domain or interest. The link may point to a resource for download or access by the client device. The client would access the injected link when browsing. Clients that do not generate DNS query for the particular domain are then assumed to have had previously attempted to connect/contact the particular domain. Clients that generate DNS queries for the particular domain are then assumed not to have previously attempted to connect/contact the particular domain. The identify information of the client device is then retrieved as described previously. For example, if the client device is not behind a NAT device or similar device, then the identity information stored for the marked client device may be the actual IP address of the client device. This kind of surveillance on the Tor network to exactly identify client devices will work for client devices not behind a NAT. However, it is also applicable to those client devices behind a NAT as the IP address of the NAT device can inform the ISP who the subscriber is which might be enough to identify the user of the client device in most cases. This aspect of the invention may also be applied to peer-to-peer and/or BitTorrent type services.

Additionally, the DNS responses may have been further modified to include an additional DNS record with a marker server domain name and IP address for use in downloading a marker resource associated with the particular domain name. In addition, the TTL values to the DNS records of the DNS response for the particular domain name and marker domain name (or other domain name of interest) may be modified to a sufficiently long period of time, as described herein, would mean these DNS records will reside in DNS cache of the client device for a long time.

The client device may have been marked using a marker DNS record as described with regard to the method carried out by an apparatus for marking the client device as accessing a domain name, i.e. the particular domain name, with reference to FIG. 5a. It is assumed the client device may have a marker DNS record associated with a marker server domain and IP address. The connection system may further include or have access to a marker server including a marker resource associated with a particular domain name stored thereon corresponding to the particular domain name. The marker server is unknown to DNS servers accessible by the client device. The procedure may be modified to insert a persistent marker onto the client device to ensure the DNS cache is not reset in the meantime. The procedure may further include directing the client device/web browser of client device to access one or more marker resources using one or more marker server domain names. Detecting whether or not the client device downloaded the marker resource associated with the particular domain name, or had it in cache already. If yes, then if the client device downloaded the marker resource for the particular domain name, or had it in the cache already, then the client device may be identified as marked as attempting to access the particular domain name from the list of domain names, or the particular domain name from the list of domain names.

Alternatively, as an option, once the client device has been identified as being marked as accessing the particular domain, the connection system may further block the client device from accessing the communication network in relation to the connection request when it is determined access to the particular domain name is to be blocked. The connection system may determine whether or not client device should be blocked access/connection to the communication network in relation to the connection request depending on whether the particular domain name is listed as a domain to block or on the number of domain name access attempts. Once it is decided the client device should be blocked, the client device or the client device connection associated with the connection request may be placed in a closed platform or walled garden until it is deemed the client device is not continuing to access or attempting to access the particular domain name. When the client device is detected not to have downloaded the marker resource, e.g. the client device made a DNS query to the marker server domain name, then the connection system may grant the client device connection/access to the communication network. The client device may be one of a multiplicity of client devices operating either behind a NAT device or not. The client device is now marked as attempting to access a particular domain name from the list of domain names. The procedure may also include any of the method steps as described with reference to FIGS. 1-5a when taken in context.

FIG. 6a is a schematic illustration of an apparatus 600 (e.g. DNS detection/marking apparatus 110) for marking and detecting client devices infected with malware. The apparatus 600 is implemented as a combination of computer hardware and software. The apparatus 600 includes a memory 601, a processor 602 and a transceiver 603. The memory 602 stores the various programs/executable files that are implemented by the processor 602. The programs/executable files stored in the memory 601, and implemented by the processor 602, include a malware signature unit 604, detecting unit 605, intercept unit 606, and marking unit 607. The transceiver 603 is used for communicating with other systems, apparatus, client devices over a communication network. In operation, the transceiver 603 is caused by detecting and intercept units 604 and 605 to receive a multiplicity of domain name system, DNS, query messages from a plurality of client devices. The processor 602 and transceiver 603 are caused by malware signature and marking units 604 and 607 to, for each received DNS query message to a malware domain name, send a marker DNS response message associated with the malware domain name to the corresponding client device for use in detecting whether the client device is infected with malware when the client device requests access to a communication network.

For each DNS query message to a malware domain name, the processor 602 may be caused by marking unit 607 to insert a marker IP address into the marker DNS response message to replace the IP address associated with the malware domain name. The processor 602 may store a mapping between the marker IP address and the malware domain name in a database. The database includes a plurality of mappings between marker IP addresses and malware domain names, each mapping associated with a DNS query made by one or more of the client devices. The processor 602 may be caused to generate or select a marker IP address that is different to previously generated or selected marker IP addresses associated with the malware domain name or associated with all malware domain names. The mappings stored for each malware domain name are considered to be different or unique.

Alternatively or in addition, the transceiver 603 and processor 602 may be caused, for each DNS query message from a client device, by detecting unit 605 and malware signature unit 604 to detect that the DNS query message from the client device includes a malware domain name. The malware signature unit 604 may include a list of malware domain names for use in identifying the DNS query messages. The transceiver 603 and processor 602 are further caused by intercept unit 606 to identify a DNS response message corresponding to the detected DNS query message. The DNS response message includes a malware DNS record comprising an IP address corresponding to the malware domain name and a time-to-live value (TTL). The processor 602 is caused by the marking unit 607 to modify the DNS response message by adjusting the malware DNS record TTL value to be substantially greater than the original time-to-live value. The transceiver 603 is configured to send the modified DNS response message as the marker DNS response message to the client device in place of the original DNS response message. As an option, the TTL value may be adjusted to be a period of time that is sufficient for when the client device may attempt to access or send a connection request (connection message) to connection system or ISP for access to the communication network.

Alternatively or additionally, the processor 602 and transceiver 603 are caused by the malware signature unit 624 and the detecting unit 625 to, for each DNS query message to a malware domain name from a client device, detect the DNS query message from the client device to the malware domain name. The processor 602 and transceiver 603 are caused by the intercept unit 606 to identify a DNS response message corresponding to the detected DNS query message, the DNS response message including a malware DNS record comprising an internet protocol, IP, address corresponding to the malware domain name. The processor 602 is further caused by marking unit 607 to modify the DNS response message to further include a marker DNS record comprising a marker domain name and a corresponding marker IP address. The transceiver 603 is further configured to send the modified DNS response message as the marker DNS message to the client device in place of the original DNS response message. As an option, the processor 602 is further caused by the marking unit 607 to modify the TTL value for the marker DNS record to be sufficiently large enough to ensure the marker DNS record is still in the DNS cache when the client device attempts to access the communication network.

FIG. 6b is a schematic illustration of a connection system 610 for detecting whether a client device is marked as infected with malware and restricting access to a communication network accordingly. The apparatus 610 is implemented as a combination of computer hardware and software. The apparatus 610 includes a memory 611, a processor 612 and a transceiver 613. The memory 612 stores the various programs/executable files that are implemented by the processor 612. The programs/executable files stored in the memory 611, and implemented by the processor 612 includes a malware signature unit 614, detecting unit 615, blocking unit 616, and marking unit 617. The transceiver 613 is used for communicating with other systems, apparatus, client devices over a communication network. In operation, the transceiver 613 is caused by detecting unit 615 to receive a connection request from a client device of the plurality of client devices for access to the communication network. The processor 612 and transceiver 613 are caused by detecting and marking units 615 and 617 to send marker detection information to the client device based on the marker DNS response messages sent to the multiplicity of client devices by the apparatus 600. The transceiver 613 is further caused to receive a malware response message from the client device in relation to the marker detection information. The processor 612 is further caused to determine, from the malware response message, whether the client device is with malware. The processor 612 is further caused by blocking unit 617 to block the client device access to the communication network in relation to the communication request when the client device is determined to be infected with malware. The processor 612 is further caused to grant the client device access to the communication network in relation to the connection request when the client device is determined not to be infected with malware.

The marker detection information may be arranged to configure the client device to connect to all malware domains associated with the previously stored mappings of marker IP addresses to malware domain names. The malware response message may also include IP address information associated with connection attempts by the client device to the malware domain names. The processor 612 is further caused by malware signature, detecting and marking units 614, 615 and 617 to determine that the client device is infected with malware when the IP address information indicates a previously stored marker IP address was used by the client device when connecting to a corresponding malware domain name. In addition, the processor 612 is further caused by malware signature, detecting and marking units 614, 615 and 617 to determine that the client device is not infected with malware when the IP address information indicates the client device used marker IP addresses that do not match any of the previously stored marker IP addresses when connecting to the malware domain names.

Additionally or alternatively, the processor 612 and transceiver 613 may be further caused by detection unit 615 and malware signature unit 614 to receive a connection request from the client device for connecting to a communication network location corresponding to the malware domain name. The processor 612 and transceiver 613 may be further configured to provide the client device with a malware removal tool configured to detect malware associated with the malware domain name in the DNS cache of the client device. The processor 612 and transceiver 613 are further caused by blocking unit 616 to block the client device from accessing the communication network. The processor 612 and transceiver 613 are further configured to receive a report from the malware removal tool indicating the client device was infected with malware. The processor 612 and transceiver 613 are further caused by blocking unit 616 to grant the client device access to the communication network, when the client device is considered clean.

Alternatively or additionally, the connection system 610 may be configured or arranged to be coupled or have access to a marker server (not shown) including a marker resource stored thereon, where the marker server domain name is unknown to DNS servers accessible by the client device. In operation, the transceiver 613 is configured to receive a connection request from the client device for access to a communication network. The processor 612 and transceiver 613 may then be caused by marking unit 617 to provide the client device with marker detection information associated with the marker server domain name for use in downloading the marker resource. The processor 612 and transceiver 613 are further caused by detecting unit 615 to detect whether or not the client device downloaded the marker resource. If the client device downloaded the marker resource, then the processor 612 and transceiver 613 are caused by blocking unit 616 to block the client device from accessing the communication network in relation to the connection request. The processor 612 and transceiver 613 are further caused by blocking unit 616 to grant the client device access to the communication network in relation to the connection request when it is determined the client device is clean. Additionally, the marker server domain name is associated with a malware domain name, and prior to providing the client device with the marker detection information associated with the marker server domain name, the processor 612 and transceiver 613 are further configured to provide the client device with the malware domain name.

Optionally, it is to be appreciated that the apparatus as described herein or the connection system as described herein may notify clean and/or infected client devices of a malware infection once or after it is identified that a client device is infected with malware or is marked as infected with malware. For example, clean client devices may be informed that there is an infected client device behind the NAT or in the vicinity of the local area network. The clean clients may be informed by injecting content into the browsing traffic, if the application on the clean client device is a web browser. If infected client device is, for example, a set top box or a TV or other device, then this may be the only method of notifying the user as there might not be any active browsing by the user through TV. Optionally, the infected client device may also be informed of the infected malware. For example, the infected client device may be notified HTTP/HTML/JavaScript means and the like (e.g. inspecting "User-Agent" field of the infected device's traffic).

A client device may include a processor, a memory, a receiver and transmitter, in which the processor is connected to the memory, the receiver and the transmitter, where the processor, memory, receiver and transmitter are configured to perform the appropriate steps of the methods as described herein or with reference to FIGS. 1a-6b.

Although the invention has been described by the above examples, further examples of the invention are now described, which may be combined with any of the above embodiments/examples. The methods, apparatus and connection systems may be provided in the form of a system or cloud-based application(s) that provides operators with the ability to offer malware and/or botnet remediation services. This allows operators to identify and quarantine network traffic from infected devices on a local network hidden behind a NAT address, without affecting network traffic from clean devices on the same network. The present invention may perform monitoring of outgoing traffic from client devices behind a NAT device for requests to malicious sites or domains. These requests are returned with specialty modified DNS responses, which serve to mark or 'tag' the client device (or machine) as infected. The 'tag' is marker information that is used to recognise whether the machine is infected or accessed a particular domain name etc. Subsequently, when the machine tries to connect to the malicious domain requested, the marker or tag is recognised and the system or corresponding application blocks the connection attempt, then quarantines all further traffic from the same device. At the same time, connection requests made from untagged devices are recognized as clean and are allowed to proceed as normal.

The system performs various functions including screening the DNS queries from client devices behind the NAT device, then identifying and quarantining infected devices behind the NAT wall. This may involve three separate components such as a walled garden, a marker DNS, and a gateway to the communication network such as the Internet. As previously described, the walled garden is a quarantine environment with restricted network connections to the Internet. Within the walled garden, the outgoing traffic from a suspect NAT address can be analysed to separate clean web traffic from malicious traffic. The Marker DNS is a separate DNS server from the operators own production DNS server, used to mark DNS responses for malicious domains in preparation for identifying malware infected or bot-infected machines. The gateway is a network gateway or similar component that monitors and intercepts web traffic from infected client devices or machines behind the NAT device, essentially quarantining it in the walled garden until remedial action has been performed. Identifying and quarantining an infected, NAT-hidden, device may be implemented in three stages such as identifying the malicious traffic, tagging the infected device, quarantining the tagged device.

Identifying and quarantining an infected, NAT-hidden, device begins with a DNS query for a malicious domain being sent to the operators own DNS server, from the device on the local network through the NAT barrier. When the operators own NIDS systems observes the malicious request, the normal procedure would be to block this connection, and all subsequent traffic, from the offending NAT address. With the system of this example, the operator can instead opt to shunt the NAT address into the walled garden, where the infected device can be pinpointed for a more targeted quarantine action.

Once in the walled garden, the infected device is marked or tagged. Any DNS requests made by any devices behind the NAT address are sent to the Marker DNS server rather than the operators production DNS server. When the Marker DNS receives the query, instead of providing the real-world malicious domain's IP address, it returns a modified DNS response message or marker DNS response message (e.g. the marker or 'tag') containing a particular or generated marker IP address (e.g. a unique marker IP address), to be stored on the device's DNS cache. The modified DNS response may also include an increased TTL value, which ensures the marker IP address stays in the client device's or machine's DNS cache until it next sends a connection request to access a wider communication network—that is, the Internet—outside the local network.

The client device's or machine's connection attempt may use any one of multiple network connection protocols available—TCP, UDP, etc. Whichever is the case, when the request is received by the gateway, it is first shunted back into the walled garden, where all further traffic to the Internet is blocked until the originating client device or machine is confirmed as either cleaned or infected. The connection request is then sent to a special controlled web page that essentially checks connection requests to see if they use the tell-tale marker IP addresses. If a match is found, the gateway recognizes the machine as infected and refuses the connection request.

For example, connection attempts can be made over HTTP—that is, through a web browser on the client device or machine. Infected machines can also be marked with a second type of marker, indication, or 'tag', such as a persistent marker resource or file that is able to remain on the machine even if it is rebooted, i.e. in non-volatile memory of the client device such as a storage medium. This prevents any malware to perform a reboot to remove traces of its activity. To accommodate the multiplicity of client devices likely to be in use behind a NAT e.g. on a company network, the persistent marker resource or indication may be in the form of a browser web cookie may be used as the marker resource, which is seen as the most flexible choice for a marker resource, though other options as described herein in previous examples are possible.

If the user, who is generally unlikely to notice the infection on the machine, attempts to use the machine's web browser to surf the Internet (or of more concern, visit social networking or banking sites), the browser's connection request is again temporarily held while it is checked for the tell-tale web cookies or marker resource. If these are found, the request is blocked. This not only prevents further connection between malware (e.g. a botnet controller) and the infected machine, but may also avert inadvertently exposing the user's personal information such as online accounts, financial details, passwords, login details and any other potential information loss. At this point, the infected machine is essentially quarantined. All further attempts by marked or tagged client devices to access the Internet are recognized and blocked by the gateway, regardless of whether the destination sites are malicious or clean. The malware or bot-infected client device or machine is effectively prevented from contacting the malware domain or its controller, and is held in the walled garden until it is disinfected.

While the infected machine is being held in the walled garden, the network administrator of the system may choose to display a notification message in the browser on the infected device stating that it has been quarantined due to a suspected infection. The administrator may also elect to send a similar notice to clean devices on the network, informing other users that an infected device is present on the network. Being able to provide this kind of notification improves the user's experience by providing timely, helpful information in dealing with the infection and restoring normal service. By providing this assistance, operators may turn what would otherwise be an unpleasant interruption into an experience that reflects positively on their diligence and service. The process of disinfecting the client devices or machines may be performed by a notification message displayed on the infected device to include a link to a malware removal tool. In this way, the user is prompted to take immediate remedial action. Once the client device or machine is successfully cleaned, it is removed from the walled garden and returns to using the normal network connection processes.

Further advantages of the present invention allows the detection, identification, marking or tagging of infected client devices or machines behind a NAT device's IP address, without requiring any changes to the end user's devices or networks; selectively block web traffic originating from marked or tagged devices, preventing communication between the malware or bot infected machine and the malware domain or botherder/controller; displaying a notification on the identified client device or machine to alert the end user to the infection, guide further remediation efforts and improve their user experience; identify and permit normal web traffic from uninfected devices, avoiding interference with other user's experience; implement this capability without making costly or time-consuming changes to the existing operator equipment or production environment, in particular the DNS servers.

Although marker resource(s) have been described as pictures or image files, they may comprise or represent any data that can be used as a persistent marker on a client device. Examples of marker resources that may be used in certain embodiments of the invention may include, but are not limited to, pictures, movies, music, style sheets, web cookies, icons, executable code/programs or scripts (e.g. JavaScript or any other script) or any other file or data that may be stored on the client device and used to indicate the client device has been marked. The marker resource may be used to identify the type of malware infecting the client device, and/or provide an indication to the client device that of the malware infection. The marker resource may also comprise a self executing malware removal tool for removing the malware infection from the client device, of course the marker resource would then need to remove itself so that the client device, when clean, is no longer marked as infected. If it is not possible to store a marker resource of any kind (e.g. a cookie or data file) on the client device (e.g. malware is preventing storage, or the client device settings restricting downloading of resources such as marker resource(s)), as a fallback rule, the client device should stay in the walled garden. As the user of the client device may be unaware of the possible malware infection, they may be contacted via other clean devices detected to be behind a NAT, or via email or a service call that the client device is possibly infected. Most clean client devices should, in general, not try to prevent storage of a marker resource.

Although the client devices are described as being behind a NAT device, it is to be appreciated by the person skilled in the art that the NAT device may be any network element that translates the IP address of a client device to another IP address that is seen and used by other network elements (e.g. an ISP, client devices and other servers and network elements) on the communication network on the other side of the network element. Examples of NAT devices may include, but is not limited to, routers, switches, DSL switches, Wi-Fi router, proxy servers, or gateway servers.

Although examples and embodiments of the invention have been described that the client device or a multiplicity of client devices are behind a NAT device or similar device or network element, it is to be appreciated by the person skilled in the art these examples and embodiments are also applicable for detecting and marking other client devices as infected with malware that are not behind a NAT and quarantining/cleaning such other client devices accordingly.

The server system, servers, client devices, apparatus, connection systems, internet service provider systems, computing systems as described herein each may perform or contribute to the detection and marking of infected client devices behind NATs and also to the detection of marked and clean client devices for appropriate treatment when accessing a communication network. The processors of such systems are configured to execute computer program instructions based on the methods and processes described herein, such instructions being contained in a non transitory computer-readable medium, such as memory. The computer program instructions may be read into memory from another computer-readable medium or from another device via a communication interface. The instructions contained in memory cause the processor of a server, client device, detection/marking apparatus, connection system, service provider system or other such computer system to perform processes or methods as described herein. Alternatively or in addition to, hardwired circuitry may be used in place of or in combination with the computer program instructions to implement processes and methods consistent with the present invention. Examples of hardware circuitry may include, but are not limited to, semiconductor chips, integrated circuits, field programmable gate arrays, application-specific integrated circuits, electronically programmable integrated circuits and the like. Thus, the present invention is not limited to any specific combination of hardware circuitry and/or software.

The non transitory computer readable medium may include computer program instructions stored thereon, which when executed on one or more processors of a server, server system, or other computing system, performs the processes or method steps of detecting and/or marking infected client devices for subsequent detection and blocking of access to the communications network as described herein with reference to FIGS. 1a-6b. In addition, a computer readable medium including computer program instructions stored thereon, which when executed on one or more processors of a web operator or a client device or other like device, performs the processes or method steps of detecting and/or marking the client devices as infected with malware or accessing a particular domain name as described herein.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein without departing from the scope of the present invention.

The invention claimed is:

1. A method carried out by an apparatus for marking client devices infected with malware, the method comprising the steps of:
receiving a multiplicity of domain name system, DNS, query messages from a plurality of client devices;
for each received DNS query message to a non-malware domain name, sending a DNS response message to the corresponding client device including a non-marker DNS record with a default time-to-live, TTL, value; and
for each received DNS query message to a malware domain name, sending a marker DNS response message associated with the malware domain name to the corresponding client device for subsequently detecting whether the client device is infected with malware when the client device requests access to a communication network;
wherein the marker DNS response message associated with the malware domain includes a marker DNS record with a TTL value of one or more hours that is substantially greater than the default TTL value.

2. A method as claimed in claim 1, further comprising for each DNS query message to a malware domain name:
inserting a marker IP address into the marker DNS response message to replace the IP address associated with the malware domain name; and
storing a mapping between the marker IP address and the malware domain name in a database.

3. A method as claimed in claim 2, further comprising, for each DNS query to a malware domain name, generating the marker IP address to be different to previous marker IP addresses associated with the malware domain name.

4. A method as claimed in claim 1, the method further comprising for each DNS query to a malware domain name from a client device:
detecting the DNS query message from the client device to the malware domain name;
identifying a DNS response message corresponding to the detected DNS query message, the DNS response message including a malware DNS record comprising an interne protocol, IP, address corresponding to the malware domain name;
modifying the DNS response message to further include the marker DNS record with a TTL value that is substantially greater than the default TTL value, the marker DNS record comprising a marker domain name and a corresponding marker IP address; and
sending the modified DNS response message as the marker DNS response message to the client device in place of the original DNS response message.

5. A method carried out by a connection system for detecting whether client devices have been marked as infected with malware, the method comprising the steps of:
receiving a connection request from a client device of the plurality of client devices for access to a communication network;
sending marker detection information to the client device for identifying whether the client device is marked as infected with malware, the marker detection information based on marker domain name system, DNS, response message(s) associated with one or more malware domain name(s), wherein the marker DNS response message(s) includes a marker DNS record with a time to live, TTL, value of one or more hours that is substantially greater than a default TTL value for non-marker DNS records, and the marker DNS response message(s) are sent to one or more of the plurality of client device(s) for marking those client device(s) as infected with malware that sent one or more DNS query message(s) associated with said malware domain name(s);
receiving an indication from the client device as to whether the client device is marked as infected with malware;
determining, from the indication, whether the client device is infected with malware;
blocking the client device access to the communication network in relation to the connection request when the client device is determined to be infected with malware; and granting the client device access to the communication network in relation to the connection request when the client device is determined not to be infected with malware.

6. A method as claimed in claim 5, wherein:
the marker detection information configures the client device to:
connect to all malware domains associated with previously stored mappings of marker IP addresses to malware domain names;
determine, for each connection attempt to a malware domain name, whether the client device is infected with malware by:
determining that the client device is infected with malware when an IP address used by the client device in the connection attempt to the malware domain name corresponds to a previously stored mapping; and
determining that the client device is not infected with malware when an IP address used by the client device in the connection attempt to the malware domain name does not correspond to a previously stored mapping;
configuring the indication to include data representative of whether the client device is infected with malware.

7. A method as claimed in claim 5, wherein:
the marker detection information configures the client device to connect to all malware domains associated with previously stored mappings of marker IP addresses to malware domain names;
the indication includes data representative of IP address information associated with connection attempts by the client device to the malware domain names;
the step of determining further comprises, for each connection attempt to a malware domain name:
determining that the client device is infected with malware when the IP address information indicates an IP address used by the client device in the attempt to connect to the malware domain name matches a previously stored mapping; and
determining that the client device is not infected with malware when the IP address information indicates an IP address used by the client device in the attempt to connect to the malware domain name does not match a previously stored mapping.

8. A method as claimed in claim 5, wherein the marker detection information configures the client device to perform the steps of
connecting to a set of malware domain names for determining a corresponding set of connection time periods for use in determining whether the client device is marked as infected with malware based on a DNS cache miss time; and
for each connection time period, comparing the corresponding determined connection time period with the DNS cache miss time and determining the client device to be clean when the corresponding connection time period indicates a DNS cache miss.

9. A method as claimed in claim 5, wherein the marker detection information configures the client device to:
connect to a set of malware domain names for determining a corresponding set of connection time periods for use in determining whether the client device is marked as infected with malware based on a DNS cache hit time; and
for each connection time period, comparing the corresponding determined connection time period with the DNS cache hit time, and determining the client device to be infected with malware when the corresponding connection time period indicates a DNS cache hit.

10. A method as claimed in claim 5, wherein the connection system is coupled to a marker server including a marker resource stored thereon, wherein the marker server domain name is unknown to domain name system, DNS, servers accessible by the client device, the method comprising:
receiving a connection request from the client device for access to a communication network;
providing the client device with marker detection information associated with the marker server domain name for use in downloading the marker resource;
detecting whether or not the client device downloaded the marker resource;
if the client device downloaded the marker resource, then:
determining the client device to be marked as infected with malware; and
blocking the client device from accessing the communication network in relation to the connection request; otherwise
granting the client device access to the communication network in relation to the connection request.

11. A method carried out by a client device for detecting whether the client device is marked as infected with malware, the method comprising the steps of
transmitting a connection request from the client device for access to a communication network;
receiving marker detection information at the client device for identifying whether the client device is marked as infected with malware, the marker detection information based on marker domain name system, DNS, response message(s) associated with one or more malware domain name(s), wherein the marker DNS response message(s) includes a marker DNS record with a time to live, TTL, value of one or more hours that is substantially greater than a default TTL value for non-marker DNS records, and the marker DNS response message(s) are sent to one or more of the plurality of client device(s) in the communication network for marking those client device(s) as infected with malware that sent one or more DNS query message(s) associated with said malware domain name(s); and
sending an indication as to whether the client device is marked as infected with malware for use in determining whether to block or grant access to the communication network in relation to the connection request.

12. A method as claimed in claim 11, wherein:
the marker detection information configures the client device to:
connect to all malware domains associated with previously stored mappings of marker IP addresses to malware domain names;
determine, for each connection attempt to a malware domain name, whether the client device is infected with malware by:
determining that the client device is infected with malware when an IP address used by the client device in the connection attempt to the malware domain name corresponds to a previously stored mapping; and
determining that the client device is not infected with malware when an IP address used by the client device in the connection attempt to the malware domain name does not correspond to a previously stored mapping;

configure the indication to include data representative of whether the client device is infected with malware.

13. A method as claimed in claim 11, wherein the marker detection information configures the client device to perform the steps of
connecting to all malware domains associated with previously stored mappings of marker IP addresses to malware domain names;
for each connection attempt to a malware domain name:
determining that the client device is infected with malware when an IP address used by the client device in the attempt to connect to the malware domain name matches a previously stored mapping; and
determining that the client device is not infected with malware when an IP address used by the client device in the attempt to connect to the malware domain name does not match a previously stored mapping;
wherein, the indication includes IP address information associated with the connection attempts by the client device to the malware domain names.

14. A method as claimed in claim 11, wherein the marker detection information configures the client device to perform the steps of:
connecting to a set of malware domain names for determining a corresponding set of connection time periods for use in determining whether the client device is marked as infected with malware based on a DNS cache miss time; and
for each connection time period, comparing the corresponding determined connection time period with the DNS cache miss time and determining the client device to be clean when the corresponding connection time period indicates a DNS cache miss.

15. A method as claimed in claim 11, wherein the marker detection information configures the client device to:
connect to a set of malware domain names for determining a corresponding set of connection time periods for use in determining whether the client device is marked as infected with malware based on a DNS cache hit time; and
for each connection time period, comparing the corresponding determined connection time period with the DNS cache hit time, and determining the client device to be infected with malware when the corresponding connection time period indicates a DNS cache hit.

16. An apparatus for marking client devices infected with malware, the apparatus comprising a processor, a memory, a receiver and transmitter, the processor connected to the memory, the receiver and transmitter, wherein:
the receiver is configured to receive a multiplicity of domain name system, DNS, query messages from a plurality of client devices; and
the processor and transmitter are configured to: for each received DNS query message to a non-malware domain name, sending a DNS response message to the corresponding client device including a non-marker DNS record with a default time-to-live, TTL, value; and for each received DNS query message to a malware domain name, send a marker DNS response message associated with the malware domain name to the corresponding client device for subsequently detecting whether the client device is infected with malware when the client device requests access to a communication network;
wherein the marker DNS response message associated with the malware domain includes a marker DNS record with a TTL value of one or more hours that is substantially greater than the default TTL value.

17. A connection system for detecting whether a client device is marked as infected with malware, the connection system comprising a processor, a memory, a receiver and transmitter, the processor connected to the memory, the receiver and the transmitter, wherein:
the receiver is configured to receive a connection request from a client device of the plurality of client devices for access to the communication network;
the processor and transmitter are configured to send marker detection information to the client device based on the marker domain name system, DNS, response messages associated with one or more malware domain name(s) sent to one or more of the plurality of client devices, wherein the marker DNS response message(s) includes a marker DNS record with a time to live, TTL, value of one or more hours that is substantially greater than a default TTL value for non-marker DNS records, and the marker DNS response message(s) are for marking those client device(s) as infected with malware that sent one or more DNS query message(s) associated with said malware domain name(s);
the receiver is further configured to receive a malware response message from the client device in relation to the marker detection information;
the processor is further configured to:
determine, from the malware response message, whether the client device is with malware;
block the client device access to the communication network in relation to the communication request when the client device is determined to be infected with malware; and
grant the client device access to the communication network in relation to the connection request when the client device is determined not to be infected with malware.

18. A client device for detecting whether the client device is marked as infected with malware, the client device comprising a processor, a memory, a receiver and transmitter, the processor connected to the memory, the receiver and the transmitter, wherein:
the transmitter is configured to transmit a connection request from the client device for access to a communication network;
the receiver and processor are configured to receive marker detection information at the client device for identifying whether client device is marked as infected with malware, the marker detection information based on marker domain name system, DNS, response message(s) associated with one or more malware domain name(s), wherein the marker DNS response message(s) includes a marker DNS record with a time to live, TTL, value of one or more hours that is substantially greater than a default TTL value for non-marker DNS records, and the marker DNS response message(s) are sent to one or more of the plurality of client device(s) in the communication network for marking those client device(s) as infected with malware that sent one or more DNS query message(s) associated with said malware domain name(s); and
the processor and transmitter are further configured to send an indication as to whether the client device is marked as infected with malware for use in determining whether to block or grant access to the communication network in relation to the connection request.

\* \* \* \* \*

UNITED STATES PATENT AND TRADEMARK OFFICE
CERTIFICATE OF CORRECTION

PATENT NO. : 9,654,494 B2  
APPLICATION NO. : 14/249747  
DATED : May 16, 2017  
INVENTOR(S) : Daavid Hentunen Page 1 of 1

It is certified that error appears in the above-identified patent and that said Letters Patent is hereby corrected as shown below:

In the Claims

In Claim 4:
Column 60, Line 27, "interne" should be deleted and --internet-- should be inserted.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*